United States Patent
Yamaki et al.

(10) Patent No.: US 6,286,550 B1
(45) Date of Patent: Sep. 11, 2001

(54) VALVE APPARATUS

(75) Inventors: Seiji Yamaki; Kenichi Kawazoe; Hideo Ohtani; Hiroshi Yamamoto; Ryoji Okutsu; Koji Izumi, all of Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 09/613,568

(22) Filed: Jul. 10, 2000

Related U.S. Application Data

(62) Division of application No. 08/958,155, filed on Oct. 27, 1997.

(30) Foreign Application Priority Data

| Oct. 31, 1996 | (JP) | 8-290302 |
| Oct. 31, 1996 | (JP) | 8-290303 |
| Oct. 31, 1996 | (JP) | 8-290304 |
| Oct. 31, 1996 | (JP) | 8-290305 |
| Nov. 29, 1996 | (JP) | 8-320273 |
| Jul. 10, 1997 | (JP) | 9-185509 |

(51) Int. Cl.$^7$ .................................... F16K 1/44
(52) U.S. Cl. ............... 137/625.34; 137/312; 251/318
(58) Field of Search ................ 251/318; 137/312, 137/625.34, 625.35, 625.36

(56) References Cited

U.S. PATENT DOCUMENTS

| 2,880,748 | * | 4/1959 | Elsey | 137/625.36 |
| 3,012,583 | * | 12/1961 | Gorgens et al. | 137/625.34 |
| 3,730,479 | * | 5/1973 | Baumann | 137/625.3 |
| 3,884,268 | | 5/1975 | Wagner et al. | |

FOREIGN PATENT DOCUMENTS

| 412701 | 2/1941 | (JP). |
| 3616375 | 6/1961 | (JP). |
| 4511881 | 5/1970 | (JP). |
| 5262728 | 5/1977 | (JP). |
| 5866103 | 5/1983 | (JP). |
| 61070123 | 7/1988 | (JP). |
| 9042478 | 2/1997 | (JP). |

* cited by examiner

Primary Examiner—John Fox
(74) Attorney, Agent, or Firm—Rothwell, Figg, Ernst & Manbeck

(57) ABSTRACT

A valve apparatus for preventing the reverse of a thrust force and the generation of oscillation by smoothing a fluid flowing, including: an upper plug and an upper sheet ring which are for adjusting flow of fluid to an upper current path; and a lower plug and a lower sheet ring which are provided on the same axis as the upper plug and the upper sheet ring, and are for adjusting flow of fluid to a lower current path, wherein the generation of oscillation noise can be prevented by making the upper flowing path and the lower flowing path as different shapes, by making the upper and lower plug shape different, by making the plug operation stable with the reverse of the thrust force being prevented by making the fluid amount for the upper flowing path being increased, with the upper and lower sheet ring being formed as one body.

2 Claims, 31 Drawing Sheets

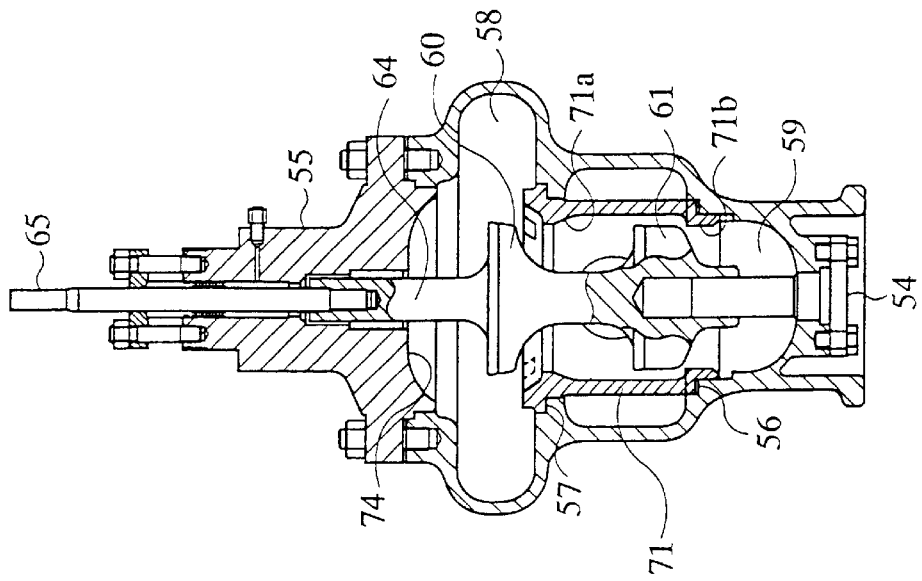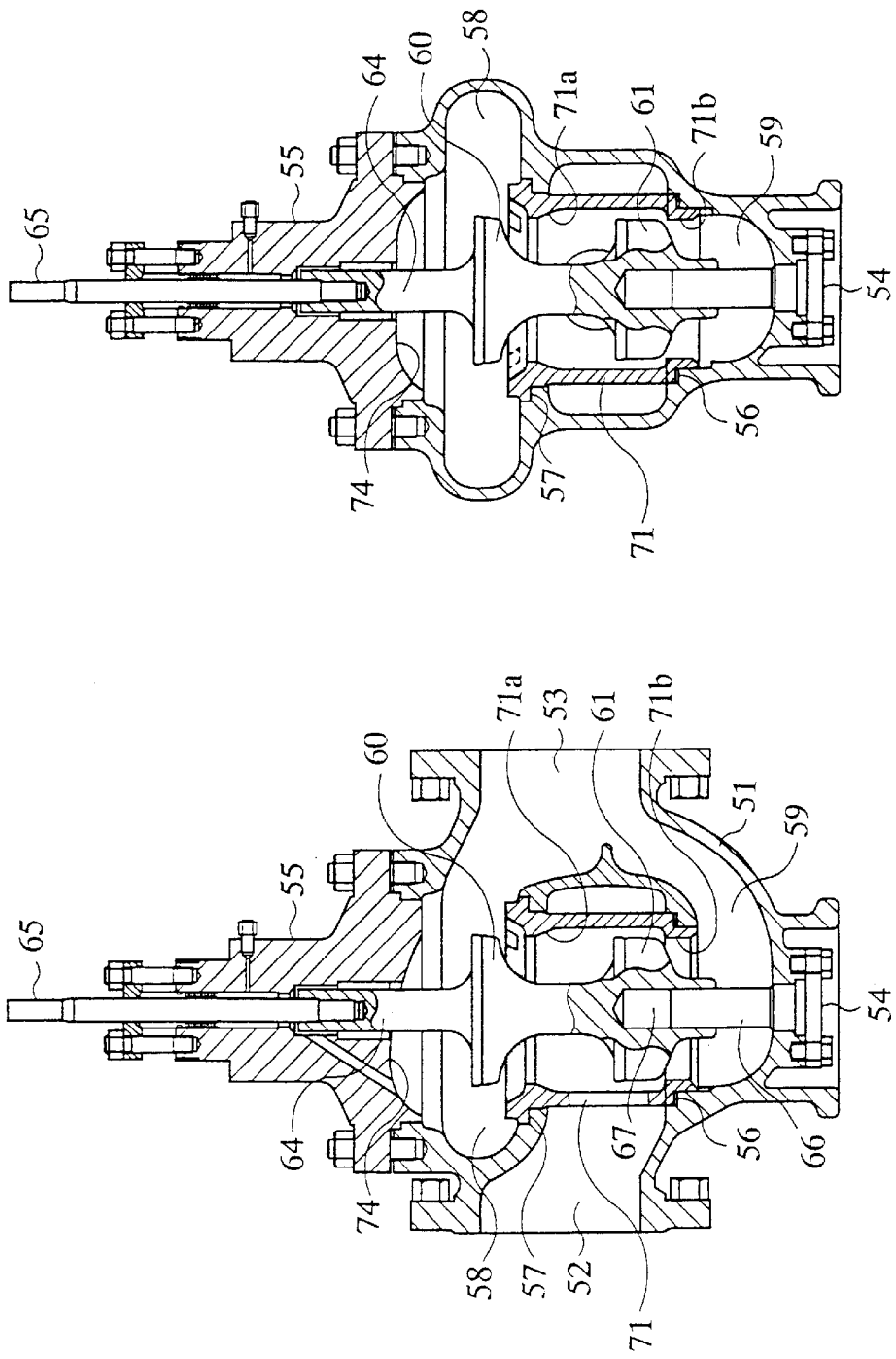

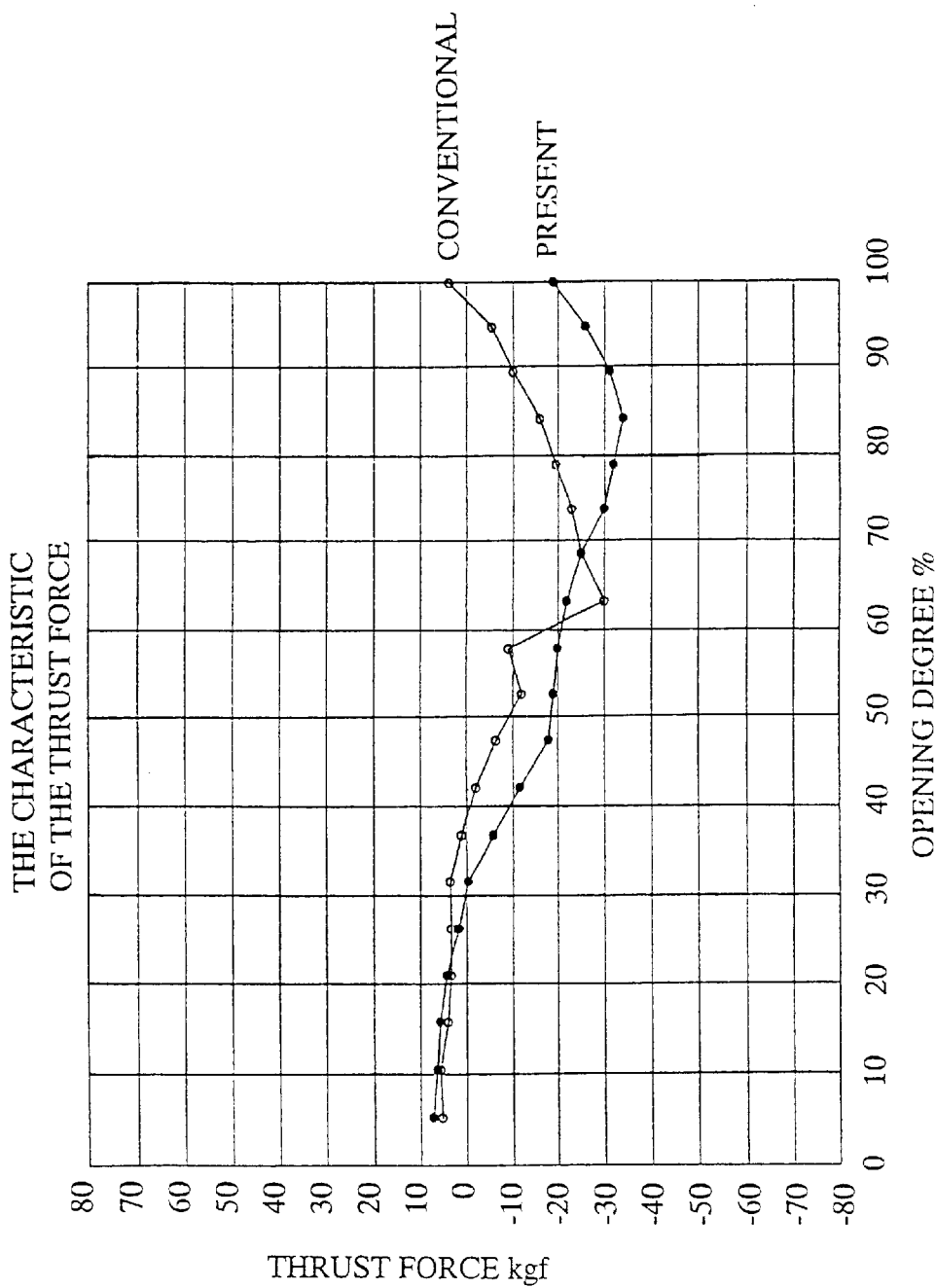
FIG.18 THE CHARACTERISTIC OF THE THRUST FORCE

FIG.34
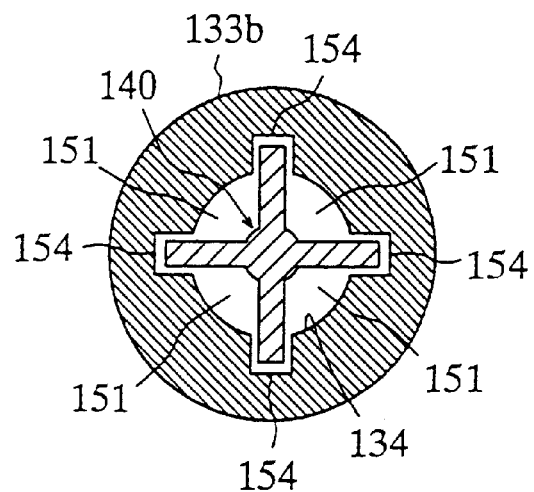
FIG.35
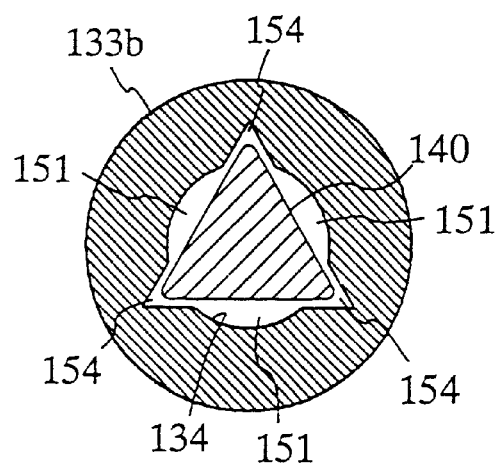
FIG.36(a) FIG.36(b) FIG.36(c)
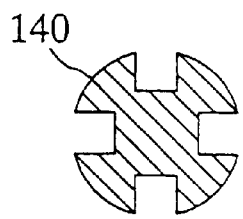 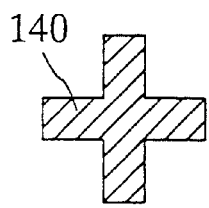 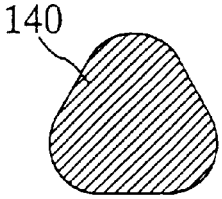

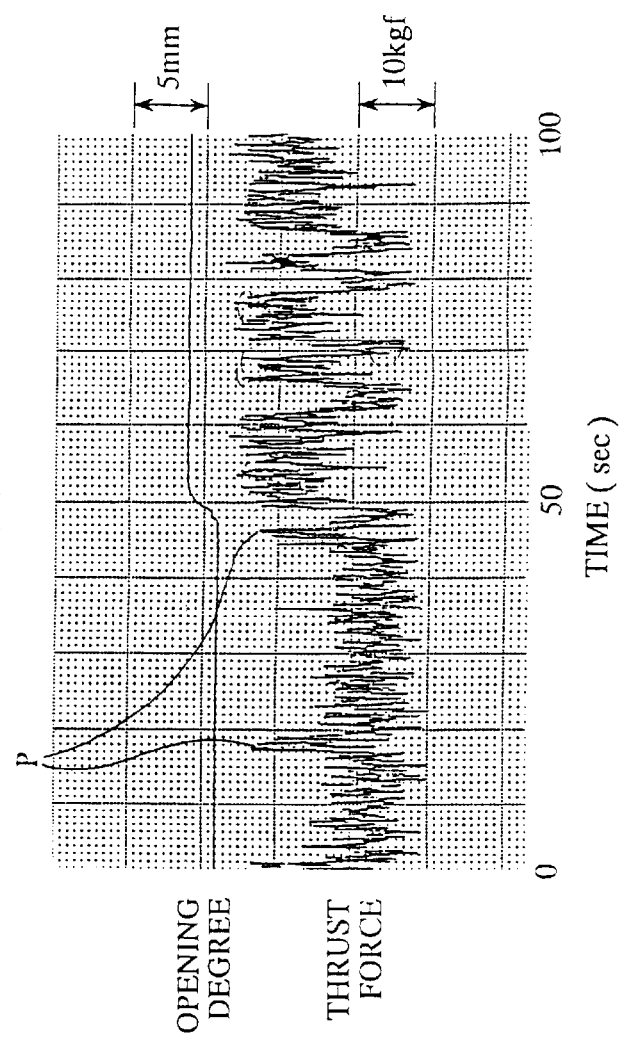
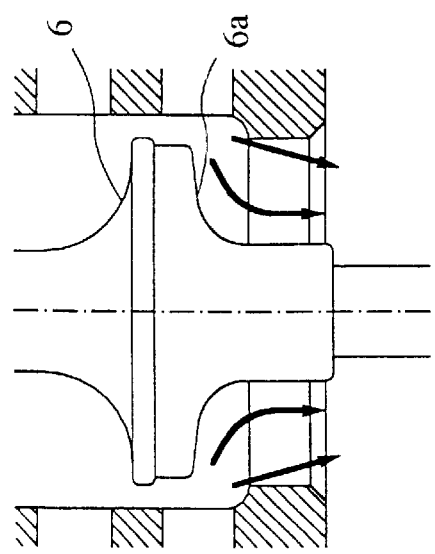

VALVE APPARATUS

CROSS REFERENCE TO RELATED APPLICATION

This application is a division of application Ser. No. 08/958,155, filed Oct. 27, 1997.

BACKGROUND OF THE INVENTION

1. Field of the Invention

The present invention relates to a valve apparatus for splitting the flow path of fluid by a pair of plugs provided to one shaft thereof.

2. Description of the Prior Art

FIG. 38 is a sectional view showing a conventional valve apparatus having a double-sheeted structure, and in this figure, a reference numeral 1 denotes an upper cover of the valve apparatus; 2 illustrates a lower cover; and 3 shows a valve case (a valve main body). A reference numeral 5 represents an upper plug, and 6 indicates a lower plug. The upper plug 5 and the lower plug 6 are provided on a valve shaft 4 so as to make the same axis, and are shifted in the upper and lower directions along with the valve shaft 4. A reference numeral 7 denotes an upper sheet ring making a pair with the upper plug 5, and 8 illustrates a lower sheet ring making a pair with the lower plug 6. A reference numeral 9 shows an inflow opening of the valve case 3, and 10 represents an outflow opening of the valve case 3. A reference numeral 11 indicates an upper port section defined by the upper sheet ring 7, and 12 denotes a lower port section defined by the lower sheet ring 8. A reference numeral 11a illustrates an upper current path in which fluid from the upper port section 11 flows, and 12a shows a lower current path in which fluid from the lower port section 12 flows. A reference numeral 2a represents a guide hole provided to the lower cover to guide the lower plug 6.

Next, an operation will be described.

The fluid flows into the valve case 3 from the inflow opening 9, then flows out from the outflow opening 10. In the case that the amount of lift is 0%, i.e., the upper plug 5 and the upper sheet ring 7 closely touch and the lower plug 6 and the lower sheet ring 8 closely touch each other, there is no inflow and outflow of the fluid.

When the upper plug 5 and the lower plug 6 are shifted by the valve shaft 4, the fluid from the inflow opening 9 flows in the upper current path 11a via the upper port section 11, and also flows in the lower current path 12a via the lower port section 12. The fluid passed in the upper current path 11a and the lower current path 12a flows out from the outflow opening 10.

Since the conventional valve apparatus is constituted as described above, there are problems as follows.

a) In the conventional valve apparatus, two pairs of plug and sheet ring are provided so as to split the fluid flowing into the upper and lower portions, and it is characterized in that fluid power unbalance between such upper and lower flows is mostly offset. However, as will be understood from FIG. 39 showing an example of a relation between the amount of lift and the unbalance power, although the unbalance power is urged in a positive direction (a direction to open the valve) in the case that the amount of lift is 0 to 50%, the unbalance power is suddenly changed to the direction to a negative direction (a direction to close the valve) after the amount of lift is over 50%, then increases up to 100%.

Although the change of the unbalance power from the positive direction into the negative direction is at the point of 50% of the amount of lift in FIG. 39, if considered with other examples, the change of the unbalance power from the positive direction into the negative direction is caused in a range of 30 to 50%.

While the unbalance power is urged to the positive direction, an operational device (not shown) controls the valve in the direction to close, with the upper plug 5 and the lower plug 6 being pushed through the valve shaft 4. In this state, if the unbalance power is changed into the negative direction, since the upper plug 5 and the lower plug 6 operate so as to close the valve, the operational device controls the valve in the direction to open for keeping the degree of opening of the valve. Besides, the more the change of the unbalance power in the negative direction is rapid, the more the control of the operational device becomes rapid, thereby causing a problem that the control of the operational device becomes unstable when the amount of lift is over a specific range.

b) The guide hole 2a is formed in the lower cover 2, and a lower end portion of the lower plug 6 is inserted into this guide hole 2a to carry out the guiding for the lower plug 6. Because of this, the depth of the guide hole 2a is required to accommodate at least the length of the lower portion of the lower plug 6, thereby causing a problem that the valve apparatus in itself becomes long in the lower side direction.

c) There is a problem that enough space margin under the bottom surface of the lower cover 2 is required for opening the lower cover 2 at the maintenance for the main body of the valve apparatus.

d) There is a problem that operability is bad if there is not enough space at the lower portion of the main body of the valve apparatus, when the lower cover 2 is removed to perform the maintenance of the valve apparatus itself, after the valve apparatus is connected with pipes.

e) Because the upper plug 5 and the lower plug 6 have approximately the same shape, a flow ratio between an upper fluid and a lower fluid at the time of synchronous valve opening becomes 1:1, and if the flow ratio is thus the same, a thrust (unbalance power) force to each of the upper and lower plugs 5 and 6 in the axis direction as a fluid reaction force is rapidly changed near the degree of half opening in which the upper and lower plugs 5 and 6 have actual opening degree, thereby causing a problem that the valve control becomes unstable or uncontrollable.

In other words, the thrust in the axis direction caused by the difference of fluid pressures operated thereto is changed largely near the half opening degree, and is rapidly turned over, in the both upper and lower plugs 5 and 6 which are formed as approximately the same shape such that the flow ratio between the upper fluid and the lower fluid at the valve opening becomes equal to each other. Such rapid reverse of the thrust caused by generating an unstable drawing flow of the fluid around the lower plug 6 having approximately the same shape as the upper plug 5 as shown in FIG. 40(a), thereby to generate a portion P in which the thrust is largely changed, even if the plug position is constant as shown in FIG. 40(b).

Here, if the plug opening is controlled by a diaphragm operational device for adjusting the amount of the fluid at the time when the thrust is turned over, a panting action occurs, therefore, there is a problem that the control by the diaphragm operational device becomes unstable, or becomes uncontrollable with the diaphragm operational device being made incongruous.

f) The fluid flowing out from a gap generated between the upper plug 5 and the upper sheet ring 7 flows into the upper current path 11a, and the flowing direction of the fluid is changed into the direction of the outflow opening 10 of the fluid at the upper current path 11a, after colliding with the bottom surface of the upper cover forming an upper inside surface of the upper current path 11a, thereby causing a problem that noise or oscillation is generated with the fluid flowing being tumbled at this time.

g) The fluid flowing out from a gap generated between the lower plug 6 and the lower sheet ring 8 flows into the lower current path 12a, and the flowing direction of the fluid is changed into the direction of the outflow opening of the fluid at the lower current path 12a, after colliding with the upper surface of the lower cover 2 forming a bottom surface of the lower current path 12a, thereby causing a problem that noise or oscillation is generated with the fluid flowing being tumbled at this time also.

h) In adjustment of the sheet pitch in the vertical direction of the upper sheet ring 7 and the lower sheet ring 8 with reference to the valve case 3, the upper sheet ring 7 and the lower sheet ring 8 are screwed in the valve case 3 respectively, and are removed after the sheet surface at such a screwed state is measured, then the sheet surface is further processed, as well as screwed again into the valve case 3 to measure, thus it is repeated. Owing to this, in the valve apparatus having a plurality of plugs, it was a complicated operation.

i) Since the upper sheet ring 7 and the lower sheet ring 8 are fixed to the valve case 3 respectively by screws, adjustment of the upper sheet ring 7 is carried out after the upper cover 1 is removed from the valve case 3, and adjustment of the lower sheet ring 8 is performed after removing the lower cover 2 from the valve case 3, thereby causing a problem that the operation of the adjustment takes time.

j) Since the guide hole 2a having a predetermined depth must be provided to the lower cover 2, and this causes the thickness of the lower cover to become large, so that the amount of the projection of the bottom of the valve case 3 becomes large, there is a problem that the lower cover 2 cannot be removed because enough lower operational space cannot be obtained after the valve apparatus is installed.

k) In addition, a plug guide portion 13 is formed as one body with the plugs 5 and 6, so that if the plug guide portion 13 is damaged by oscillation or erosion, or is required to change on a maintenance, the plugs 5 and 6 must be also changed, thereby causing a problem of making the valve apparatus uneconomical.

SUMMARY OF THE INVENTION

A first object of the present invention is to provide a valve apparatus which can carry out a stable control of the plugs and which has high reliability, with reverse of the thrust operating to the upper and lower plugs provided to the same shaft being prevented.

A second object of the present invention is to provide a valve apparatus which is formed such that fluid smoothly flows to prevent noise or oscillation due to disorder of the fluid flowing.

A third object of the invention is to provide a valve apparatus in which the sheet ring is made as one body for the upper and lower plugs to stop leak thereof, and noise or oscillation can be prevented.

A fourth object of the present invention is to provide a valve apparatus in which a small-sized and light weight valve apparatus can be realized.

To achieve the above-described objects, according to the valve apparatus of a first aspect, a valve apparatus comprises: an upper plug and an upper sheet ring for adjusting the flow of fluid to an upper current path; and a lower plug and a lower sheet ring, provided on the same axis as the upper plug and the upper sheet ring, for adjusting the flow of fluid to a lower current path, wherein the flow of the lower current path has a smaller value than that of the upper current path.

According to the valve apparatus of a second aspect, a ratio of flow in the upper current path and the lower current path is set in the range of 1.0:0.7 to 1.0:0.9 when the upper and lower plug shapes are approximately identical to each other.

According to the valve apparatus of a third aspect, the sectional area of the upper current path is formed larger than sectional area of the lower current path.

According to the valve apparatus of a fourth aspect, the upper plug and the lower plug are provided such that the center line of a path at the inflow side is positioned lower than the symmetrical center line which connects the center of an inflow opening to an outflow opening at the valve apparatus.

According to the valve apparatus of a fifth aspect, there are provided an upper plug and an upper sheet ring for adjusting the flow to the upper current path; a lower plug and a lower sheet ring, provided on the same axis as the upper plug and the upper sheet ring, for adjusting the flow of fluid to the upper current path; and a resistance member for fluid, provided within the lower current path. 8

In addition, a ratio of the flow of the upper flowing path to the flow of the lower flowing path may be set from 1.0:0.7 to 1.0:0.9.

Furthermore, a resistance is provided between the lower sheet ring and the lower cover, as a cage having a side hole.

Moreover, the cage may be formed as a cylindrical body in which the periphery of the upper portion of the lower cover is extended until the position of the lower sheet ring, and a side hole may be formed to the side surface of this cylindrical body.

Further, the cage can be formed by a cylindrical body in which the lower sheet ring is extended until the lower cover, and a side hole can be formed to the side surface of this cylindrical body.

According to the valve apparatus of a sixth aspect, a lower cover becomes needless because there are provided an upper plug and an upper sheet ring for adjusting the flow to the upper current path; a lower plug and a lower sheet ring, provided on the same axis as the upper plug and the upper sheet ring, for adjusting the flow of fluid to the upper current path; and a guide member for guiding the lower plug.

In addition, the guide member can be formed by a cylindrical body having a bottom, and a guide hole for guiding the lower plug can be formed to the bottom of this cylindrical body, as well as a side hole for flowing fluid can be formed at the side wall.

Furthermore, the cylindrical body having the bottom can be formed as one body with the lower seat ring. Moreover, after the cylindrical body having the bottom and the lower sheet ring are formed individually, it can be attached with the lower sheet ring.

Further, the side holes made at the side surface of the cylindrical body having the bottom as a guide member is formed as a plurality of small holes.

In addition, the guide member is formed of a bent rod body, and the guide hole can be formed to the connection portion of the rod body.

Further, the guide member can be defined such that the ratio between the flow of the upper current path and the flow of the lower current path becomes 1.0:0.7 to 1.0:0.9.

According to the valve apparatus of a seventh aspect, a valve apparatus comprises: a valve main body formed such that a flowing path connecting an inflow opening and an outflow opening is separated on the way into upper current path and a lower current path, and that the upper current path and the lower current path are combined at the outflow opening; and an upper plug and a lower plug having the same axis, which are provided in the valve main body, and which are for synchronously controlling open/close of the upper current path and the lower current path so as to connect/disconnect with reference to the flowing path, wherein the upper plug is made different from the lower plug such that the amount of fluid to the upper current path becomes larger than the amount of fluid to the lower current path, and that the rate of the upper and lower current paths becomes 6:4 to 9:1.

According to the valve apparatus of an eighth aspect, the upper plug and the lower plug are formed such that a longitudinal thrust force generated on a valve opening is not turned on between 0% and 85%.

According to the valve apparatus of a ninth aspect, a conical taper surface having a lower end side being gradually narrowed is formed with an inclined angle of 20° to 45°.

In addition, a conical taper surface having the lower end side being gradually narrowed can be formed with an inclined angle of 30°.

Furthermore, the volume of the upper flowing path can be made larger than the lower flowing path.

Moreover, the upper flowing path is transversely extended than the lower flowing path around the outflow opening of the fluid of the sheet ring.

According to the valve apparatus of a tenth aspect, the volume of one main outflow direction changing chamber of the upper outflow direction changing chamber and the lower outflow direction changing chamber is larger than the volume of the other outflow direction changing chamber.

According to the valve apparatus of an eleventh aspect, one of the upper outflow direction changing chamber and the lower outflow direction changing chamber has a shape extended transversely for a main flow in comparison with the other outflow changing chamber.

In addition, an outflow direction changing chamber surface for changing fluid flowing via a gap generated between upper plug and the upper sheet ring or between the lower plug and the lower sheet ring in one of the upper outflow direction changing chamber or the lower outflow direction changing chamber having a transversely extended shape can be formed as a concave surface of the streamed shape for reducing the resistance when the fluid flows.

According to the valve apparatus of a twelfth aspect, a part of the inner surface forming the outflow direction changing chamber for changing the fluid flowing from the gap generated between the plug and the sheet ring is formed as a concave surface of the streamed shape for reducing the resistance when the fluid flows.

According to the valve apparatus of a thirteenth aspect, the bottom of an upper cover forming a part of an inner surface of the outflow direction changing chamber is formed as a concave surface having a streamlined shape for reducing the resistance when the fluid flows.

According to the valve apparatus of a fourteenth aspect, the bottom of a lower cover forming a part of an inner surface of an outflow direction changing chamber is formed as a concave surface having a streamlined shape for reducing the resistance when the fluid flows.

According to the valve apparatus of a fifteenth aspect, a plurality of sheet rings is formed as one body.

According to the valve apparatus of a sixteenth aspect, intervals among the plurality of sheet rings are formed as one body by connecting with connecting portions.

According to the valve apparatus of a seventeenth aspect, the connecting portions connecting the sheet rings to each other have a through hole forming a flowing path to the lower flowing side from the upper flowing side via a gap between a plug and a sheet ring.

According to the valve apparatus of an eighteenth aspect, the connecting portions connecting between each of the sheet rings have a plurality of through holes for functioning as a defuser.

According to the valve apparatus of a nineteenth aspect, the connecting portions connecting each of the sheet rings have cylindrical shape in which a through hole is formed at the side wall.

According to the valve apparatus of a twentieth aspect, a valve apparatus comprises: a valve main body having a tube path to be controlled by open/close thereof; a plug which has a guide hole and which is located in the valve main body to control open/close of the tube path; a stem connected with the plug and for moving slidably the plug; and a plug guide formed engageably with the guide hole of the plug, and provided freely around the bottom of the valve main body.

According to the valve apparatus of a twenty first aspect, a bypass hole is provided to discharge fluid, which is stored in a space formed by the plug guide and the guide hole when the plug guide and the guide hole are engaged with each other, outside said space.

According to the valve apparatus of a twenty second aspect, a lubricant is provided to an engaging surface of at least one of the plug guide and the guide hole.

In addition, there can be provided a valve apparatus comprising: a valve casing which has a flowing path to be controlled open/close, and which forming the flowing path as the first side flowing path and the second side flowing path; a plug installed in this valve casing, for controlling the open/close of the flowing path; a plug guide hole located in the valve casing; and a guide shaft which is provided in the valve casing and engaged into the plug guide hole, for guiding the plug in the axis direction; wherein a space portion is formed at the tip end of the plug guide shaft in the plug guide hole, and wherein a fluid escaping groove for connecting the space portion in the plug guide hole with the second side flowing path can be formed between the plug guide hole and the guide shaft, along with the axis direction.

Furthermore, the fluid escaping groove can be formed as a different sectional shape from the inner surface of the plug guide hole or the outer peripheral surface of the guide shaft.

Moreover, the fluid escaping groove may be made by at least one groove which is formed at the inner surface of the plug guide hole or at the outer surface of the guide shaft along with the axis direction.

Further, an engaging convex portion for allowing an open/close movement in the axis direction by engaging with the fluid escaping groove, and for preventing the rotation of the plug can be formed at the plug guide hole or the guide shaft.

In addition, a plurality of the fluid escaping grooves are formed on the guide shaft along the axis direction, and the open/close movement is allowed by engaging with one of the fluid escaping grooves, and an engaging convex portion for preventing the rotation of the plug can be attached to the plug guide hole.

BRIEF DESCRIPTION OF THE DRAWINGS

The above and further objects and novel features of the invention will more fully appear from the following detailed description when the same is read in connection with the accompanying drawings.

FIG. 12 is longitudinal sectional views of valve apparatus according to the sixth embodiment of the present invention.

FIG. 18 is a comparing view showing a relation between the thrust force characteristic and the opening degree in the valve apparatus of FIG. 16 and a conventional valve apparatus.

FIG. 34 is a transverse sectional view showing a main portion of the valve apparatus according to the twentieth embodiment of the present invention.

FIG. 35 is a transverse sectional view showing a main portion of the valve apparatus according to the twenty first embodiment of the present invention.

FIG. 36 shows transverse sectional views showing guide shafts according to the twenty second embodiment of the present invention.

FIG. 40(*a*) is a view showing a fluid flowing by the plug of FIG. 39, and FIG. 40(*b*) is a characteristic view showing a relation between the thrust force generated by the fluid flowing and the opening degree.

DETAILED DESCRIPTION OF THE PREFERRED EMBODIMENT

Preferred embodiments of the invention will now be described referring to the accompanying drawings hereinbelow.

Embodiment 1

Figure 1:
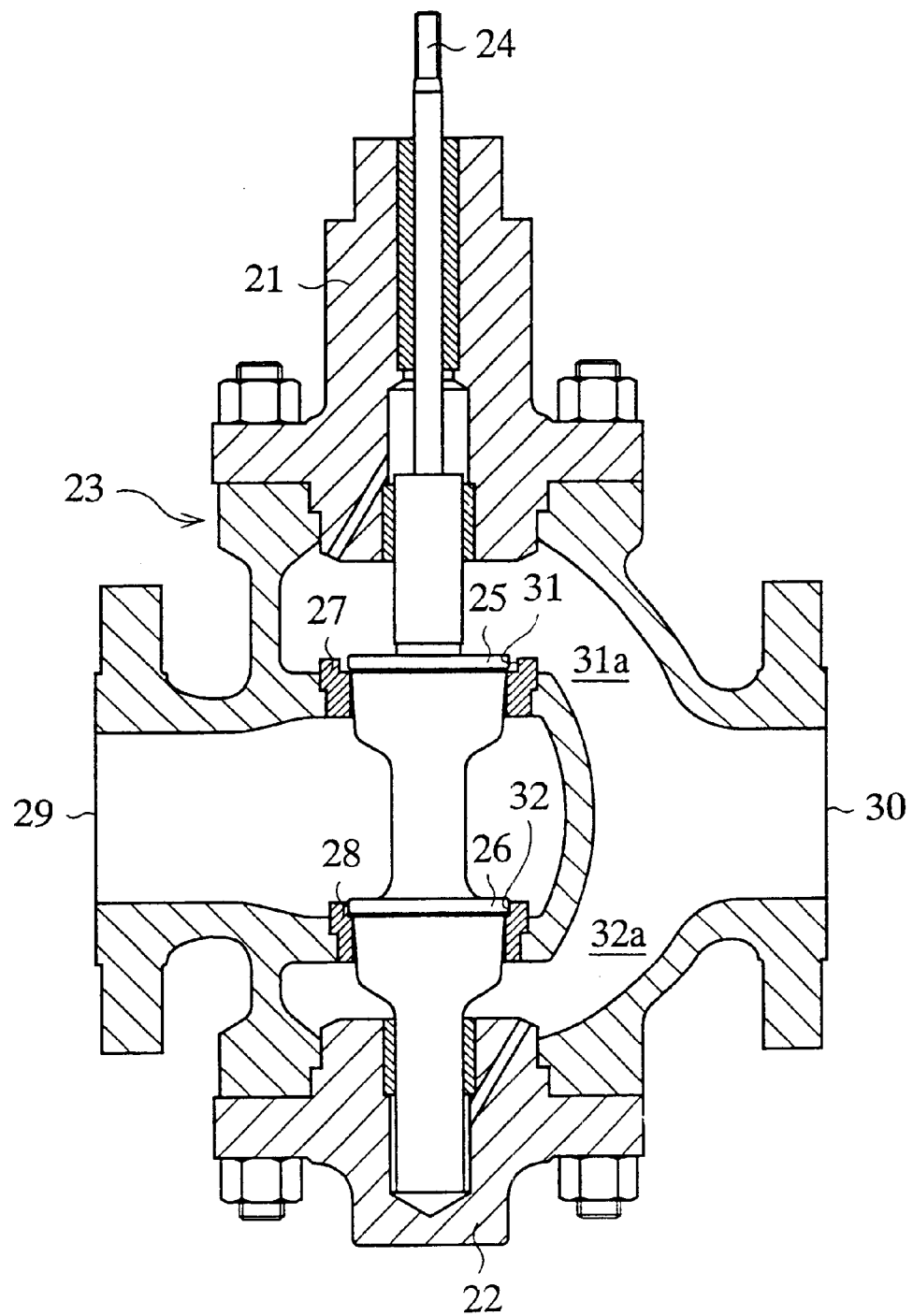
FIG. 1 is a sectional view of a valve apparatus according to the first embodiment of the present invention.

FIG. 1 is a sectional view of a valve apparatus according to the present invention, and in this figure, a reference numeral 21 denotes an upper cover of the valve apparatus, 22 illustrates a lower cover, 23 shows a valve case provided between the upper cover 21 and the lower cover 22. A reference numeral 25 represents an upper plug, and 26 indicates a lower plug. The upper plug 25 and the lower plug 26 are provided to a valve shaft 24 so as to make the same axis, and are shifted in the upper and lower directions along with the valve shaft 24. A reference numeral 27 denotes an upper sheet ring making a pair with the upper plug 25, and 28 illustrates a lower sheet ring making a pair with the lower plug 26. A reference numeral 29 shows an inflow opening of the valve case 23, and 30 represents an outflow opening of the valve case 23. A reference numeral 31 indicates an upper port section defined by the upper sheet ring 27, and 32 denotes a lower port section defined by the lower sheet ring 28. A reference numeral 31a illustrates an upper current path in which a fluid flows from the upper port section 31, and 32a shows a lower current path in which a fluid from the lower port section 32 flows.

In this first embodiment, the lower current path 32a is narrowly formed such that the flow of fluid here is smaller by only a predetermined value than the flow of fluid flowing the upper current path 31a.

Next, the description will be made about operations.

The fluid flows into the valve case 23 from the inflow opening 29, and then out from the outflow opening 30. In the case that the amount of lift is 0%, i.e., the upper plug 25 and the upper sheet ring 27 are closely engaged and the lower plug 26 and the lower sheet ring 28 are closely engaged with each other, there is no inflow and outflow of the fluid.

When the upper plug 25 and the lower plug 26 are shifted to the upper direction by the valve shaft 24, the fluid flowing in from the inflow opening 29 flows in the upper current path 31a via the upper port section 31, and also flows in the lower current path 32a via the lower port section 32. The fluid passed in the upper current path 31a and the lower current path 32a flows to the outside from the outflow opening 30.

Figure 2:
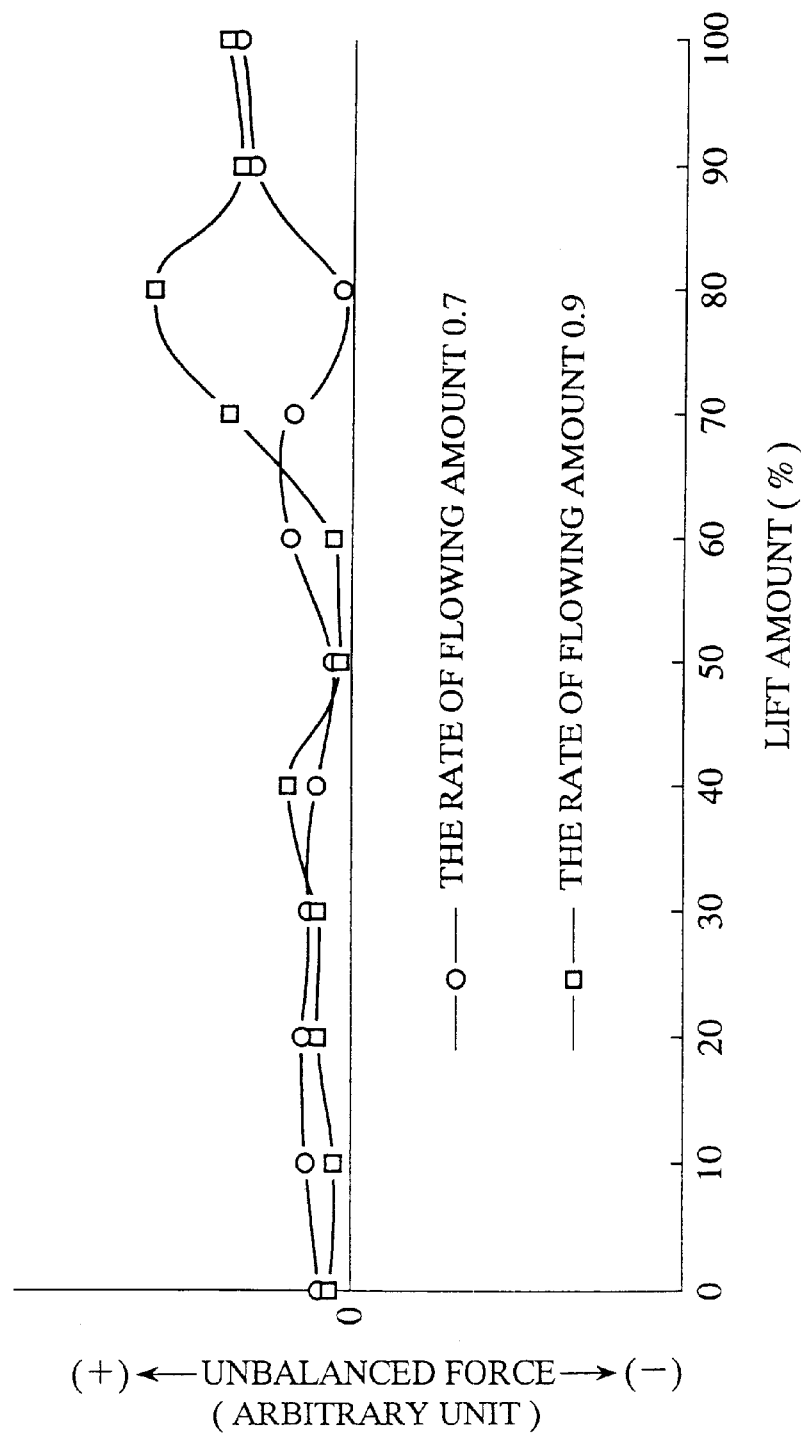
FIG. 2 is a view showing a relation between the lift amount and the unbalance power according to the first embodiment of the present invention.

FIG. 2 is a view showing a relation between the lift amount and the unbalance power according to the first embodiment of the present invention. In the figure, in the case that the flow of the upper current path 31a assumes 1.0, a mark O shows a case that the flow ratio of the lower current path 32a assumes 0.7, and a mark □ shows a case that the flow ratio of the lower current path 32a assumes 0.9. Both the unbalance powers are developed stably with small values having the positive direction between the lift amount 0% and 60%. When the lift amount becomes 70%, the both unbalance powers are increased a little in the positive direction. When the lift amount becomes 80%, the unbalance power becomes close to level O in the case that the flow ratio of the lower current path 32a is 0.7 (mark O), and the unbalance power becomes a large value having the positive direction in the case that the flow ratio of the lower current path 32a is 0.9 (mark □). Although there is not shown in FIG. 2, when the flow ratio of the lower current path 32a is 0.7 or below, the unbalance power changes into the negative direction from the positive direction at 80% of the lift amount. In addition, when the flow of the lower current path 32a is 0.9 or more, if the lift amount goes over 80%, the unbalance power attains a large value having still the positive direction. Therefore, in the case that the flow of the upper current path 31a is assumed as 1.0, if the flow ratio of the lower current path 32a is set to a range of 0.7 to 0.9, the unbalance power is maintained a positive small value in all the lift amount 0% to 100%.

Since the operational device (not shown) drives the valve shaft 24 in the opposite direction of the unbalance power direction to keep the valve opening degree as a predetermined value, the control of the operational device becomes unstable when the unbalance power direction changes into the positive direction from the negative direction, or into the negative direction from the positive direction. In other words, the control of the operational device develops stably, if the unbalance power keeps a small value having either the positive direction or the negative direction in all ranges of the lift amount 0% to 100%. As mentioned above, a condition satisfying this is to set the flow ratio of the upper current path 31a:lower current path 32a to from 1.0:0.7 to 1.0:0.9.

In this valve apparatus according to the embodiment 1, to satisfy the flow of the upper current path 31a:the flow of the lower current path 32a=1.0:0.7 to 1.0:0.9, the minimum sectional area Portion in the lower current path 32a is set smaller than the minimum sectional area portion in the upper current path 31a by only a predetermined value. The fluid flowing into the valve case 23 from the inflow opening 29 is separated into two flowing as upper and lower portions. One flows in the upper current path 31a via the upper port section 31. The other flows in the lower current path 32a via the lower port section 32. At this time, the upper current path 31a and the lower current path 32a are formed such that the flow of the upper current path 31a:the flow of the lower current path 32a=1.0:0.7 to 1.0:0.9 is satisfied.

For instance, if the upper current path 31a and the lower current path 32a are formed such that the ratio between these sectional areas becomes 1.0:0.7 to 1.0:0.9, the flow of the upper current path 31a:the flow of the lower current path 32a=1.0:0.7 to 1.0:0.9 can be satisfied.

As described above, according to the embodiment 1, since the ratio of the amount of both the upper and lower flowing can be set as an optimum value, the unbalance power can be maintained as a small value having one direction in all over the lift amount.

Embodiment 2

Figure 3:
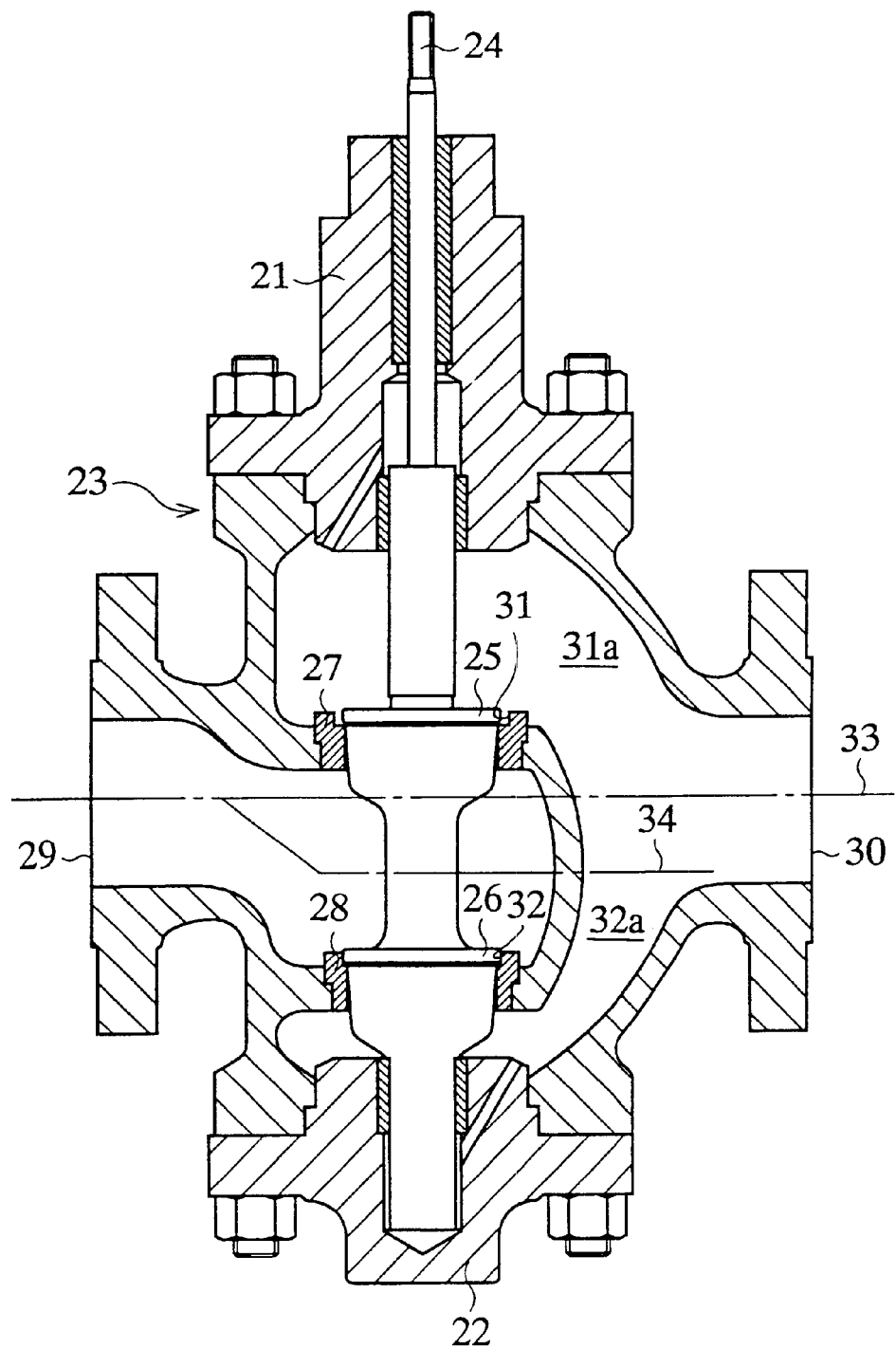
FIG. 3 is a sectional view of a valve apparatus according to the second embodiment of the present invention.

FIG. 3 is a sectional view of a valve apparatus according to the second embodiment of the present invention, and in the figure, the reference numeral 21 denotes the upper cover, 22 illustrates the lower cover, 23 shows the valve case, 24 represents the valve shaft, 25 indicates the upper plug, 26 denotes the lower plug, 27 illustrates the upper sheet ring, 28 shows the lower sheet ring, 29 represents the inflow opening, 30 indicates the outflow opening, 31 denotes the upper port section, 32 illustrates the lower port section, 31a shows the upper current path, and 32a represents the lower current path. These are the same or similar parts as shown in FIG. 1, so that the description will be omitted.

A reference numeral 33 denotes a symmetrical center axis of the valve apparatus according to this embodiment 2, and 34 illustrates the center axis between the upper plug and the lower plug 26 in a full close condition.

In this embodiment 2, the upper plug 25 and the lower plug 26 are provided such that the center axis 34 of the current path at the inflow side is positioned lower than the symmetrical center axis 33 making a line between the center of the inflow opening 29 and the center of the outflow opening of the valve apparatus. As the result, the sectional area of the lower current path 32a is smaller than the sectional area of the upper current path 31a by only a predetermined value. If this predetermined value is set to the optimum value, the flow of the upper current path 31a:the flow of the lower current path 32a=1.0:0.7 to 1.0:0.9 can be satisfied.

Next, the description will be made of the operation.

The fluid flowing into the valve case 23 from the inflow opening 29 is separated into two flowings as upper and lower portions. One flows in the upper current path 31a via the upper port section 31, and the other flows in the lower current path 32a via the lower port section 32. At this time, since the sectional area of the lower current path 32a is smaller than the sectional area of the upper current path 31a by the predetermined value, the flow of the upper current path 31a:the flow of the lower current path 32a=1.0:0.7 to 1.0:0.9 is satisfied. As described above, according to the embodiment 2, since the ratio of the amount of both the upper and lower flowing can be set as an optimum value, the unbalance power can be maintained as a small value having one direction in all over the lift amount.

Embodiment 3

Figure 4:
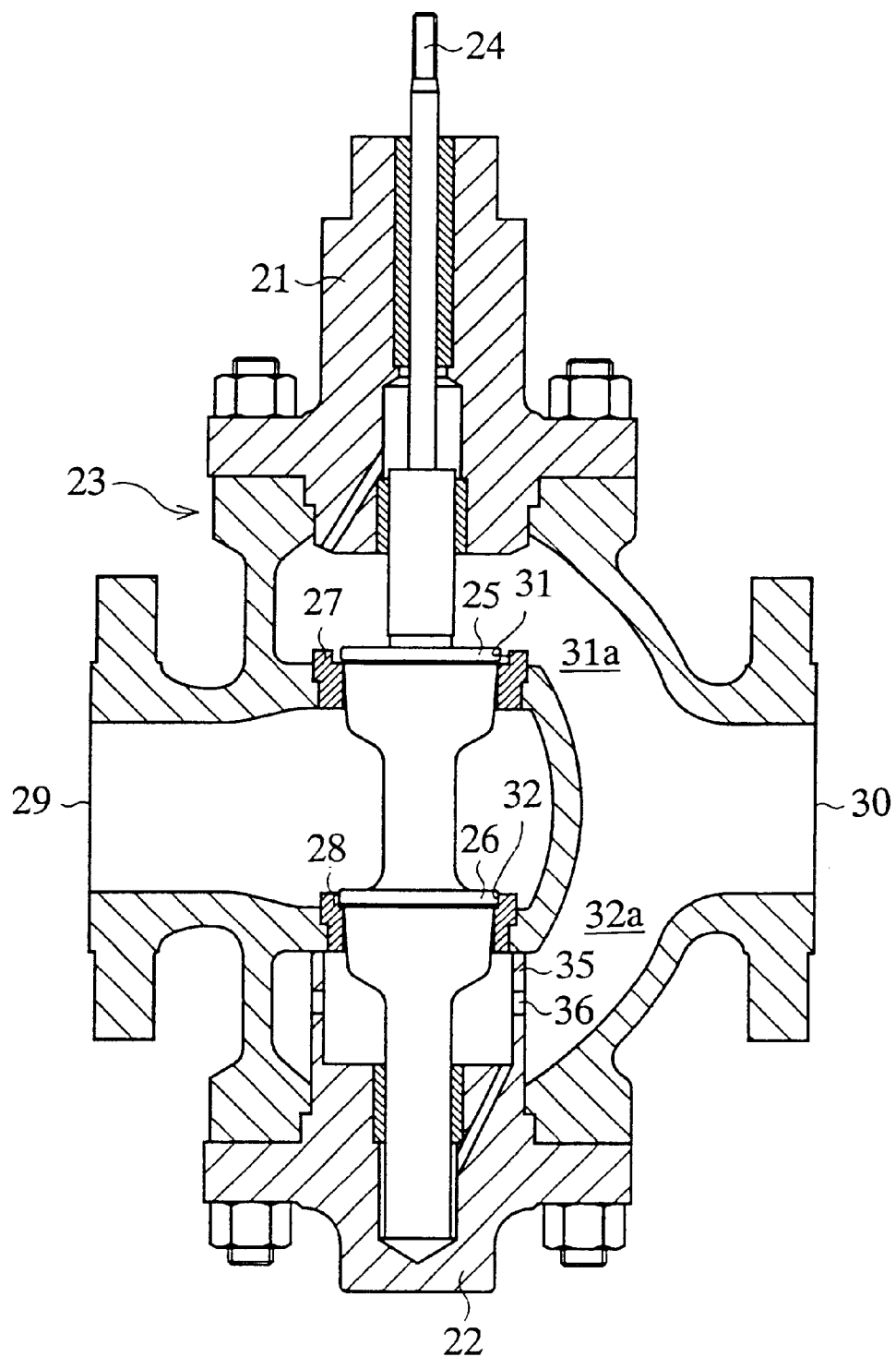
FIG. 4 is a sectional view of a valve apparatus according to the third embodiment of the present invention.

FIG. 4 is a sectional view of a valve apparatus according to the third embodiment of the present invention, and the same parts or similar parts as of FIG. 1 have the same reference numerals, thereby omitting repetitious description. In FIG. 4, a reference numeral 35 denotes a first cage (resistive body) which is provided between the lower cover 22 and the lower sheet ring 28, and has a cylindrical shape for example. FIG. 4 illustrates an example in which the periphery of the upper end portion of the lower cover 22 is extended until the lower end portion of the lower sheet ring 28, as the first cage 35. Otherwise, the first cage 35 is formed individually, and may be attached to the lower cover 22 or the lower sheet ring 28 by welding. A reference numeral 36 shows a first side hole which is provided to the side surface of the first cage 35. The first side hole 36 may be formed only one, or plurally. The first side hole 36 operates such that the flow of the lower port section 32 becomes smaller than that of the upper port section 31.

Next, the description will be made of the operation.

In the valve apparatus according to this embodiment 3, the first cage 35 is provided between the lower cover 22 and the lower sheet ring 28, to satisfy the flow of the upper current path $31a$:the flow of the lower current path $32a$=1.0:0.7 to 1.0:0.9. The fluid flowing into the valve case 23 from the inflow opening 29 is separated into two flowings as upper and lower portions, and one flows into the upper current path $31a$ from the upper port section 31 via a gap between the upper plug 25 and the upper sheet ring 27. The other flows into the first cage 35 via a gap between the lower plug 26 and the lower sheet ring 28, and sojourns temporarily, then flows in the lower current path $32a$ via the first side hole 36 provided at the side surface of the first cage 35. The flow of the upper current path $31a$:the flow of the lower current path $32a$=1.0:0.7 to 1.0:0.9 is satisfied by adjusting the opening area of this first side hole 36. Other operations are the same as that of the embodiment 1.

As described above, according to the embodiment 3, since the ratio of the amount of both the upper and lower flowing can be set as an optimum value, the unbalance power can be maintained as a small value having one direction in all over the lift amount.

Embodiment 4

Figure 5:
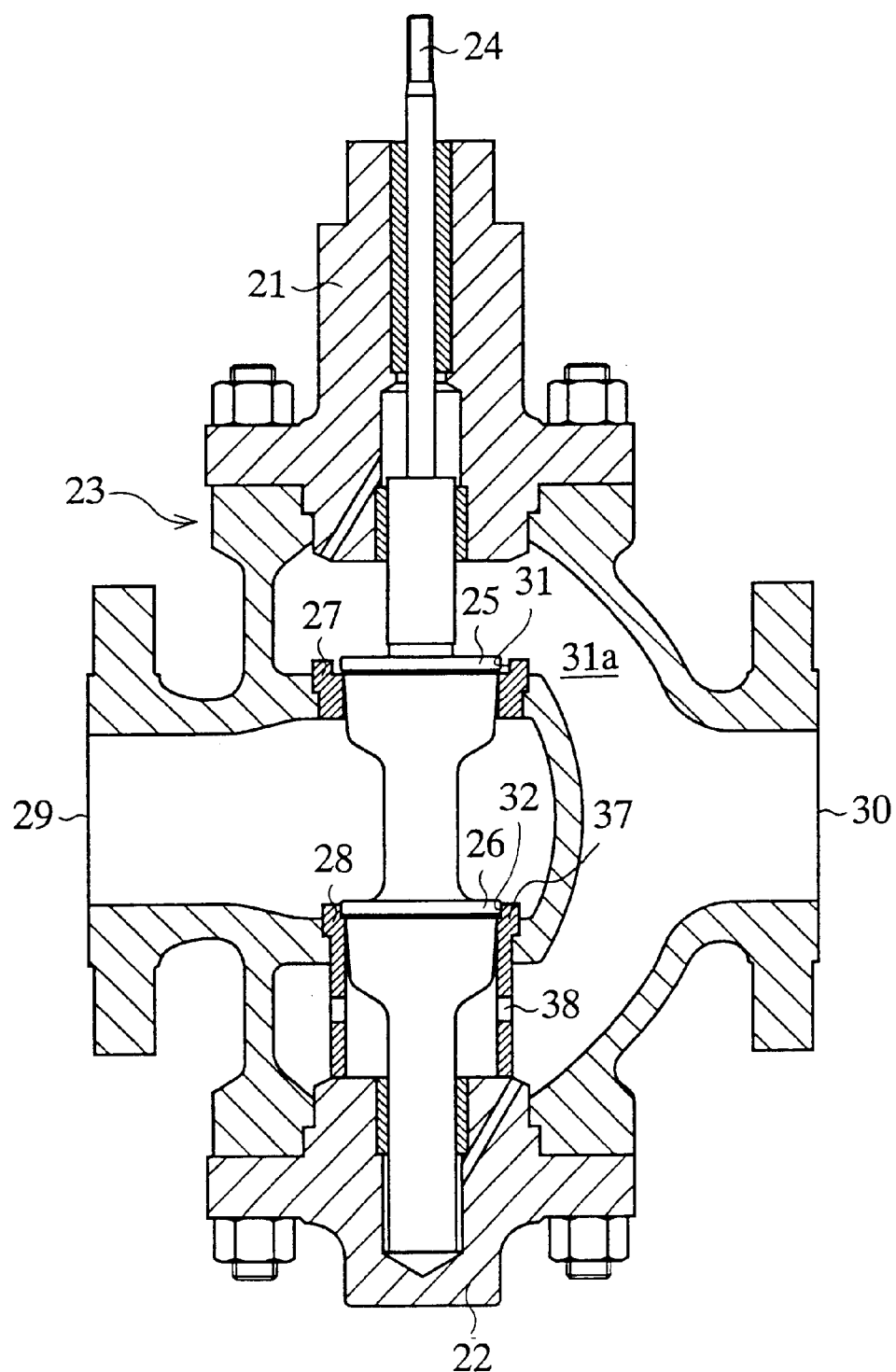
FIG. 5 is a sectional view of a valve apparatus according to the fourth embodiment of the present invention.

FIG. 5 is a sectional view of a valve apparatus according to the fourth embodiment of the present invention, and the same parts or similar parts as of FIG. 4 have the same reference numerals, thereby omitting repetitious description. In FIG. 5, a reference numeral 37 denotes a second cage (resistive body) which is formed as a one body with the lower sheet ring 28. The second cage has a cylindrical shape for example. A reference numeral 38 represents a second side hole formed at the side surface of the second cage 37. The second hole 38 is formed only one, or plurally. The opening area of the second side hole 38 is set such that the flow of the upper current path $31a$:the flow of the lower current path $32a$=1.0:0.7 to 1.0:0.9 is satisfied.

Next, the description will be made of the operation.

The fluid flown into the valve case 23 from the inflow opening 29 is separated into two flowings as upper and lower portions, and one flows into the upper current path $31a$ via the upper port section 31. The other flows into the second cage 37 via the lower port section 32, and sojourns temporarily, then flows in the lower current path $32a$ via the second side hole 38 provided at the side surface of the second cage 37. The opening area of the second side hole 38 is set such that the flow of the upper current path $31a$:the flow of the lower current path $32a$=1.0:0.7 to 1.0:0.9 is satisfied.

As described above, according to the embodiment 4, since the ratio of the amount of both the upper and lower flowing can be set as an optimum value, the unbalance power can be maintained as a small value having one direction in all over the lift amount.

Embodiment 5

Figure 6:
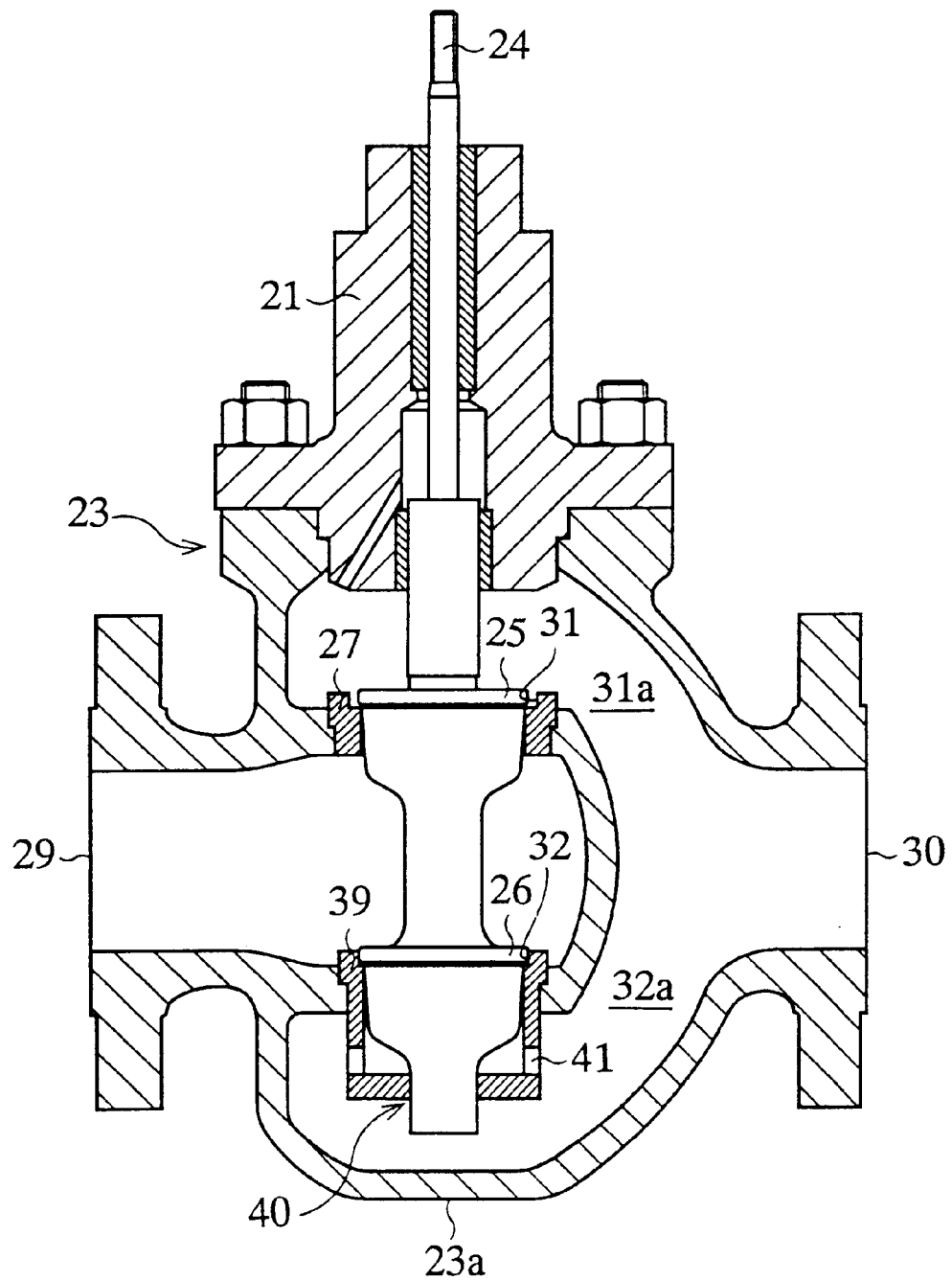
FIG. 6 is a sectional view of a valve apparatus according to the fifth embodiment of the present invention.

FIG. 6 is a sectional view of a valve apparatus according to the fifth embodiment of the present invention, and the same parts or similar parts as of FIG. 1 have the same reference numerals, thereby omitting repetitious description. In FIG. 6, a reference numeral 39 denotes a guide member for guiding the lower plug 26, and 40 illustrates a side hole formed at the side surface of the guide member 39.

The guide member 39 has a cylindrical shape having a bottom, and the guide hole 40 is formed at the bottom, as well as the side hole 41 is formed at the side surface. The guide member 39 shown in FIG. 6 is also functioned as the lower sheet ring. The guide member 39 is one for guiding the lower end portion of the lower plug 26 which is being passed into the guide hole 40 through, whereby the minimization and light weight of the apparatus can be realized with the lower cover being disused. The guide member 39 is not limited as one shown in FIG. 6, and may have a variety of patterns described hereinafter.

In addition, the side hole 41 formed at the side surface of the guide member 39 operates such that the flow of the lower north section 32 becomes smaller than that of the upper port section 31.

Next, the description will be made of the operation.

In the valve apparatus according to this embodiment the guide member 39 for guiding the lower plug 26 is provided to satisfy the flow of the upper current path $31a$:the flow of the lower, current path $32a$=1.0:0.7 to 1.0:0.9. The fluid flowing into the valve case 23 from the inflow opening 29 is separated into two flowings as upper and lower portions, and one flows into the upper current path $31a$ via the upper port section 31. The other flows into the guide member 39 via the lower port section 32, and sojourns temporarily, then flows in the lower current path $32a$ via the side hole 41 provided at the side surface of the guide member 39. The flow of the upper current path $31a$:the flow of the lower current path $32a$=1.0:0.7 to 1.0:0.9 is satisfied by adjusting the opening area of this side hole 41.

Next, the description will be made of the variety of patterns for the guide member 39.

Figure 7:
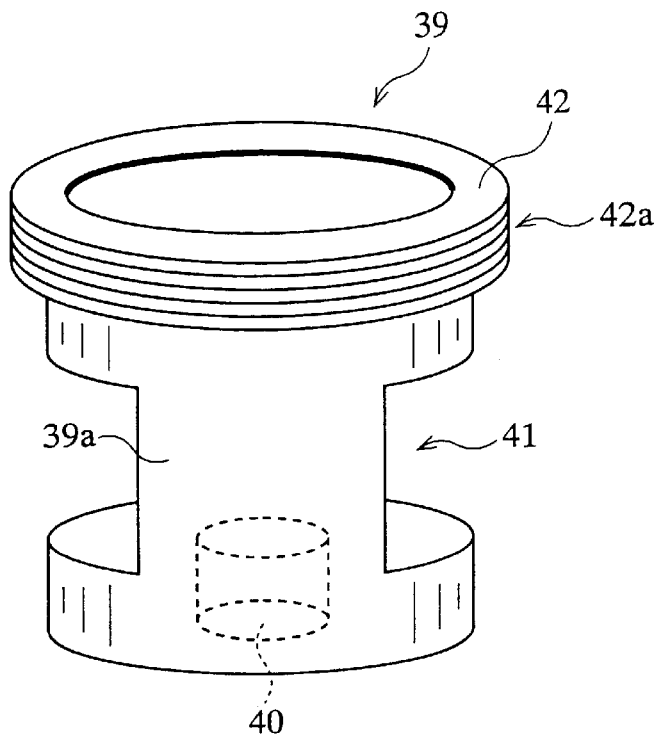
FIG. 7 is an inclined view showing an example of a guide member.

FIG. 7 is an inclined view of an example of the guide member 39, and in this figure, a reference numeral $39a$ indicates a guide member main body, 40 denotes a guide hole formed at the bottom of the guide member main body $39a$, 41 illustrates a side hole formed at the side surface of the guide member main body $39a$, 42 shows a sheet ring portion which also functions as the lower sheet ring making a pair with the lower plug 26. A reference numeral $42a$ represents a screw groove formed around at the periphery of the sheet ring portion 42.

Figure 8:
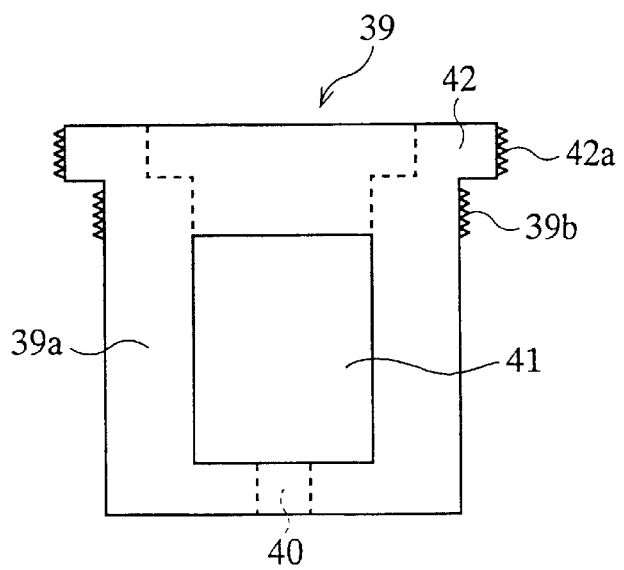
FIG. 8 is a side view showing an example of the guide member.

FIG. 8 is a side view showing an example of the guide portion member 39, and in this figure, a reference numeral $39a$ indicates a guide member main body, 40 denotes a guide hole formed at the bottom of the guide member main body $39a$, 41 illustrates a side hole formed at the side surface of the guide member main body $39a$, 42 shows a sheet ring portion which also functions as the lower sheet ring making a pair with the lower plug 26. A reference numeral $42a$ represents a screw groove formed around at the periphery of the sheet ring portion 42, $39b$ indicates a screw groove formed at the upper portion of the guide member main body $39a$.

Figure 9:
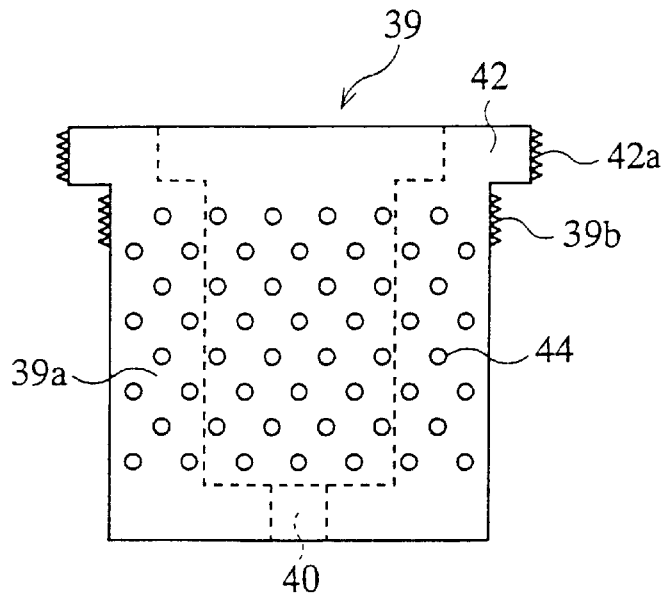
FIG. 9 is a side view showing another example of the guide member.

FIG. 9 is a side view showing another example of the guide member 39 shown in FIG. 8, and in this figure, a reference numeral 39a indicates a guide member main body, 40 denotes a guide hole, 42 shows a sheet ring portion, 42a and 39b represent screw grooves, which are the same or similar to those shown in FIG. 8, thereby omitting the descriptions.

A reference numeral 44 denotes a plurality of small holes formed at the guide member main body 39a, and the number thereof is set such that the total of the area becomes approximately the same as of the side hole 41 shown in FIG. 8.

Figure 10:
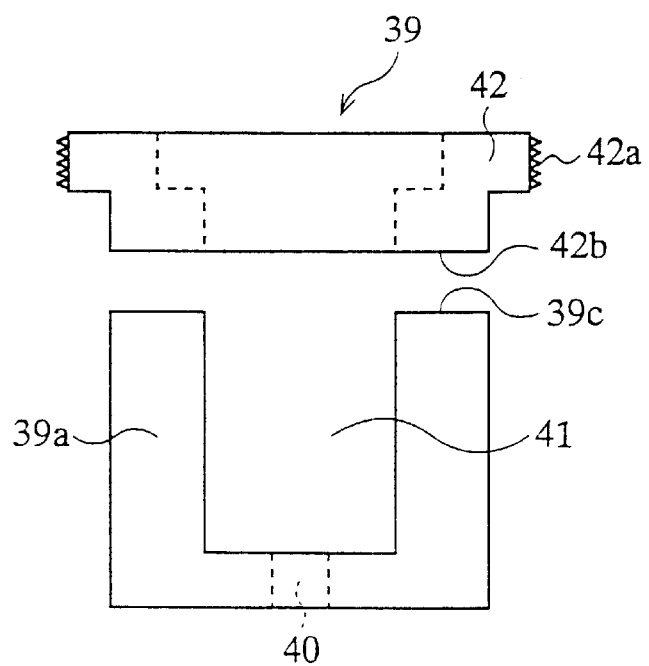
FIG. 10 is a side view showing another example of the guide member.

FIG. 10 is a side view showing another example of the guide member 39 shown in FIG. 8, and in this figure, a reference numeral 39a indicates a guide member main body, 40 denotes a guide hole, 42 shows a sheet ring portion, which are the same or similar to those shown in FIG. 8, thereby omitting the descriptions.

In the guide member 39 shown in FIG. 10, the guide member main body 39a and the sheet ring portion 42 are respectively formed, and an upper surface 39c of the guide member 39a and a lower surface 42b of the sheet ring portion 42 are attached by welding for example to make one body, thus the guide member 39 is formed.

Figure 11:
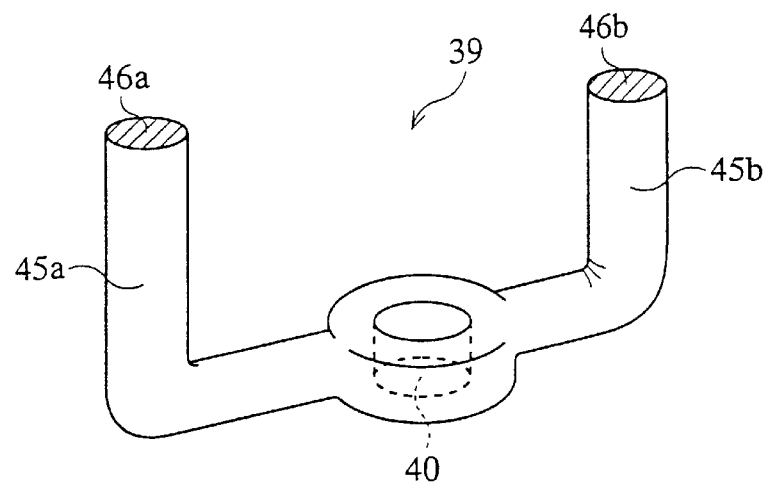
FIG. 11 is an inclined view showing a further example of the guide member.

FIG. 11 is an inclined view showing an example of the guide member 39 according to another embodiment which is different from the above-mentioned example, and in this figure, reference numerals 45a and 45b are two limb portions in which there is a U-shape forming the guide member main body. The connecting portion of these two limb portions 45a and 45b is formed so as to make a bulge, and the guide hole 40 is formed in this connecting portion.

In the case that the guide member 39 shown in FIG. 11 is used, the lower sheet ring making a pair with the lower plug 26 of the valve case 23 is provided and the upper end surfaces 46a and 46b of the two limb portions are attached to this lower sheet ring in the valve apparatus according to the fifth embodiment shown in FIG. 6.

As mentioned above, according to this embodiment 5, since the guide member for guiding the lower plug is provided, the lower cover is not required, whereby the minimization and the light weight of the apparatus can be actualized. In addition, since the ratio of the amount of both the upper and lower flowing can be set as an optimum value, the unbalance power can be maintained as a small value having one direction in all over the lift amount.

Embodiment 6

FIG. 12 shows sectional views of valve apparatus according to the sixth embodiment of the present invention.

In the figure, a reference numeral 51 denotes a valve main body (valve case), 52 illustrates an inflow opening of the valve main body 51, 53 shows an outflow opening of the valve main body 51, 54 represents a lower cover fixed to the valve main body 51 by bolts, 55 indicates an upper cover fixed to the valve main body 51 by bolts, 56 denotes a gasket for keeping water tightness and airtightness between the upper current side and the lower current side in the valve main body 51. A reference numeral 58 denotes an upper outflow direction changing chamber (upper current path) which is connected with the outflow opening 53 of the fluid, 59 illustrates a lower outflow direction changing chamber (lower current path) which is connected with the outflow opening 53 of the fluid, wherein the upper outflow direction changing chamber 58 has a structure that it is extended in the longitudinal direction relative to the lower outflow direction changing chamber 59 as shown in FIG. 12(b). In addition, the upper outflow direction changing chamber 58 has a larger volume than that of the lower outflow changing chamber 59. The ratio of these volumes is, for instance, approximately 8:2–7:3. A reference numeral 60 represents a first plug (upper plug), 61 indicates a second plug (lower plug) which is formed as one body with the first plug 60. A reference numeral 71 denotes a sheet ring for performing the stop of the flowing path between the upper outflow changing chamber 58 and the inflow opening 52 of the fluid, and between the lower outflow changing chamber 59 and the inflow opening 52 of the fluid.

The sheet ring 71 provides a first sheet ring organizing portion (upper sheet ring) 71a which is closely attached with the first plug 60, and a second sheet ring organizing portion (lower sheet ring) 71b which is closely attached with the second plug 61. In addition, a concave (or convex) portion 71g for rotating the sheet ring 71 (see FIG. 13) is formed on the upper end portion of the first sheet ring organizing portion 71a, to detach easily by rotating the sheet ring 71 with reference to the valve main body 51.

In addition, the sheet ring 71 is fixed to the valve main body 51 by screws. A reference numeral 64 denotes a plug upper portion which is formed as one body with the first plug 60 and the second plug 61, 65 illustrates a plug driving rod (valve shaft) connected with the plug upper portion 64. The first plug 60 and the second plug 61 are vertically shifted up by a diaphragm operational device which is not shown, whereby the upper current side and the lower current side are made communicable with the gap being generated with reference between the plugs and the sheet ring 71.

A reference numeral 74 represents a concave surface having a streamlined shape which is formed at the bottom of the upper cover 55 making an upper inside surface of the upper outflow direction changing chamber 58. This concave surface 74 having the streamlined shape is formed so as to continuously connect with a curved surface which belongs to a side wall of the upper outflow direction changing chamber 58, and has a continuity with reference to the curved surface which the side wall has, such that a disorder generated when the flowing direction of the fluid flown from the gap generated between the first plug 60 and the first sheet ring organizing portion 71a is changed into the direction to the outflow opening 53 along with the side wall is restrained.

Figure 13:
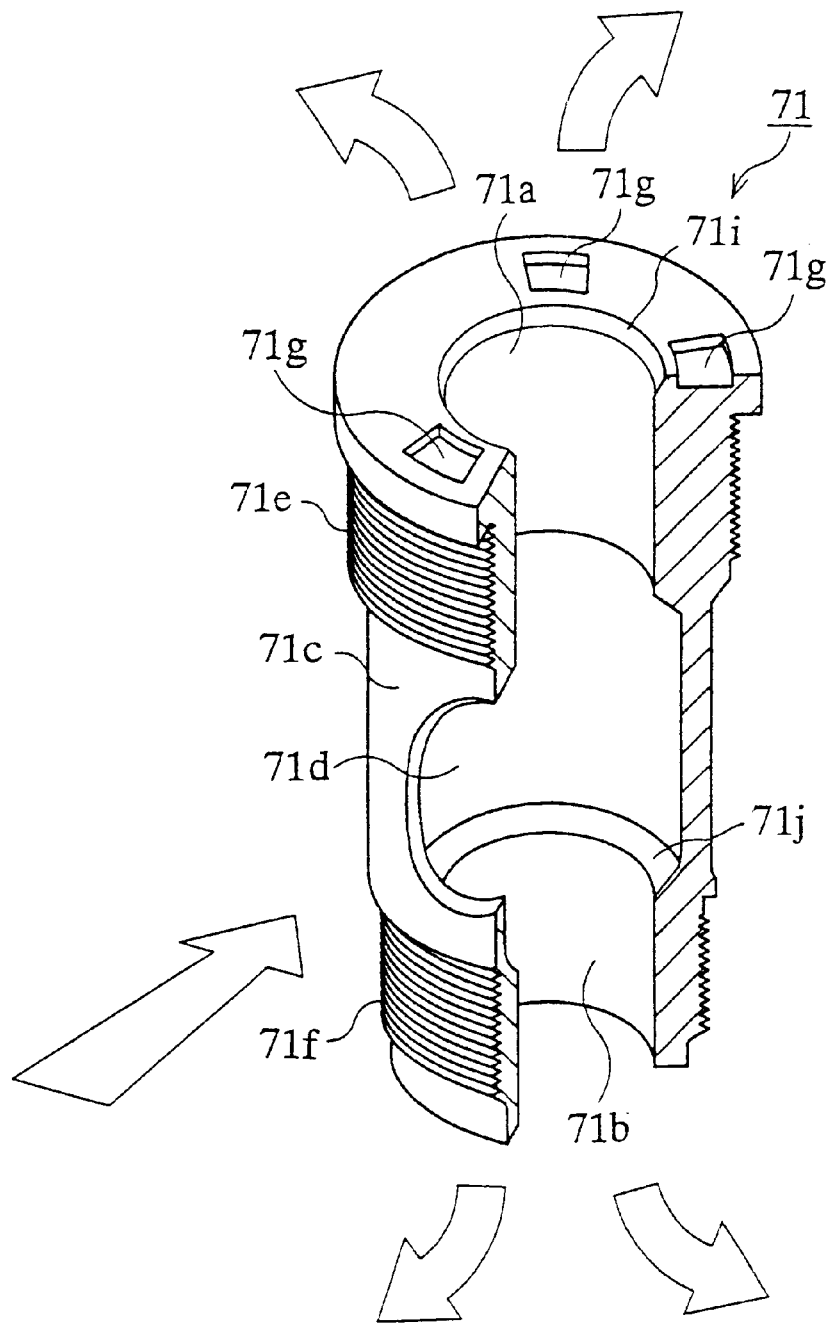
FIG. 13 is an inclined sectional view showing a sheet ring of the adjustment valve according to the sixth embodiment of the present invention.
Figure 14:
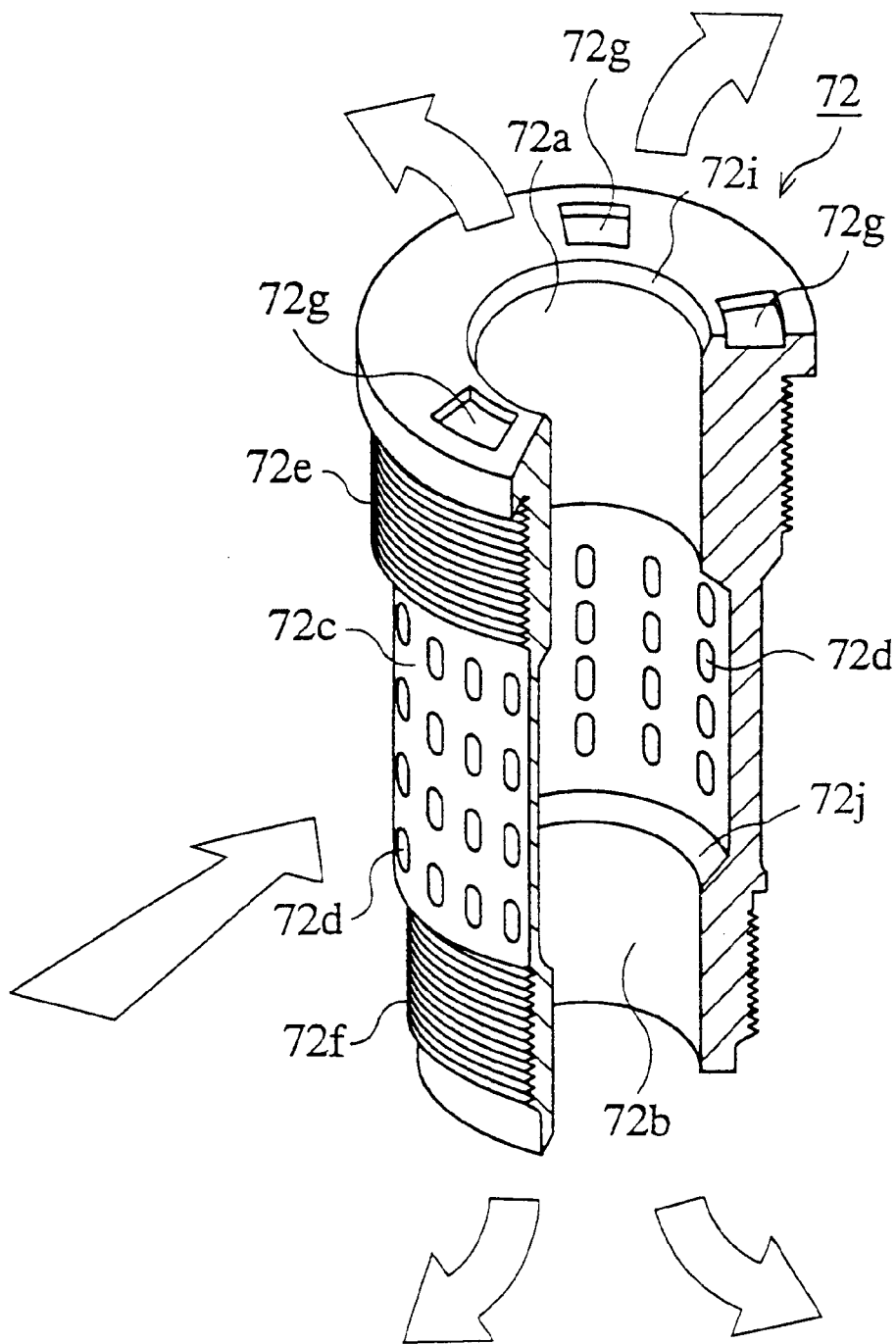
FIG. 14 is an inclined sectional view showing another example of a sheet ring of the adjustment valve according to the sixth embodiment of the present invention.
Figure 15:
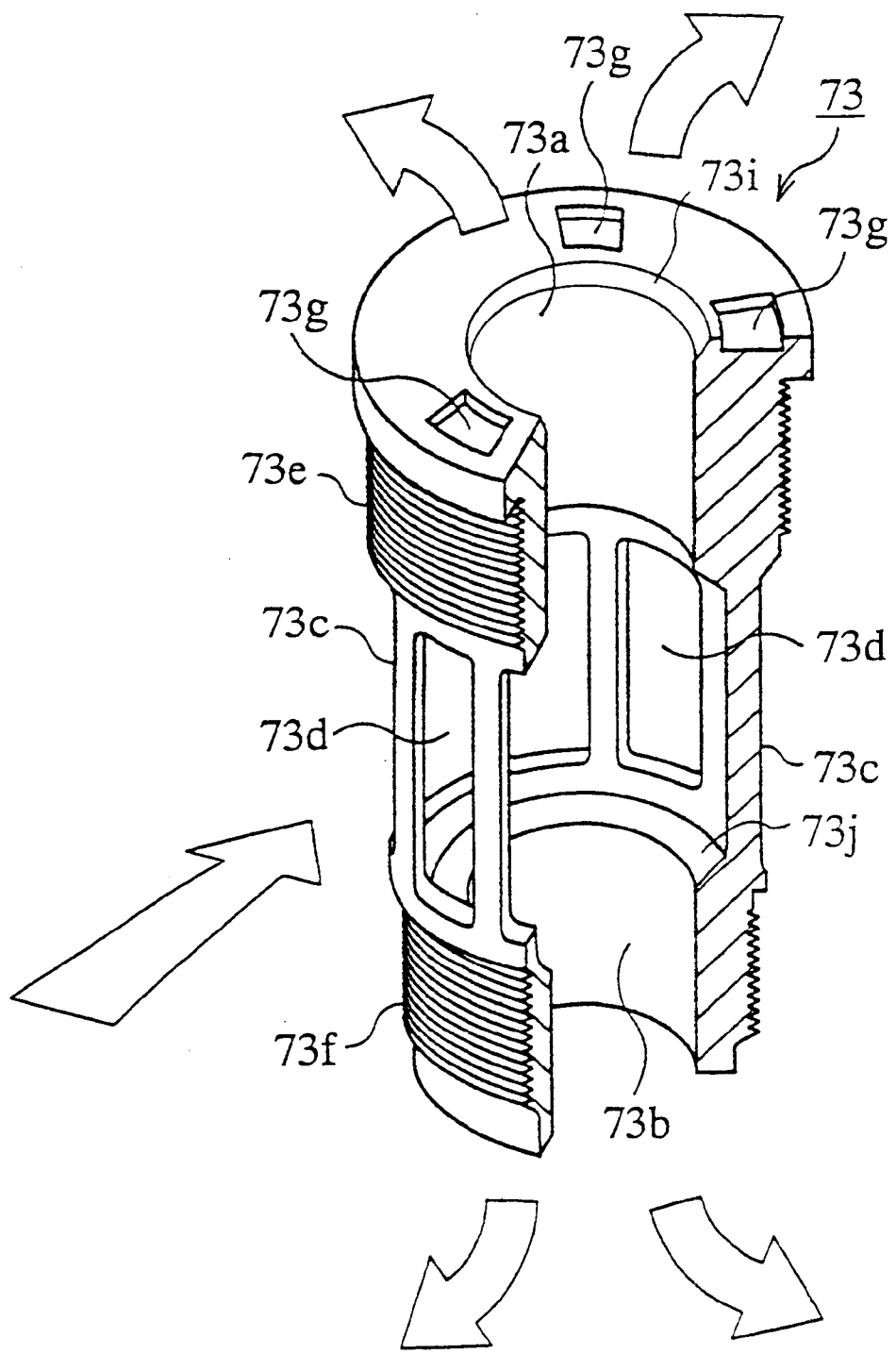
FIG. 15 is an inclined sectional view showing further example of a sheet ring of the adjustment valve according to the sixth embodiment of the present invention.

FIG. 13 is an inclined sectional view showing a structure of the sheet ring 71, and FIG. 14 and FIG. 15 are inclined sectional views showing other examples of sheet ring. The sheet ring 71 shown in FIG. 13 has the first sheet ring organizing portion 71a which is closely attached with the first plug 60, and the second sheet ring organizing portion 71b which is closely attached with the second plug 61, and the first sheet ring organizing portion 71a and the second sheet ring organizing portion 71b are connected and formed as one body by a connecting portion 71c having a cylindrical shape. The connecting portion 71c may be made of the same material as the first sheet ring organizing portion 71a and the second sheet ring organizing portion 71b, or different material, and if it is formed by the same material, it is possible to drill by a lathe process as one body. A reference numeral 71d denotes one large aperture hole for guiding the fluid flown from the inflow 52 of the upper current side to the gaps generated between the first plug 60 and the first sheet ring organizing portion 71a, and between the second plug 61 and the second sheet ring organizing portion 71b. In this case, a characteristic of the flowing path can also be adjusted by changing the aperture, figure, and position of the hole 71d. Reference numerals 71e and 71f illustrate male screws for engaging and fixing the sheet ring 71 to female screw portions formed at the side of the valve main body 51.

A reference numeral 71g shows a concave portion for performing a vertical directional install position adjustment of the sheet ring 71 with reference to the valve main body 51 by rotating the sheet ring 71, and the is formed at the upper end surface of the sheet ring 71. This concave portion 71g is engaged with the tip end of an install position adjustment hook which is inserted from the upper side (if it is a convex portion, this convex portion is caught), and the sheet ring 71 is rotated and screwed until a brim under surface 71h is contacted with the valve main body 51, thus the vertical directional install position adjustment of the sheet ring 71 is performed with reference to the valve main body 51.

Reference numeral 71i and 71j represent slants which are formed on inside peripheral edges of the first sheet ring organizing portion 71a and the second sheet ring organizing portion 71b, to improve closeness between the first plug 60 and the second plug 61.

In addition, the sheet ring 72 shown in FIG. 14 has the first sheet ring organizing portion (upper sheet ring) 72a which is closely attached with the first plug 60, and the second sheet ring organizing portion (lower sheet ring) 72b which is closely attached with the second plug 61, and the first sheet ring organizing portion 72a and the second sheet ring organizing portion 72b are connected and formed as one body by a connecting portion 72c having a cylindrical shape. The connecting portion 72c may be made of the same material as the first sheet ring organizing portion 72a and the second sheet ring organizing portion 72b, or different material, and if it is formed by the same material, it is possible to drill by a lathe process as one body. A reference numeral 72d denotes a plurality of holes for guiding the fluid flowing from the inflow 52 of the upper current side to the gaps generated between the first plug 60 and the first sheet ring organizing portion 72a, and between the second plug 61 and the second sheet ring organizing portion 72b. Moreover, the holes 72d have also a function of defuser. Reference numerals 72e and 72f illustrates male screws for engaging and fixing the sheet ring 72 to female screw portions formed at the side of the valve main body 51. A reference numeral 72g shows a concave portion for performing a vertical directional install position adjustment of the sheet ring 72 with reference to the valve main body 51 by rotating the sheet ring 72, and the is formed at the upper end surface of the sheet ring 72. This concave portion 72g is engaged with the tip end of an install position adjustment hook which is inserted from the upper side, and the sheet ring 72 is rotated by rotating the install position adjustment hook, thereby adjusting the screw amount of the sheet ring 72 to the valve main body 51, thus the vertical directional install position adjustment of the sheet ring 72 is performed with reference to the valve main body 51.

Furthermore, the sheet ring 73 shown in FIG. 15 has the first sheet ring organizing portion (upper sheet ring) 73a which is closely attached with the first plug 60, and the second sheet ring organizing portion (lower sheet ring) 73b which is closely attached with the second plug 61, and these first sheet ring organizing portion 73a and the second sheet ring organizing portion 73b are connected and formed as one body by a connecting portion 73c. The connecting portion 73c may be made of the same material as the first sheet ring organizing portion 73a and the second sheet ring organizing portion 73b, or different material, and if it is formed by the same material, it is possible to drill by a lathe process as one body. A reference numeral 73d denotes guiding holes for guiding the fluid flowing from the inflow 52 of the upper current side to the gaps generated between the first plug 60 and the first sheet ring organizing portion 73a, and between the second plug 61 and the second sheet ring organizing portion 73b. Reference numerals 73e and 73f illustrate male screws for engaging and fixing the sheet ring 73 to female screw portions formed at the side of the valve main body 51. A reference numeral 73g shows a concave portion for performing a vertical directional install position adjustment of the sheet ring 73 with reference to the valve main body 51 by rotating the sheet ring 73, and the concave portion is formed at the upper end surface of the sheet ring 73. This concave portion 73g is engaged with the tip end of an install position adjustment hook which is inserted from the upper side, and the sheet ring 73 is rotated by rotating the install position adjustment hook, thereby adjusting the screw amount of the sheet ring 73 to the valve main body 51, thus the vertical directional install position adjustment of the sheet ring 73 is performed with reference to the valve main body 51.

In addition, either male screw portions 71e, 72e and 73e or the male screw portions 71f, 72f and 73f can be omitted in the above-described sheet ring 71, 72 and 73, and the female screw portions which are to be engaged with such omitted male screw portions at the side of the valve main body may not be also provided in accordance with requirement. In the case of this structure, the production of the sheet rings 71, 72 and 73 can be made simple and easy in comparison with the case that both the male screw portions 71e, 72e and 73e and the male screw portions 71f, 72f and 73f are formed.

Next, the description will be made of the operation.

In this valve apparatus, the first plug 60 and the second plug 61 are vertically pushed to the lower direction by a push spring located in the diaphragm operational device generally, and as a result of this, the first plug 60 is closely attached to the first sheet ring organizing portion 71a (72a, 73a) as well as the second plug 61 is closely attached to the second sheet ring organizing portion 71b (72b, 73b), thus the gaps between the upper outflow direction changing chamber 58 and the lower outflow direction changing chamber 59 and the inflow opening 52 are made as closed condition. In this case, if the diaphragm operational device is operated, an upper direction force is generated vertically, and the first plug 60 and the second plug 61 are vertically shifted in the upper direction via the plug driving rod 65. As a result of this, gaps are generated between the first plug 60 and the first sheet ring organizing portion 71a (72a, 73a) and between the second plug 61 and the second sheet ring organizing portion 71b (72b, 73b), thereby forming a flowing path with the gap between the upper outflow direction changing chamber 58 and the lower outflow direction changing chamber 59 and the inflow opening 52 being connected. In this case, the gap size between the first plug 60 and the first sheet ring organizing portion 71a (72a, 73a) and between the second plug 61 and the second sheet ring organizing portion 71b (72b, 73b) can be controlled by the diaphragm operational device, and is adjusted flexibly as a valve opening degree.

Moreover, the fluid flowing into the upper outflow direction changing chamber 58 which is moved up via the gap generated between the first plug 60 and the first sheet ring organizing portion 71a (72a, 73a) flows along with the side wall of the upper outflow direction changing chamber 58, as well as along with the streamlined concave surface 74 which continues to the side wall, and the flowing direction is changed at the upper outflow direction changing chamber 58, thereby flowing from the outflow opening 53. On the other hand, the direction of the fluid flowing into the lower outflow direction changing chamber 59 via the gap generated between the second plug 61 and the second sheet ring organizing portion 71*b* (72*b*, 73*b*) becomes upward in the lower outflow direction changing chamber 59 at his time, to send from the outflow opening 53 to the lower flowing side.

At this time, since the upper outflow direction changing chamber 58 is formed, so as to be extended in the longitudinal direction relative to that of the lower outflow direction changing chamber 59, and has a larger volume than that of the lower outflow direction changing chamber 59, the fluid flowing from the side inflow opening 52 flows into the upper outflow direction changing chamber 58 more than the lower outflow direction changing chamber 59. Owing to this, a pressure for pushing the first plug 60 up becomes stronger than a pressure for pushing the second plug 61 down, and in the case that the diaphragm operational device pushes the first plug 60 and the second plug 61 to upper direction thus a flowing path is generated, the operation is made in the direction that the control of the first plug 60 and the second plug 61 becomes easy. Therefore, the fluid flowing into the upper outflow direction changing chamber 58 flows to lower direction at this time in the upper outflow direction changing chamber 58, thereby flowing to the lower flowing side from the outflow opening 53. At this time, since the streamlined concave surface 74 has continuously connected to the curved surface which belongs to the side wall of the upper outflow direction changing chamber 58, a separating eddy or flowing confusion which are easy to generate when the flowing direction of the fluid is changed in the upper outflow direction changing chamber 58 is restrained, so that an effective flowing is generated, and a high CV value can be achieved, as well as oscillations and an uncontrollable state of the first plug 60, the second plug 61 and the valve main body 51 are prevented, which is often generated by unbalance between pressures operated to the first plug 60 and the second plug 61, whereby the fluid flow can be adjusted stably.

In addition, as the structure of the valve main body 51, since the opening portion when the upper cover 55 is removed is made by only ceiling surface of the upper outflow direction changing chamber 58, the rigidity of the valve main body 51 can be made high, and the minimization including the weight can be achieved.

Furthermore, in the above description, although there is explained that the upper outflow direction changing chamber 58 is extended in the longitudinal direction relative to the lower outflow direction changing chamber 59, it may be formed such that the lower outflow direction changing chamber 59 is extended in the longitudinal direction relative to the upper outflow direction changing chamber 58 so as to have larger volume than that of the upper outflow direction changing chamber 58. Moreover, in such feature, the install direction of the first plug 60 and the second plug 61 becomes reverse direction, so that the sheet rings 71, 72 and 73 are screwed into the valve main body 51 from the lower side, after removing the lower cover from the valve main body 51.

In addition, although the first sheet ring organizing portion 71*a*, the second sheet ring organizing portion 71*b* are formed as one body in the embodiment 6, each of these sheet ring organizing portions may be made independently.

Embodiment 7

Figure 16:
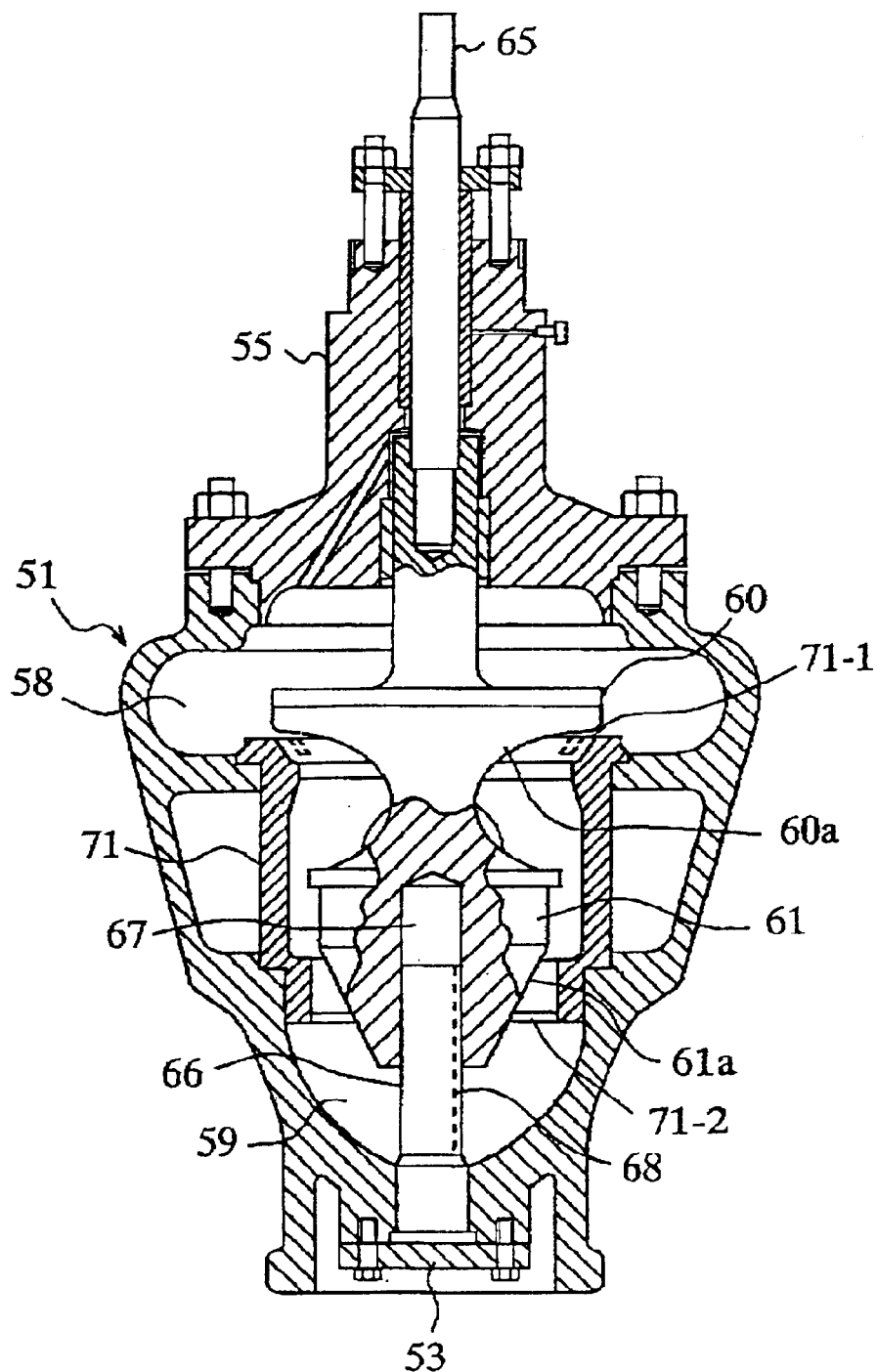
FIG. 16 is a sectional view of a valve apparatus according to the seventh embodiment of the present invention.

FIG. 16 is a sectional view of a valve apparatus according to the seventh embodiment of the present invention, and the same parts or similar parts as of the sixth embodiment in FIG. 12 have the same reference numerals, thereby omitting repetitious description.

In this embodiment 7, a concave curved surface (rapidly extended portion) 60*a* is formed, and a taper surface 61*a* having a conical surface shape is formed on the lower plug 61, as well as the upper plug 60 is made thin and the lower plug 61 is made thick, thus the upper plug 60 and the lower plug 61 are made different from each other.

In other words, by making the upper plug 60 and the lower plug 61 different from each other as mentioned above, the upper flow of the fluid toward the upper outflow direction changing chamber 58 becomes larger than the lower flow of the fluid toward the lower outflow direction changing chamber 59 at the synchronous valve opening of both the upper and lower plugs 60 and 61, hence the ratio of the upper and lower flow is set so as to assume 6:4 to 9:1.

In the upper plug 60 and the lower plug 61 thus formed, the thrust force (unbalance power) generated in the axis direction when the valve is opened is not turned over until 0% to 85% or so of the plug opening degree.

On the other hand, the valve main body 51 is formed as a structure that the volume of the upper outflow direction changing chamber 58 becomes larger than the volume of the lower outflow direction changing chamber 59, thus the upper directional fluid is easy to flow and the lower directional fluid is hard to flow in comparison with the upper directional fluid.

In addition, the side wall 51*a* of the valve main body 51 is formed as a shape in which the lower side is narrower like a flowerpot. The valve main body 51 formed like such flowerpot shape can be made as a compact structure in the vertical direction in comparison with the conventional one having the same rate of the upper and lower flow as of this case.

Furthermore, a bypass groove 68 is provided to the periphery of a guide shaft 66 along with the axis direction, a space portion in a guide hole 67 is connected with the lower outflow direction changing chamber 59 by this bypass groove 68, whereby the fluid remaining in this space portion is drained to the lower outflow direction changing chamber 59 when the lower plug 61 is going down.

Next, the description will be made of the operation.

When the upper plug 60 and the lower plug 61 are synchronously opened by the diaphragm operational device (not shown), the fluid flowing into the valve main body 51 is separated into an upper direction fluid and a lower direction fluid in the sheet ring 71, and the upper direction fluid flowing in the upper chamber 58, as well as the lower direction fluid flowing into the lower outflow direction changing chamber 59 along the taper surface 61*a* of the lower plug 61 from a lower port 71-2 of the sheet ring 71 are combined near the outflow opening 53 and flows out from the outflow opening.

In such flowing of the fluid in the valve main body 51, the upper plug 60 functions such that the upper direction fluid toward the upper outflow direction changing chamber 58 is made easy to flow by the concave curved surface 60*a*, and the lower plug 61 functions such that the lower direction fluid toward the lower outflow direction changing chamber 59 is made hard to flow by the taper surface 61*a*, whereby the flow of the upper direction fluid becomes large and the flow of the lower direction fluid becomes small. Owing to this, the upper plug 60 functions such that the upper direction fluid is a main flow, and the lower direction fluid is a balancing flow.

Figure 17A:
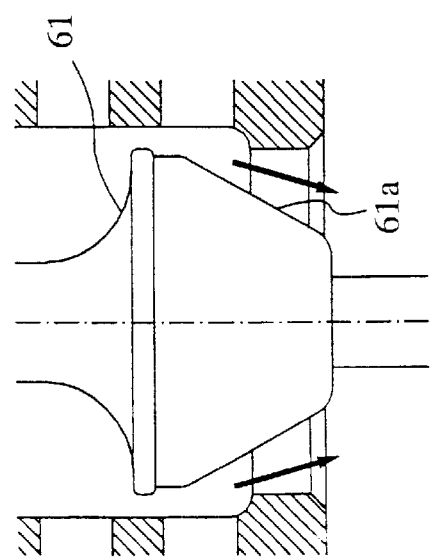
FIG. 17(*a*) is a view showing a fluid flowing by the lower plug of the FIG. 16, and FIG. 17(*b*) is a characteristic view showing a relation between the thrust generated by the fluid flowing of FIG. 17(*a*) and the opening degree.
Figure 17B:
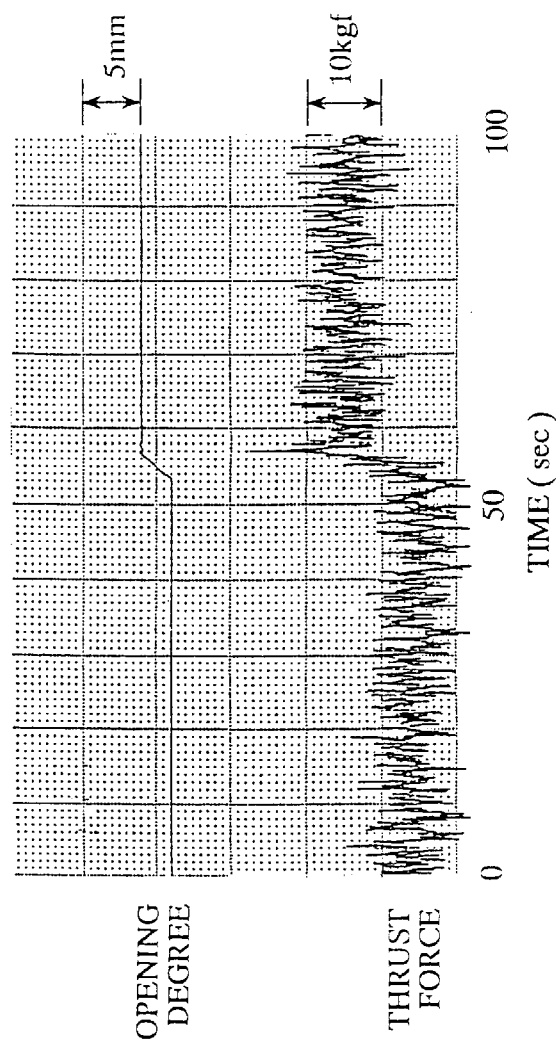

In other words, the lower direction fluid flows as shown by an arrow in FIG. 17(*a*) along with the taper surface 61*a* having conical shape of the lower plug 61 becomes the balancing flow in which the flow is smaller than that of the upper direction fluid, so that a drawing flow of the fluid around the lower plug 61 becomes stable as shown in FIG.

17(*b*), whereby the thrust force in the axis direction is not rapidly turned over because the thrust force does not change largely.

On the other hand, in the conventional valve apparatus in which the concave curved surface 6*a* is formed to the lower plug 6, an unstable drawing flow of the fluid is generated as shown in FIG. 40(*a*), so that a portion that the thrust force largely changed generates and a rapid reverse of the thrust force is generated as shown in FIG. 40(*b*).

In addition, when the upper and lower plugs 60 and 61 are lowered to adjust the flow of the upper direction fluid and the lower direction fluid, the fluid maintained in the space portion of the guide hole 67 of the lower plug 60 is drained into the lower outflow direction changing chamber 59 via the bypass groove 68 which is made along with the axis direction of the guide shaft 66. Thus, by draining the fluid maintained in the space portion of the guide hole 67 along the axis direction of the guide shaft 66 by the bypass groove 68, the drawing flow generated around the lower plug 61 is not confused by such escaped fluid.

Figure 19:
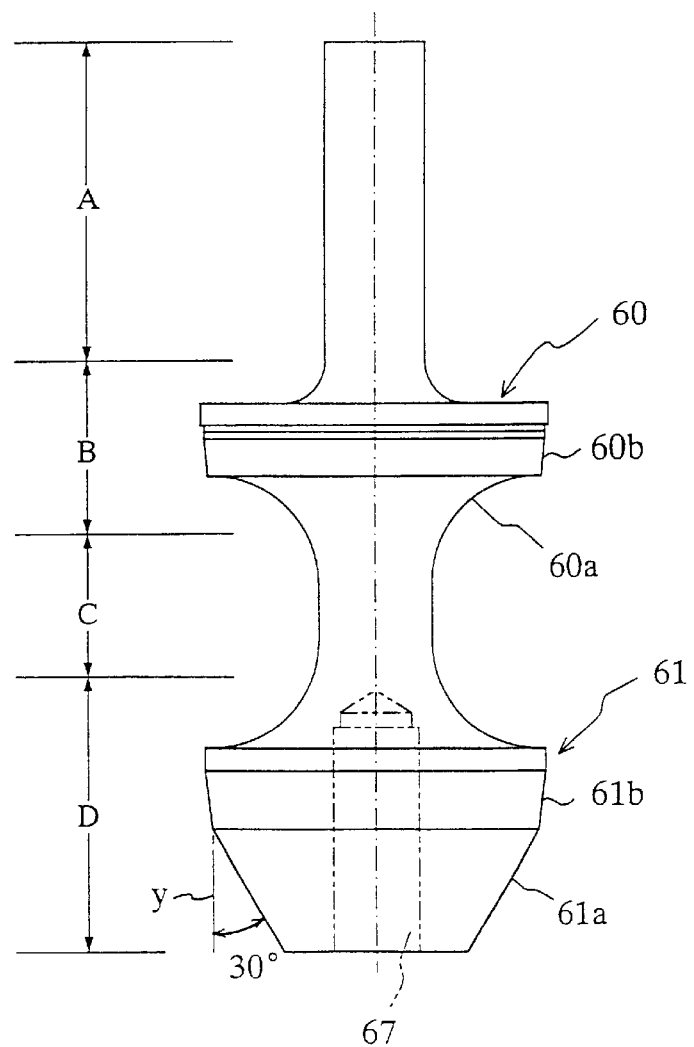
FIG. 19 is an extended front view showing the plug of the valve apparatus in FIG. 16.

FIG. 18 is a comparing view showing a relation between a thrust force characteristic and the opening degree in the seventh embodiment valve apparatus and the conventional valve apparatus. In addition, as the valve apparatus according to the seventh embodiment, as shown in FIG. 19, the concave curved surface 60*a* and a characteristic portion 60*b* are provided to the upper plug 60, and a rectifying portion 61*a* which has an angle of 30° with reference to the vertical line Y and a characteristic portion 61*b* are provided, thus the shape of the upper plug 60 and the lower plug 61 are formed differently. These characteristic portions 60*b* and 61*b* decide a flowing characteristic with respect to the opening degree.

The above-mentioned plug is formed as one body by cutting and processing a rod member having a predetermined size. Or a valve shaft portion A, an upper plug portion B, a connecting shaft portion C and a lower plug portion D are respectively produced, then a whole body is formed by welding these portions. Otherwise, there is produced by cutting operations, after forming as one body by welding materials having predetermined shapes corresponding to each portion A, B, C and D. According to such last two producing way, the waste of materials can be reduced.

As clearly understood from the comparing view in FIG. 18, in the conventional valve apparatus in which the upper plug 60 and the lower plug 61 are approximately the same shape, although the thrust force is changed as a smooth curve until the opening degree is 0% to 50%, the thrust force is largely changed and rapidly turned over near 60% where is around the central opening degree of the actual opening degree.

In comparison with such conventional valve apparatus, in the valve apparatus according to the seventh embodiment of this invention, the thrust force is smoothly changed between 0% and 85% of the opening degree, and this means that the thrust is not turned over between 0% and 85% of the opening degree.

Accordingly, in the conventional valve apparatus, although the flowing control by the diaphragm operational device becomes unstable or uncontrollable because of the rapid reverse of the thrust around the central opening degree, in the present invention valve apparatus, as mentioned above, since the thrust does not turn over from a descent condition to an ascent condition between 0% and 85% of the opening degree, misgiving which is occurred in the conventional valve apparatus like the unstable or uncontrollable of the flow control near the central opening degree as the actual opening degree is totally cleared up, whereby an opening degree range in which a stable control can be performed can be extended.

Although the above description is of the case that the taper surface 60*b* is formed as an angle of 30° with reference to the vertical line Y, even if such inclined angle is set in the range of 20° to 45°, and the ratio of the upper and lower flow is set from 6:4 to 9:1, the same operational effects can be obtained.

Embodiment 8

Figure 20A:
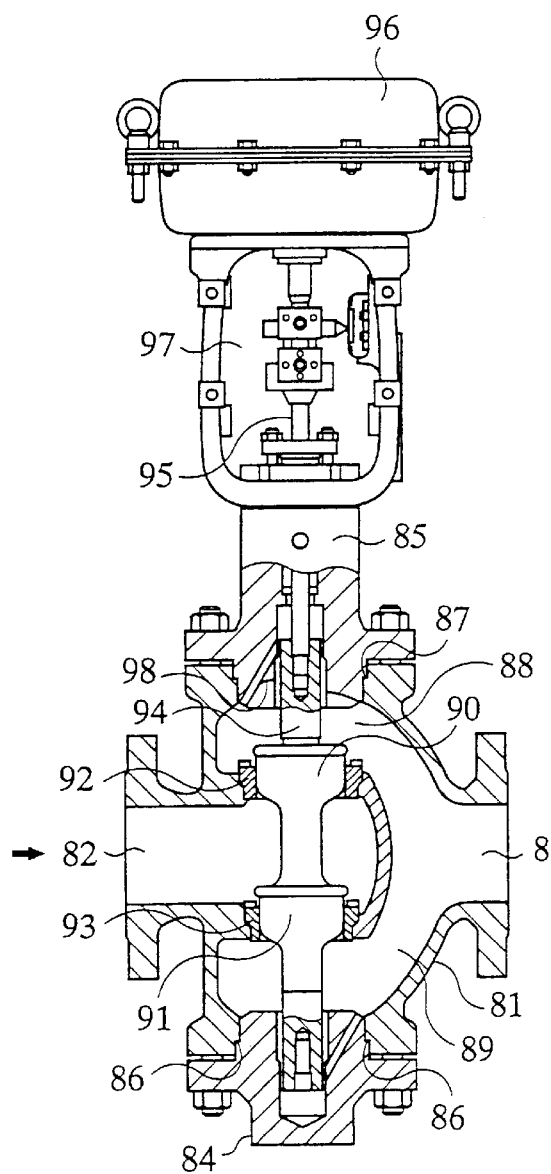
FIG. 20 shows sectional views of the valve apparatus according to the eighth embodiment of the present invention.
Figure 20B:
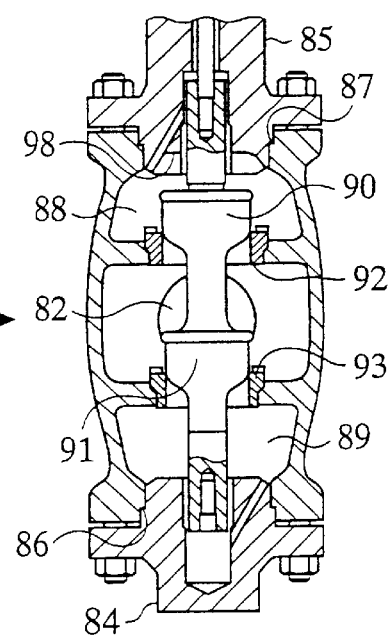

FIG. 20 shows sectional views of a valve apparatus according to the eighth embodiment of the present invention.

In the figure, a reference numeral 81 denotes a valve main body, 82 illustrates an inflow opening of the valve main body 81, 83 shows an outflow of the valve main body 81, 84 represents a lower cover fixed to the valve main body 81 by bolts, 85 indicates an upper cover fixed to the valve main body 81 by bolts, 86 denotes a gasket for keeping water tightness between the valve main body 81 and the lower cover 84, 87 indicates a gasket for keeping water tightness between the valve main body 81 and the upper cover 85, 88 denotes an upper outflow direction changing chamber (upper current path) which is connected with the outflow opening 83 of the fluid, 89 illustrates a lower outflow direction changing chamber (lower current path) which is connected with the outflow opening 83 of the fluid, 90 represents a first plug (upper plug), 91 indicates a second plug (lower plug) which is formed as one body with the first plug 90, 92 denotes a first sheet ring (upper sheet ring) for stopping the connection between the upper outflow direction changing chamber 88 and the inflow opening 82 of the fluid by closely attaching with the first plug 90, 93 denotes a second sheet ring (lower sheet ring) for stopping the connection between the lower outflow direction changing chamber 89 and the inflow opening 82 of the fluid by closely attaching with the second plug 91. These first sheet ring 92 and the second sheet ring 93 are fixed to the valve main body 81 by screws. A reference numeral 94 illustrates a plug upper end portion formed as one body with the first plug 90 and the second plug 91, 95 shows a plug driving rod (valve shaft) connected with the plug upper end portion 94, 96 represents a diaphragm operational device for shifting the first plug 90 and the second plug 91 vertically in the upper direction, 97 indicates a scale portion for displaying the shift amount of the first plug 90 and the second plug 91 in the vertical direction.

A reference numeral 98 denotes a concave surface having a streamlined shape which is formed at the bottom of the upper cover 85 making an upper inside surface of the upper outflow direction changing chamber 88. This concave surface 98 having the streamlined shape is formed so as to continuously connect with a curved surface which belongs to a side wall of the upper outflow direction changing chamber 88, and has a continuity with reference to the curved surface which the side wall has, such that a disorder generated when the flowing direction of the fluid flown from the gap generated between the first plug 90 and the first sheet ring 92 is changed into the direction to the outflow opening 83 along with the side wall of the upper outflow direction changing chamber 88 is restrained.

Next, the description will be made of the operation.

In this valve, the first plug 90 and the second plug 91 are vertically pushed to the lower direction by a push spring (not shown) located in the diaphragm operational device 96 generally, and as a result of this, the first plug 90 is closely attached to the first sheet ring 92 as well as the second plug 91 is closely attached to the second sheet ring 93, thus the gaps between the upper outflow direction changing chamber 88 and the lower outflow direction changing chamber 89 and the inflow opening 82 are made as closed condition. In this situation, if the diaphragm operational device 96 is operated, an upper direction force is generated vertically, and the first plug 90 and the second plug 91 are vertically shifted in the upper direction with the plug driving rod 95. As a result of this, gaps are generated between the first plug 90 and the first sheet ring 92 and between the second plug 91 and the second sheet ring 93, thereby forming a flowing path with the intervals between the upper outflow direction changing chamber 88 and the lower outflow direction changing chamber 89 and the inflow opening 82 being connected. In this case, the gap size between the first plug 90 and the first sheet ring 92 and between the second plug 91 and the second sheet ring 93 can be controlled by the diaphragm operational device 96, and is adjusted flexibly as a valve opening degree.

Moreover, the fluid flowing into the upper outflow direction changing chamber 88 which is moved up via the gap generated between the first plug 90 and the first sheet ring 92 is flown along with the side wall of the upper outflow direction changing chamber 88, as well as along with the streamlined concave surface 98 which is continue to the side wall, and the flowing direction of the fluid is changed at the upper outflow direction changing chamber 88, as well as flowing to lower direction at this time in the upper outflow direction changing chamber 88, thereby sending to the lower flowing side from the outflow opening 83. At this time, since the streamlined concave surface 98 has continuously connected to the curved surface which belongs to the side wall of the upper outflow direction changing chamber 88, a separating eddy or flowing confusion which are easy to generate when the flowing direction of the fluid is changed in the upper outflow direction changing chamber 88 is restrained, so that an effective flowing is generated.

On the other hand, the fluid flowing into the lower outflow direction changing chamber 89 which is moved up via the gap generated between the second plug 91 and the second sheet ring 93 is toward the upper side at this time in the lower outflow direction changing chamber 89, and sent to the lower flowing side from the outflow opening 83 of the fluid. In this case, if the bottom of the lower cover 84 forming one part of the inside surface of the lower outflow direction changing chamber 89 is made as a concave surface 98 having a streamlined shape for reducing a resistance when the fluid flows in similar to the case of the upper cover 85, the separating eddy or flowing confusion which are easy to generate when the flowing direction of the fluid is changed in the lower outflow direction changing chamber 89 is restrained, so that an effective flowing is generated.

Embodiment 9

Figure 21A:
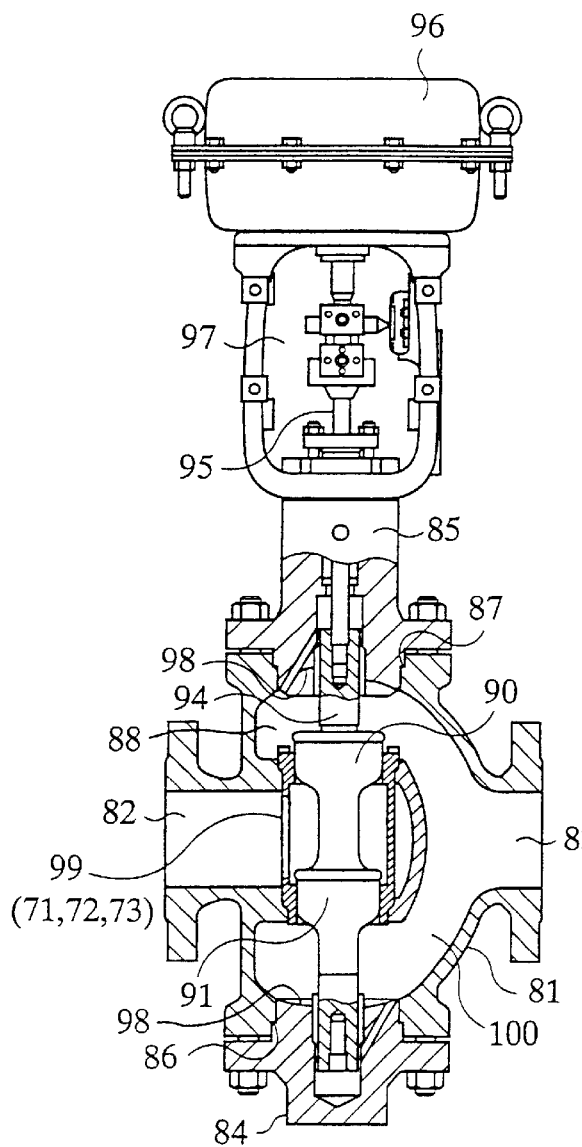
FIG. 21 shows sectional views of the valve apparatus according to the ninth embodiment of the present invention.
Figure 21B:
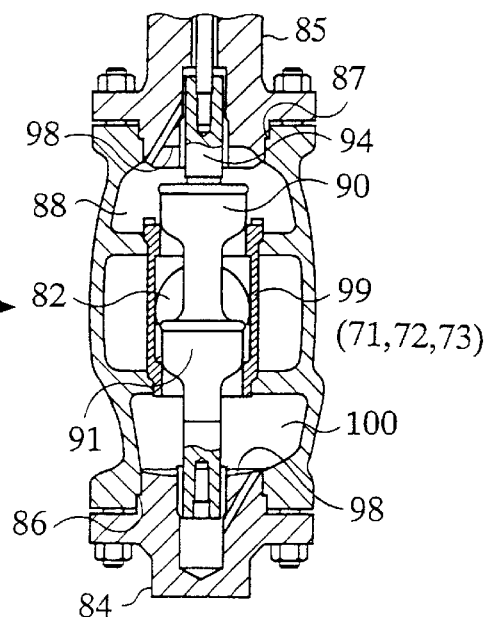

FIG. 21 is sectional structural views showing valves having a structure that one sheet ring 99 is formed as one body by the first sheet ring 92 and the second sheet ring 93 of the valve apparatus shown in FIG. 20 and that a position in which the fluid is flown into a lower outflow direction changing chamber from a gap generated between the second plug 91 and the sheet ring 99 is decentered from the center position of the lower outflow direction changing chamber. In FIG. 21, the same parts or similar parts as of FIG. 20 have the same reference numerals, thereby omitting repetitious description. In this figure, a reference numeral 100 denotes a lower outflow direction changing chamber. The sheet ring 99 is fixed to the valve main body 81 by screws in similar to the first sheet ring 92 and the second sheet ring 93 of the valve apparatus shown in FIG. 20. In the valve apparatus using the sheet ring 71 shown in FIG. 13 as a sheet ring 99, if the upper cover 85 is removed from the valve main body 81, the first plug 90 and the sheet ring 71 can be seen from the upper side easily. Owing to this, when the sheet ring 71 is set to the valve main body 81; the first plug 90 and the second plug 91 and the sheet ring 71 are changed; or position relation between the sheet ring 71 and the first plug 90 and the second plug 91 is adjusted, the upper cover 85 is removed from the valve main body 81; a state in which the sheet ring 71 is screwed into the valve main body 81 from the upper side is adjusted; a vertical install position of the sheet ring 71 with reference to the valve main body 81 is changed; and a closely attached state between the first plug 90 and the first sheet ring organizing portion 71a and a closely attached state between the second plug 9 and the second sheet ring organizing portion 71b can be adjusted to an optimum state simultaneously. Particularly, comparing with the valve apparatus in which the first sheet ring 92 and the second sheet ring 93 are respectively produced and set to the valve main body 81, since the first sheet ring organizing portion 71a and the second sheet ring organizing portion 71b are formed as one body in the present valve apparatus, the gap between the first sheet ring organizing portion 71a and the second sheet ring organizing portion 71b is constant, so that the first sheet ring organizing portion 71a and the second sheet ring organizing portion 71b can be adjusted at the same time.

In addition, in the embodiment 9 described above, either the male screw portion 71e or the male screw portion 71f can be omitted in the sheet ring 71, and a female screw to be engaged with such omitted male screw portion of the valve main body 81 can be also omitted, as well as in this structure, the production of the sheet ring 71 can be made simple and easy in comparing with the case that the male screw portion 71e and the male screw portion 71f are formed. Furthermore, although the embodiment 9 described above is shown as the structure that the upper cover 85 is removed from the valve main body 81, and the sheet ring 71 is screwed from the upper side into the inside of the valve main body 81, the structure may be made such that the lower cover 84 is removed from the valve main body 81, and the sheet ring 71 is screwed from the lower side into the inside of the valve main body 81. Also in the valve apparatus using such sheet ring 71, the fluid flowing into the upper outflow direction changing chamber 88 which is moved up via the gap generated between the first plug 90 and the first sheet ring organizing portion 71a is flown along with the side wall of the upper outflow direction changing chamber 88, as well as along with the streamlined concave surface 98 which is continue to the side wall, and the flowing direction of the fluid is changed at the upper outflow direction changing chamber 88, as well as is flown to lower direction at this time in the upper outflow direction changing chamber 88, thereby sending to the lower flowing side from the outflow opening 83. At this time, since the streamlined concave surface 98 has continuously connected to the curved surface which belongs to the side wall of the upper outflow direction changing chamber 88, the separating eddy or flowing confusion which are easy to generate when the flowing direction of the fluid is changed in the upper outflow direction changing chamber 88 is restrained, so that an effective flowing is generated.

On the other hand, the fluid flowing into the lower outflow direction changing chamber 100 which is moved up via the gap generated between the second plug 91 and the second sheet ring organizing portion 71b is toward the upper side at this time in the lower outflow direction changing chamber 100, and sent to the lower flowing side from the outflow opening 83 of the fluid. In this case, if the bottom of the lower cover 84 forming one part of the inside surface of the lower outflow direction changing chamber 100 is made as a concave surface 98 having a streamlined shape for reducing a resistance when the fluid is flown in similar to the case of the upper cover 85, the separating eddy or flowing confusion which are easy to generate when the flowing direction of the fluid is changed in the lower outflow direction changing chamber 100 is restrained, so that an effective flowing is generated.

Moreover, in the valve apparatus using the sheet ring 72 shown in FIG. 14 as a sheet ring 99, if the upper cover 85 is removed from the valve main body 81, the first plug 90 and the sheet ring 72 can be seen from the upper side easily. Owing to this, when the sheet ring 72 is set to the valve main body 81; the first plug 90 and the second plug 91 and the sheet ring 72 are changed; or position relation between the sheet ring 72 and the first plug 90 and the second plug 91 is adjusted, the upper cover 85 is removed from the valve main body 81; a state in which the sheet ring 72 is screwed into the valve main body 81 from the upper side is adjusted; a vertical install position of the sheet ring 72 with reference to the valve main body 81 is changed; and a closely attached state between the first plug 90 and the first sheet ring organizing portion 72a and a closely attached state between the second plug 9 and the second sheet ring organizing portion 72b can be adjusted to an optimum state simultaneously. Since the first sheet ring organizing portion 72a and the second sheet ring organizing portion 72b are formed as one body in the present valve apparatus, the gap between the first sheet ring organizing portion 72a and the second sheet ring organizing portion 72b is constant, so that the first sheet ring organizing portion 72a and the second sheet ring organizing portion 72b can be adjusted by one operation at the same time. In addition, since a plurality of holes 72d which functions as a defuser are formed to the connecting portion 72c for connecting the first sheet ring organizing portion 72a and the second sheet ring organizing portion 72b, a kinetic energy of the fluid flown from the upper side is changed into a pressure energy by the plurality of holes 72d, so that the flowing of the fluid flown to the lower side via the gap between the sheet ring and the plug can be made smooth.

In addition, in the embodiment described above, either the male screw portion 72e or the male screw portion 72f can be omitted, and a female screw to be engaged with such omitted male screw portion of the valve main body 81 can be also omitted, as well as in this structure, the production of the sheet ring 72 can be made simple and easy in comparing with the case that the male screw portion 72e and the male screw portion 72f are formed.

Furthermore, although the embodiment described above is shown as the structure that the upper cover 85 is removed from the valve main body 81, and the sheet ring 72 is screwed from the upper side into the inside of the valve main body 81, the structure may be made such that the lower cover 84 is removed from the valve main body 81, and the sheet ring 72 is screwed from the lower side into the inside of the valve main body 81.

Also in the valve apparatus using such sheet ring 72, the fluid flowing into the upper outflow direction changing chamber 88 which is moved up via the gap generated between the first plug 90 and the first sheet ring organizing portion 72a is flown along with the side wall of the upper outflow direction changing chamber 88, as well as along with the streamlined concave surface 98 which is continue to the side wall, and the flowing direction of the fluid is changed at the upper outflow direction changing chamber 88, as well as flows to lower direction at this time in the upper outflow direction changing chamber 88, thereby sending to the lower flowing side from the outflow opening 83. At this time, since the streamlined concave surface 98 has continuously connected to the curved surface which belongs to the side wall of the upper outflow direction changing chamber 88, the separating eddy or flowing confusion which are easy to generate when the flowing direction of the fluid is changed in the upper outflow direction changing chamber 88 is restrained, so that an effective flowing is generated. On the other hand, the fluid flowing into the lower outflow direction changing chamber 100 which is moved up via the gap generated between the second plug 91 and the second sheet ring organizing portion 72b is toward the upper side at this time in the lower outflow direction changing chamber 100, and sent to the lower flowing side from the outflow opening 83 of the fluid. In this case, if the bottom of the lower cover 84 forming one part of the inside surface of the lower outflow direction changing chamber 100 is made as a concave surface 98 having a streamlined shape for reducing a resistance when the fluid flows in similar to the case of the upper cover 85, the separating eddy or flowing confusion which are easy to generate when the flowing direction of the fluid is changed in the lower outflow direction changing chamber 100 is restrained, so that an effective flowing is generated.

Moreover, in the valve apparatus using the sheet ring 73 shown in FIG. 15 as a sheet ring 99, if the upper cover 85 is removed from the valve main body 81, the first plug 90 and the sheet ring 73 can be seen from the upper side easily. Owing to this, when the sheet ring 73 is set to the valve main body 81; the first plug 90 and the second plug 91 and the sheet ring 73 are changed; or position relation between the sheet ring 73 and the first plug 90 and the second plug 91 is adjusted, the upper cover 85 is removed from the valve main body 81; a state in which the sheet ring 73 is screwed into the valve main body 81 from the upper side is adjusted; a vertical install position of the sheet ring 73 with reference to the valve main body 81 is changed; and a closely attached state between the first plug 90 and the first sheet ring organizing portion 73a and a closely attached state between the second plug 9 and the second sheet ring organizing portion 73b can be adjusted to an optimum state simultaneously.

Particularly, comparing with the valve apparatus in which the first sheet ring 92 and the second sheet ring 93 are respectively produced and set to the valve main body 81, since the first sheet ring organizing portion 73a and the second sheet ring organizing portion 73b are formed as one body in the present valve apparatus, the gap between the first sheet ring organizing portion 73a and the second sheet ring organizing portion 73b is constant, so that the first sheet ring organizing portion 73a and the second sheet ring organizing portion 73b can be adjusted by one operation at the same time.

In addition, in the embodiment described above, either the male screw portion 73e or the male screw portion 73f can be omitted, and a female screw to be engaged with such omitted male screw portion of the valve main body 81 can be also omitted, as well as in this structure, the production of the sheet ring 73 can be made simple and easy in comparing with the case that the male screw portion 73e and the male screw portion 73f are formed. Furthermore, although the embodiment described above is shown as the structure that the upper cover 85 is removed from the valve main body 81, and the sheet ring 73 is screwed from the upper side into the inside of the valve main body 81, the structure may be made such that the lower cover 84 is removed from the valve main body 81, and the sheet ring 73 is screwed from the lower side into the inside of the valve main body 81.

Also in the valve apparatus using such sheet ring 73, the fluid flowing into the upper outflow direction changing chamber 88 which is moved up via the gap generated between the first plug 90 and the first sheet ring organizing portion 73a is flown along with the side wall of the upper outflow direction changing chamber 88, as well as along with the streamlined concave surface 98 which is continue to the side wall, and the flowing direction of the fluid is changed at the upper outflow direction changing chamber 88, as well as flows to lower direction at this time in the upper outflow direction changing chamber 88, thereby sending to the lower flowing side from the outflow opening 83. At this time, since the streamlined concave surface 98 has continuously connected to the curved surface which belongs to the side wall of the upper outflow direction changing chamber 88, the separating eddy or flowing confusion which are easy to generate when the flowing direction of the fluid is changed in the upper outflow direction changing chamber 88 is restrained, so that an effective flowing is generated. On the other hand, the fluid flowing into the lower outflow direction changing chamber 100 which is moved up via the gap generated between the second plug 91 and the second sheet ring organizing portion 73b is toward the upper side at this time in the lower outflow direction changing chamber 100, and sent to the lower flowing side from the outflow opening 83 of the fluid. In this case, if the bottom of the lower cover 84 forming one part of the inside surface of the lower outflow direction changing chamber 100 is made as a concave surface 98 having a streamlined shape for reducing a resistance when the fluid is flown in similar to the case of the upper cover 85, the separating eddy or flowing confusion which are easy to generate when the flowing direction of the fluid is changed in the lower outflow direction changing chamber 100 is restrained, so that an effective flowing is generated.

Moreover, in the valve apparatus using the sheet ring 73 shown in FIG. 15 as a sheet ring 99, if the upper cover 85 is removed from the valve main body 81, the first plug 90 and the sheet ring 73 can be seen from the upper side easily. Owing to this, when the sheet ring 73 is set to the valve main body 81; the first plug 90 and the second plug 91 and the sheet ring 73 are changed; or position relation between the sheet ring 73 and the first plug 90 and the second plug 91 is adjusted, the upper cover 85 is removed from the valve main body 81; a state in which the sheet ring 73 is screwed into the valve main body 81 from the upper side is adjusted; a vertical install position of the sheet ring 73 with reference to the valve main body 81 is changed; and a closely attached state between the first plug 90 and the first sheet ring organizing portion 73a and a closely attached state between the second plug 9 and the second sheet ring organizing portion 73b can be adjusted to an optimum state simultaneously.

Particularly, comparing with the valve apparatus in which the first sheet ring 92 and the second sheet ring 93 are respectively produced and set to the valve main body 81, since the first sheet ring organizing portion 73a and the second sheet ring organizing portion 73b are formed as one body in the present valve apparatus, the gap between the first sheet ring organizing portion 73a and the second sheet ring organizing portion 73b is constant, so that the first sheet ring organizing portion 73a and the second sheet ring organizing portion 73b can be adjusted by one operation at the same time.

In addition, in the embodiment described above, either the male screw portion 73e or the male screw portion 73f can be omitted, and a female screw to be engaged with such omitted male screw portion of the valve main body 81 can be also omitted, as well as in this structure, the production of the sheet ring 73 can be made simple and easy in comparing with the case that the male screw portion 73e and the male screw portion 73f are formed. Furthermore, although the embodiment described above is shown as the structure that the upper cover 85 is removed from the valve main body 81, and the sheet ring 73 is screwed from the upper side into the inside of the valve main body 81, the structure may be made such that the lower cover 84 is removed from the valve main body 81, and the sheet ring 73 is screwed from the lower side into the inside of the valve main body 81.

Also in the valve apparatus using such sheet ring 73, the fluid flowing into the upper outflow direction changing chamber 88 which is moved up via the gap generated between the first plug 90 and the first sheet ring organizing portion 73a is flown along with the side wall of the upper outflow direction changing chamber 88, as well as along with the streamlined concave surface 98 which is continue to the side wall, and the flowing direction of the fluid is changed at the upper outflow direction changing chamber 88, as well as is flown to lower direction at this time in the upper outflow direction changing chamber 88, thereby sending to the lower flowing side from the outflow opening 83. At this time, since the streamlined concave surface 98 has continuously connected to the curved surface which belongs to the side wall of the upper outflow direction changing chamber 88, the separating eddy or flowing confusion which are easy to generate when the flowing direction of the fluid is changed in the upper outflow direction changing chamber 88 is restrained, so that an effective flowing is generated. On the other hand, the fluid flowing into the lower outflow direction changing chamber 100 which is moved up via the gap generated between the second plug 91 and the second sheet ring organizing portion 73b is toward the upper side at this time in the lower outflow direction changing chamber 100, and sent to the lower flowing side from the outflow opening 83 of the fluid. In this case, if the bottom of the lower cover 84 forming one part of the inside surface of the lower outflow direction changing chamber 100 is made as a concave surface 98 having a streamlined shape for reducing a resistance when the fluid is flown in similar to the case of the upper cover 85, the separating eddy or flowing confusion which are easy to generate when the flowing direction of the fluid is changed in the lower outflow direction changing chamber 100 is restrained, so that an effective flowing is generated.

Embodiment 10

Figure 22:
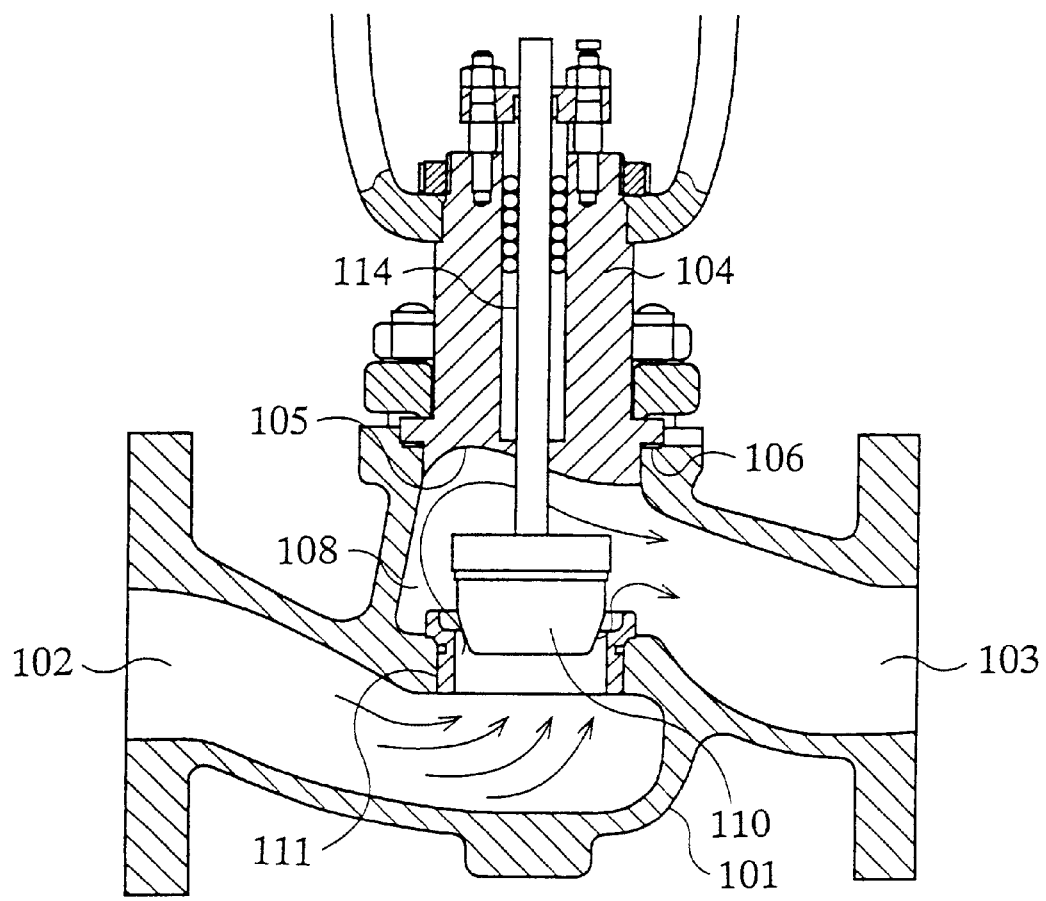
FIG. 22 is a sectional view of the valve apparatus according to the tenth embodiment of the present invention.

FIG. 22 is a view of a sectional structure of a valve apparatus as a single-seated valve according to the tenth embodiment of the present invention. In the figure, a reference numeral 101 denotes a valve main body, 102 illustrates an inflow opening at the upper flowing side, 103 shows an outflow opening at the lower flowing side, 104 represents a lower cover fixed to the valve main body 101 by bolts, 106 denotes a gasket for keeping water tightness and airtightness between the valve main body 101 and the upper cover 104. A reference numeral 108 denotes an outflow direction changing chamber which is connected with the outflow opening 103 of the fluid, 110 represents a plug (upper plug), 111 denotes a sheet ring for performing the stop of the flowing path between the outflow changing chamber 108 and the inflow opening 102 of the fluid by closely attaching with the plug 110, 114 shows a plug driving rod (valve shaft) connected with the plug upper end surface. Because a diaphragm operational device which is not shown shifts the plug 110 vertically in the upper direction, the upper flowing side and the lower flowing side are connected by generating a gap between the plug and the sheet ring 111.

A reference numeral 105 denotes a concave surface having a streamlined shape which is formed at the bottom of the upper cover 104 making an upper inside surface of the outflow direction changing chamber 108. This concave surface 105 having the streamlined shape is formed so as to continuously connect with a curved surface which belongs to a side wall of the outflow direction changing chamber 108, and has a continuity with reference to the curved surface which the side wall has, such that a disorder generated when the flowing direction of the fluid flown from the gap generated between the plug 110 and the sheet ring 111 is changed into the direction to the outflow opening 103 along with the side wall of the outflow direction changing chamber 108 is restrained.

Next, the description will be made of the operations.

In this valve, the plug 110 is vertically pushed to the lower direction by a push spring located in the diaphragm operational device generally, and as a result of this, the plug 110 is closely attached to the sheet ring 111, thus the gap between the outflow direction changing chamber 108 and the inflow opening 102 is made as closed condition. In this situation, if the diaphragm operational device is operated, an upper direction force is generated vertically, and the plug 110 is vertically shifted in the upper direction via the plug driving rod 114. As a result of this, gap is generated between the plug 110 and the sheet ring 111, thereby forming a flowing path with the interval between the outflow direction changing chamber 108 and the inflow opening 102 being connected. In this case, the gap size between the plug 110 and the sheet ring 111 can be controlled by the diaphragm operational device, and is adjusted flexibly as a valve opening degree.

Moreover, the flowing fluid flown into the outflow direction changing chamber 108 which is moved up via the gap generated between the plug 110 and the sheet ring 111 is flown along with the side wall of the outflow direction changing chamber 108, as well as along with the streamlined concave surface 105 which is continue to the side wall, then the flowing direction of the fluid is changed at the outflow direction changing chamber 108, as well as flows to lower direction at this time in the outflow direction changing chamber 108, thereby sending to the lower flowing side from the outflow opening 103. At this time, since the streamlined concave surface 105 has continuously connected to the curved surface which forms the side wall of the outflow direction changing chamber 108, the separating eddy or flowing confusion which are easy to generate when the flowing direction of the fluid is changed in the outflow direction changing chamber 108 is restrained, so that an effective flowing is generated.

Embodiment 11

Figure 23:
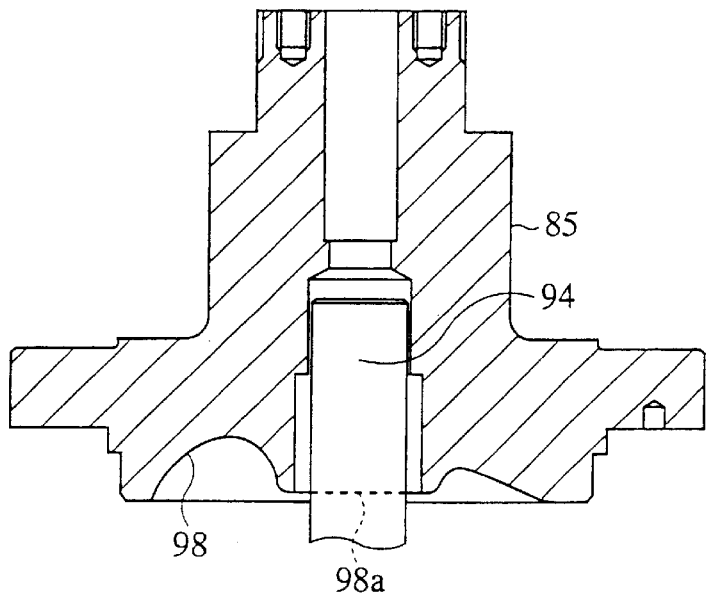
FIG. 23 is a sectional figure view of the upper cover of the valve apparatus.

FIG. 23 shows a sectional figure of the upper cover 85, and a convex portion 98a forming a guide portion of the plug upper end portion 94 is provided to the center of the concave surface 98 at the lower portion. However, this may not be required, and when there is provided, the strength of the plug is increased with reference to oscillations.

Figure 24A:
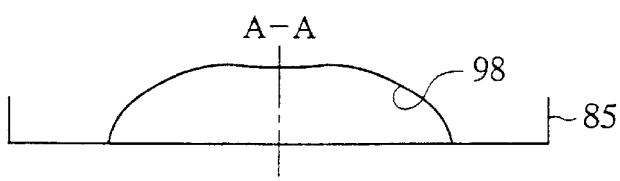
FIG. 24 shows sectional figure views of the lower portion of a variety of upper cover of the valve apparatus.
Figure 24B:
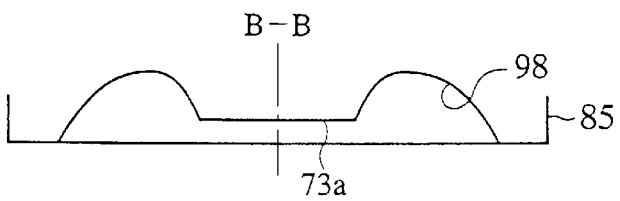
Figure 24C:
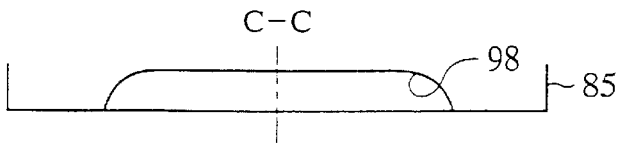

In addition, FIG. 24 shows a variety of lower sectional figures of this upper cover 85, and FIG. 24(a) shows a case that the concave surface 98 is made deep; FIG. 24(b) shows a case that the same concave portions are provided at both of the left and right sides of the convex portion 98a; and FIG. 24(c) shows a case that the concave surface 98 is made shallow, thus a preferred figure can be formed in accordance with the resistance of flowing fluid.

Embodiment 12

Figure 25:
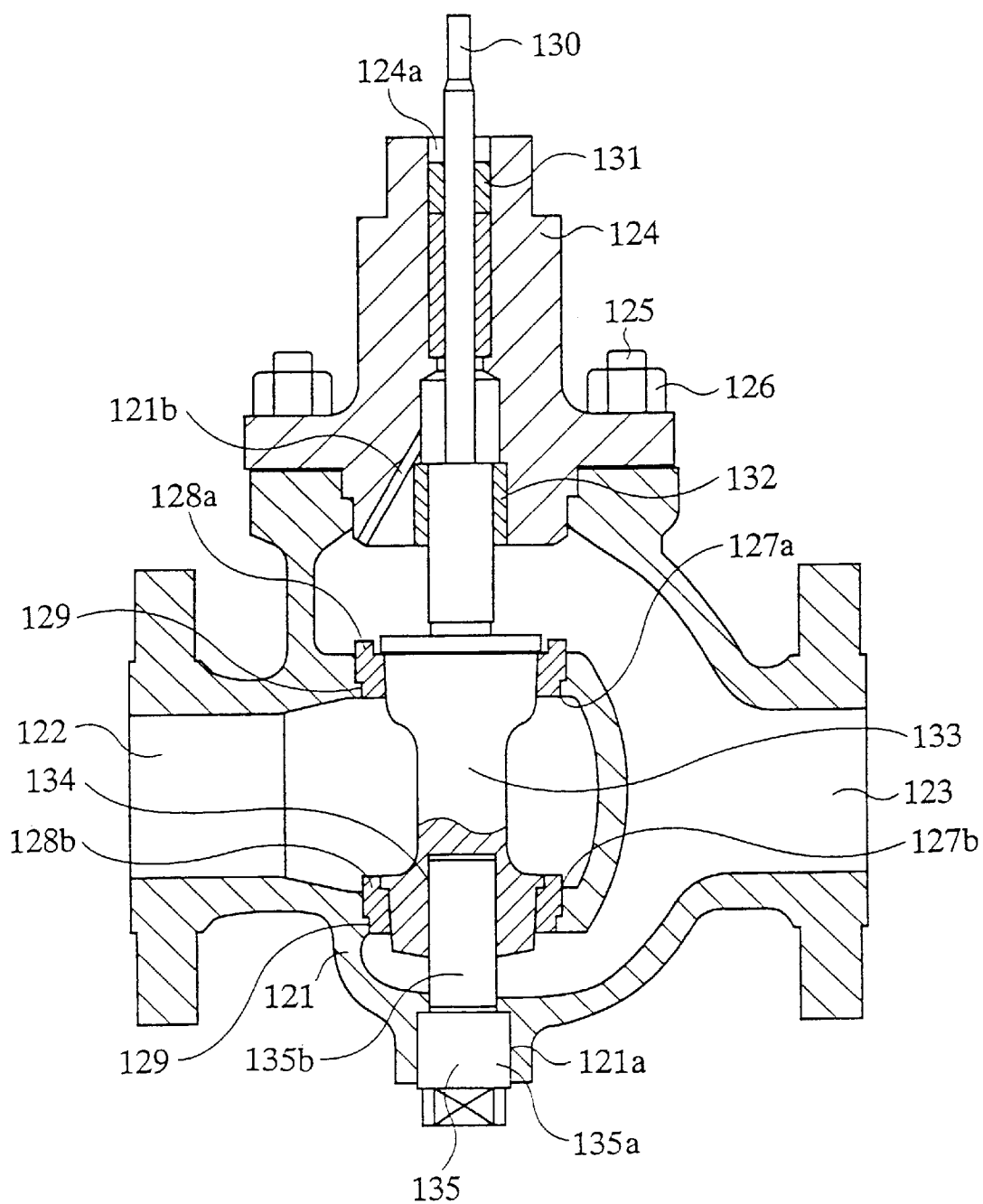
FIG. 25 is a sectional view of the valve apparatus according to the twelfth embodiment of the present invention.

FIG. 25 is a sectional view of a valve apparatus according to the twelfth embodiment of the present invention. In the figure, a reference numeral 121 denotes a valve main body in which a plug guide attaching hole 121a is provided at the bottom thereof as a screw hole. A reference numeral 122 illustrates an inflow opening, 123 shows an outflow opening of the valve main body 121, 124 represents an upper cover fixed to the upper portion of the valve main body 121 by stud bolts 125 and hexagon nuts 126, and a gasket (not shown) is provided between the valve main body 121 and the upper cover 124. A reference numeral 124a indicates a stem insert hole for inserting a stem 130 which will be mentioned hereinafter, 127a and 127b denote connecting holes for connecting the inflow opening 2 and the outflow opening 3.

Reference numerals 128a and 128b illustrate sheet rings provided to the connecting holes 127a and 127b via a gasket 129 so as to make contactable with a plug 133 which will be mentioned hereinafter.

A reference numeral 130 shows a stem (valve shaft) which is connected with a driving device like a diaphragm motor or so (not shown) to shift the aforementioned plug 133 in the vertical or horizontal direction, and is inserted into the stem insert hole 124a of the upper cover 124 via a gland packing 131 and a guide bush 132.

A reference numeral 133 represents a plug that the upper portion is connected to the stem 130 so as to move freely in the vertical direction and that is formed so as to be engageable with the sheet rings 128a and 128b, whereby the inflow opening 2 and the outflow opening 3 are connected by opening and closing the connecting holes 127a and 127b.

A reference numeral 134 indicates a guide hole provided at the bottom of the plug 133, and is formed such that a portion of the plug guide 135 which will be mentioned hereinafter and which is provided to the valve main body 121 is inserted thereinto so as to freely move. Accordingly, the depth of the guide hole 134 is set such that the plug 133 is not slip out in consideration of the length of stroke on moving of the plug 133, and the inside diameter of the guide hole 134 is set in consideration of the engagement with a plug guide 135.

The reference numeral 135 denotes a plug guide having a rod shape including a male screw portion 135a which is possible to screw into the plug guide attaching hole 121a of the valve main body 121 and a guide portion 135b which is formed so as to make engageable with the guide hole 134 of the plug 133. In addition, the bottom of the male screw portion 135a is processed as a figure in which a tool like a spanner or so can be used, for instance, a hexagonal shape.

Further, in this plug guide 135, an antiseismic material, a heat-resistant material, or a high intensity material against to vibration due to the fluid can be used in accordance with the character of the fluid.

In addition, a predetermined sealing is performed to such screw portions so as not to leak the fluid.

The description will be given of the operations next. The stem 130 is moved up and down with a predetermined stroke set by a driving device (not shown), therefore the plug 133 is moved up and down. In this case, when the plug 138 is engaged with the sheet rings 128a and 128b, the inflow opening 122 and the outflow opening 123 are not connected through, and when the plug 133 is not engaged with the sheet rings 128a and 128b, the inflow opening 122 and the outflow opening 123 are connected therethrough.

Moreover, the guide portion 135b of the plug guide 135 is inserted into the guide hole 134 of the plug 133, and the plug 133 is slid with reference to the plug guide 135, therefore, horizontal directional movement is limited. Accordingly, the engagement between the plug 133 and the sheet rings 128a and 128b is suitably performed, and the fluid leak when the plug 133 is closed can be effectively prevented.

In the case that the plug guide 135 is damaged by the vibration and corrosion therefore required to change, or that the maintenance thereof, only the plug guide 135 is changed, with the male screw portion 135a of the plug guide 135 being screwed thereinto, or loosened.

As described above, according to the embodiment 12, since the plug guide 135 is provided, the engagement between the plug 133 and the sheet rings 128a and 128b is suitably performed, and the fluid leak when the plug 133 is closed can be effectively prevented, as well as, in the case that the plug guide 135 is damaged by the vibration and corrosion therefore required to change, or that the maintenance thereof, only the plug guide 135 can be changed, with the male screw portion 135a of the plug guide 135 being screwed thereinto, or loosened, whereby there is an effect that a valve apparatus having superior cost/performance can be provided.

Moreover, since the plug guide 135 which is directly fixable to the valve main body 121 is adopted, the lower cover which is required in the conventional one becomes needless, so that the number of parts can be reduced and the projecting amount of the bottom of the valve main body 121 becomes small, whereby there is an effect that the apparatus can be minimized as a whole, wherein vibration can be reduced by the part of such minimization.

In addition, since the projecting amount of the bottom of the valve main body 121 becomes small, and enough working space at the lower portion can be obtained after the valve apparatus is installed, so that there is an effect that the maintenance operation of the plug guide 135 and so on can be easily performed.

Embodiment 13

Figure 26:
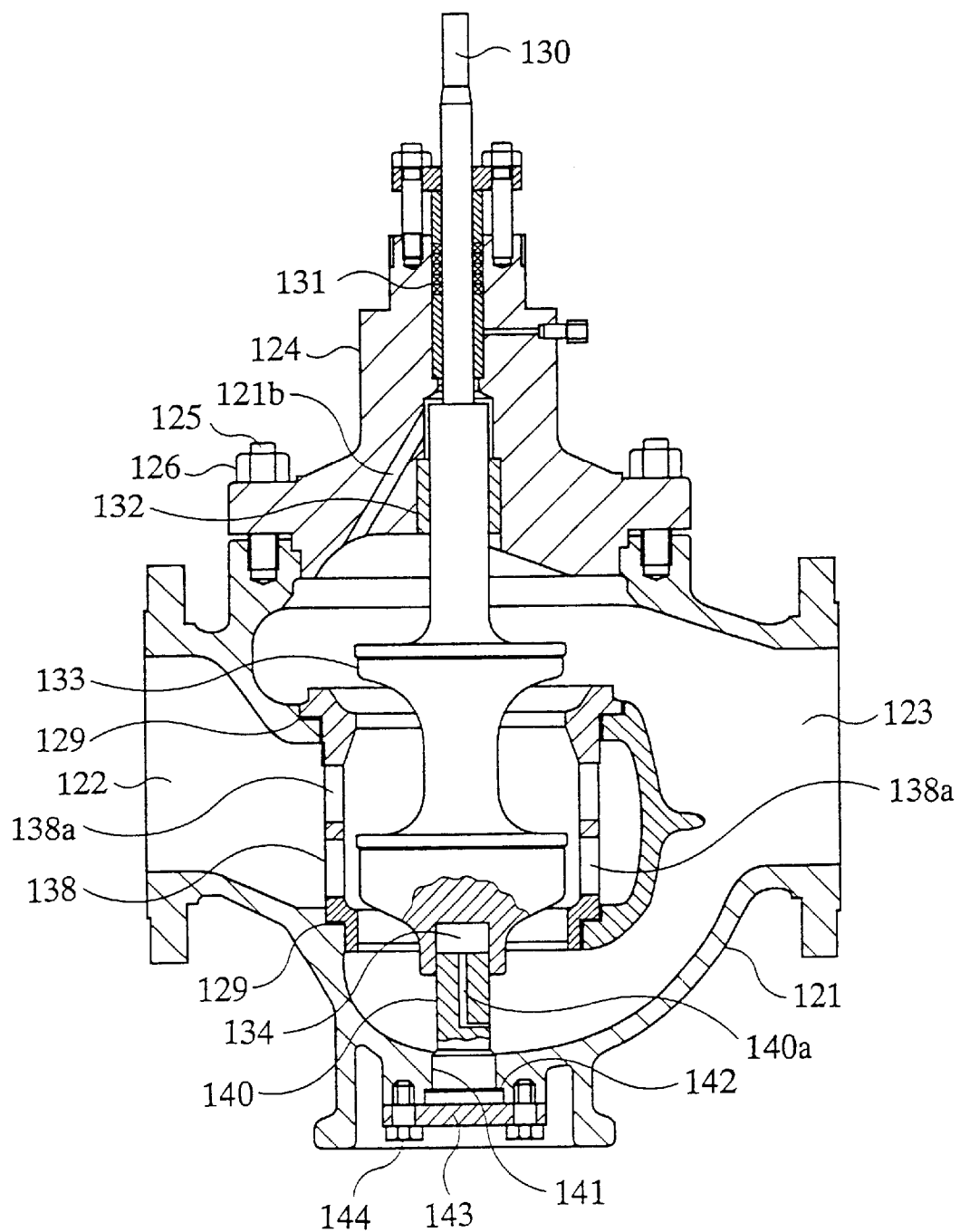
FIG. 26 is a sectional view of the valve apparatus according to the thirteenth embodiment of the present invention.

FIG. 26 is a sectional view of a valve apparatus according to the thirteenth embodiment of the present invention. In the figure, a reference numeral 138 denotes a one-body sheet ring which is contactable with the plug 133, and has a through hole 138a.

A reference numeral 140 illustrates a plug guide having a rod shape which is formed so as to be engageable with the guide hole 134 of the plug 133, and is engaged into a plug guide attaching hole 141 provided to the valve main body 121 via a gasket 142.

A reference numeral 140a shows a bypass hole having an opening portion at the upper surface of the plug guide 140 and at the side surface of the plug guide 140, which is not inserted into the guide hole 134 of the plug 133. In other words, this bypass hole 140a is for making a smooth downward operation of the plug 133 when the plug 133 is moved down, by discharging the fluid maintained in the space formed of the upper surface of the plug guide 140 and the guide hole 134 to the out of the space, thus by removing the fluid as a pressure resistance at the downward operation.

A reference numeral 143 represents a lower cover fixed to the bottom of the valve main body 121 by hexagonal bolts 144, to push and fix the plug guide 140.

The description will be given of the operations next.

The stem 130 is moved up and down with a predetermined stroke set by a driving device (not shown), therefore the plug 133 is moved up and down. In this case, when the plug 133 is engaged with the one-body sheet ring 138, the inflow opening 2 and the outflow opening 3 are not connected through, and when the plug 133 is not engaged with the one-body sheet ring 138, the inflow opening 2 and the outflow opening 3 are connected therethrough.

Moreover, one portion of the plug guide 140 is inserted into the guide hole 134 of the plug 133, and the plug 133 is slided with reference to the plug guide 140, therefore, horizontal directional movement is limited. Accordingly, the engagement between the plug 133 and the one-body sheet ring 138 is suitably performed, and the fluid leak when the plug 133 is closed can be effectively prevented.

Furthermore, when the plug 133 is moved down, the fluid maintained at the space formed by the upper surface of the plug guide 140 and the guide hole 134 is discharged to the space via the bypass hole 140a, thus the fluid as a pressure resistance at the downward operation is removed.

As described above, according to the embodiment 13, since the plug guide 140 is provided, the engagement between the plug 133 and the one-body sheet ring 138 is suitably performed, and the fluid leak when the plug 133 is closed can be effectively prevented, as well as, in the case that the plug guide 140 is damaged by the vibration and corrosion therefore required to change, or that the maintenance thereof, only the plug guide 140 can be changed, with the lower cover 143 being removed, whereby there is an effect that a valve apparatus having superior cost/performance can be provided.

In addition, since the guide hole is not required to the lower cover 143, a thin lower cover can be adopted thereto, and the projecting amount of the bottom portion of the valve main body 121 becomes small, whereby there is an effect that the apparatus can be minimized as a whole.

Further, since the projecting amount of the bottom of the valve main body 121 becomes small, an enough working space at the lower portion can be obtained after the valve apparatus is installed, so that there is an effect that the maintenance operation of the plug guide 140 and so on can be easily performed.

Moreover, since a bypass hole 140a is provided to the plug guide 140, when the plug 133 is moved down, the fluid maintained in the space formed of the upper surface of the plug guide 140 and the guide hole 134 to the out of the space can be discharged, thus the fluid as a pressure resistance at the downward operation can be easily discharged, whereby there is also an effect that the smooth downward operation of the plug 133 can be obtained.

Here, although the embodiment 13 described above shows as one that the plug guide 140 and the lower cover 143 are individually formed, the plug guide 140 and the lower cover 143 may be formed as one body by welding, or a part of the plug guide 140 may be made as a member having a function of the lower cover 143, by forming as a figure like the lover cover 143.

Embodiment 14

Figure 27:
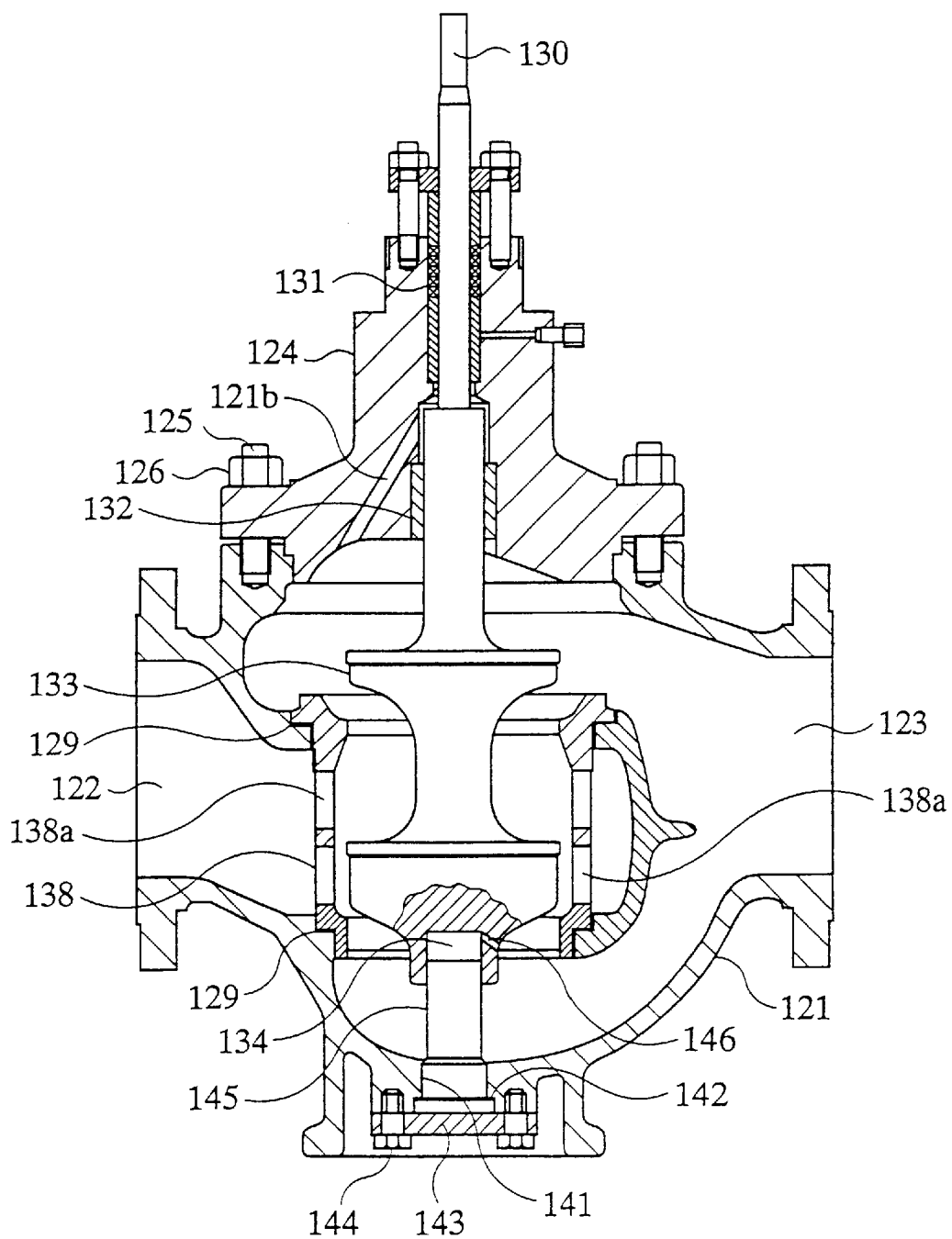
FIG. 27 is a sectional view of the valve apparatus according to the fourteenth embodiment of the present invention.

FIG. 27 is a sectional view showing a valve apparatus according to the fourteenth embodiment of the present invention, and in this figure, a reference numeral 145 denotes a plug guide having a rod shape formed so as to be engageable with the guide hole of the plug 133, as well as is engaged in the guide attaching hole 121 via the gasket 142.

A reference numeral 146 illustrates a bypass hole provided to the plug 133 to connect between the inside and outside of the guide hole 134 of the plug 133. In other words, this bypass hole 146 is for making a smooth downward operation of the plug 133 when the plug 133 is moved down, by discharging the fluid maintained in the space formed of the upper surface of the plug guide 145 and the guide hole 134 to the out of the space, thus by removing the fluid as a pressure resistance at the downward operation.

Namely, although the bypass hole is provided to the plug guide 140 to discharge such fluid in the embodiment 13, the embodiment 14 is different in a point that the bypass hole is provided to the plug 133. Other structure is the same as the embodiment 13, and the same parts have the same references thereby omitting the description.

Next, the operation will be described.

The operation for moving the plug 133 and a point that the fluid flowing when the plug 133 is closed is effectively prevented are the same as the case of the embodiment 13.

Different part is a point that the fluid maintained at the space formed by the upper surface of the plug guide 145 and the guide hole 134 when the plug 133 is moved down is discharged to the out of space via the bypass hole 146, and that the fluid as a pressure resistance when moving down is discharged.

As described above, according to the embodiment 14, since the plug guide 145 is provided, the same effect as the embodiment 13 can be obtained, and since the bypass hole 146 is provided to the plug 133, when the plug 133 is moved down, the fluid maintained in the space formed of the upper surface of the plug guide 145 and the guide hole 134 to the out of the space can be discharged, thus the fluid as a pressure resistance at the downward operation can be easily discharged, whereby there is also an effect that the smooth downward operation of the plug 133 can be obtained.

Embodiment 15

In the embodiment 15, a lubricant which is not shown is provided for reducing the resistance at the movement to a surface (engaging surface) of the plug guide portion 135 (FIG. 25), an inserting portion surface (engaging surface) of the plug guide 140 (FIG. 26) and the plug guide 145 (FIG. 27) to the guide hole 134, or the engaging surface of the guide hole 134, in the case of the embodiment 12 to the embodiment 14. In other words, there is a feature that a lubricant such as PTFE or so is suffused to the above-mentioned portion for example.

In addition, it may have a feature that the above-mentioned lubricant is suffused on both the plug guide 135 and the guide hole 134.

The operation will be described next.

The operation is the same as the cases of the embodiment 12 to the embodiment 14, and the different point is that the since the resistance of the guide hole 134 can be reduced by the lubricant suffused on the plug guides 135, 140 and 145, the movement of the plug 133 becomes further smooth.

As mentioned above, according to the embodiment 15, since a lubricant such as Teflon or so is suffused on the plug guide 135, 140 or 145 in the embodiment 12 to the embodiment 14, the same effect as the cases of the embodiment 12 to the embodiment 14, as well as since the resistance of the guide hole 134 and the plug guide 135, 140 or 145 is reduced, and the movement of the plug 133 can be more smooth, the effect can be obtained that the damage by the resistance of the plug guide 135, 140 or 145, and guide hole 134 can be effectively prevented.

Embodiment 16

Figure 28:
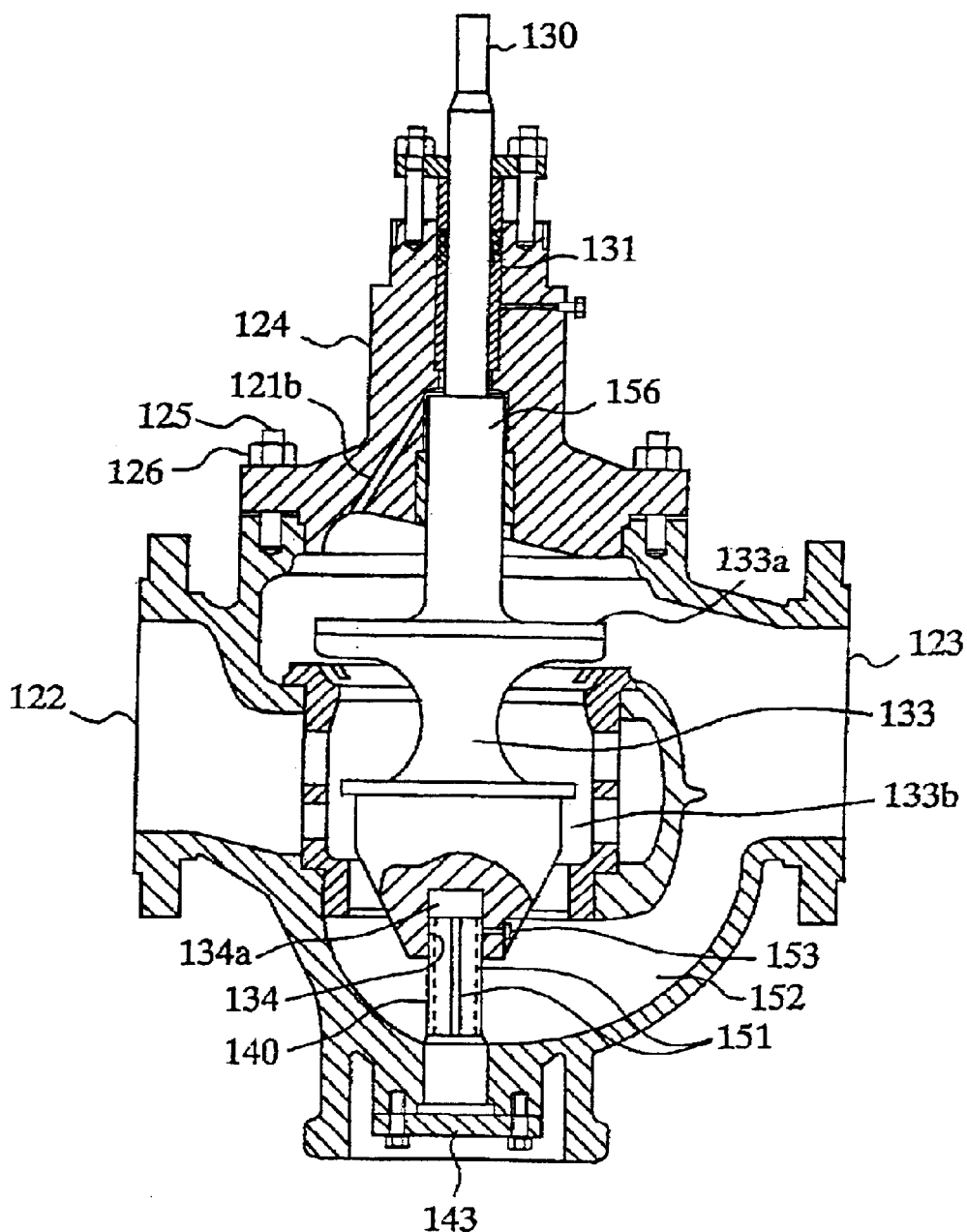
FIG. 28 is a sectional view of the valve apparatus according to the sixteenth embodiment of the present invention.

FIG. 28 is a sectional view showing a valve apparatus according to the embodiment 16 of this invention, and the same references are given to the same or similar parts as the embodiment 14 shown in FIG. 26, thereby omitting the repetitious description.

Figure 29:
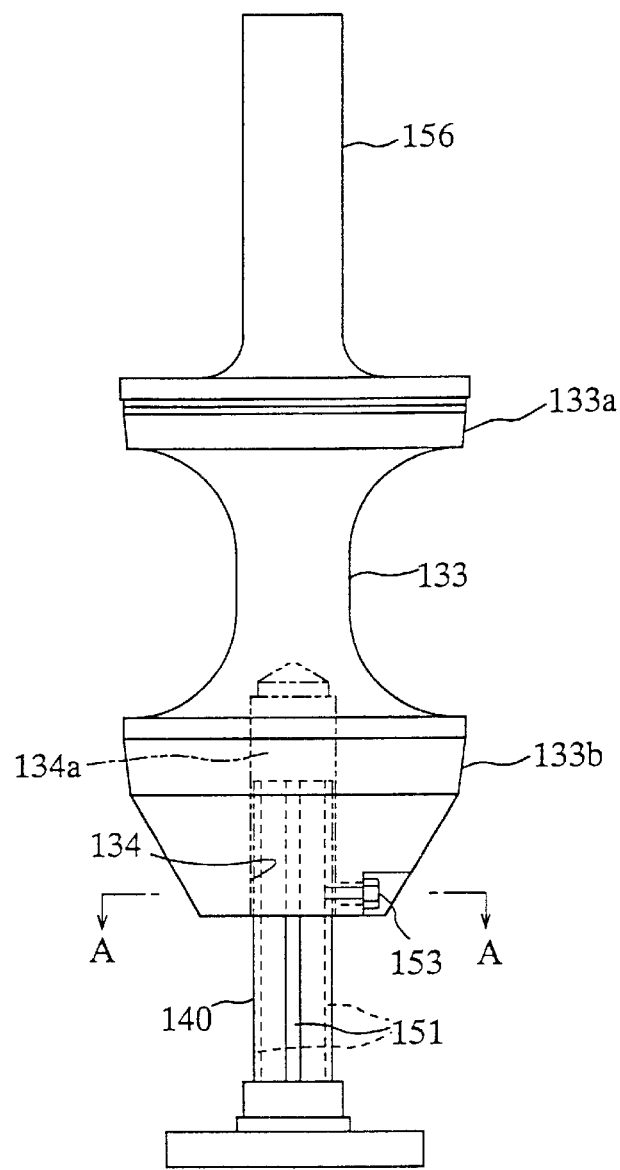
FIG. 29 is an extended front view showing a relation between the plug in FIG. 28 and a lower guide shaft.
Figure 30:
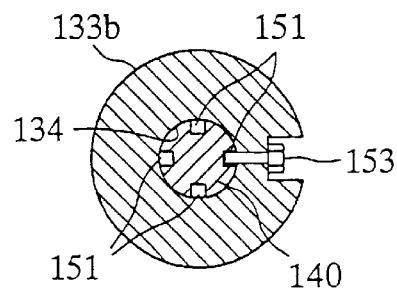
FIG. 30 is a sectional view cut in line A—A in FIG. 28.

In the figure, a reference numeral 151 is a plurality of fluid escaping grooves formed between the inner surface of the plug guide hole 134 in the lower plug 133b of the plug 133 and the outer surface of the guide shaft 140, and in this embodiment 16, these fluid escaping groove 151 are formed of four concave grooves made along with the guide shaft 140 in the longitudinal direction as shown in FIG. 30, thus the space 134a of the plug guide hole 134 and a lower outflow direction changing chamber 152 are connected as shown in FIG. 28 and FIG. 29.

A reference numeral 153 denotes an engaging convex portion which is projecting to the inside of the plug guide hole 134, and which is provided to the lower plug 133b, and this projecting convex portion 153 is engaged into one of the four fluid escaping groove 151, to allow the open/close movement in the axis direction of the plug 133 (up/down movement in the figure) in the engaged state, as well as to prevent the rotation of the plug 133. In the embodiment 16, the engaging convex portion 153 is formed of the bolt which is detachably provided to the lower portion of the plug 133 from the outside.

Next the operation will be described.

The flowing fluid when the plug 133 is moved and opened is the same as the conventional one, and even if the force due to the flowing confusion is received by the plug 133, the plug 133 is not rotated by engaging of the fluid escaping groove 151 and the engaging convex portion 153, so that the twisting of a valve shaft portion 156 and the plug stem 130 or so by the rotation of the plug 133 is not occurred, therefore, the connecting portion of the valve portion 156 and the plug stem 130 or the operational system are not damaged.

Next, when the plug 133 is moved down, the fluid maintained in the space portion 134a of the plug guide hole 134 is drained into the lower outflow direction changing chamber 152 via the fluid draining groove 151 in the axis direction of the guide shaft 140, so that there is no confusion of the fluid around the lower plug 133b due to the draining fluid.

In addition, since the guide shaft 140 has a plurality of fluid draining groove 151 (four grooves in the figure), even if the one fluid draining groove 151 is clogged up by a substance like a solid matter or slurry, other fluid draining groove 151 can be functioned as a bypass hole for taking the maintained fluid out.

Furthermore, when the fluid draining groove 151 in which the engaging convex portion 153 is engaged is damaged by the engagement with the engaging convex portion 153, it is possible to perform that the other fluid draining groove 151 is engaged with the engaging convex portion 153, with the guide shaft 140 being removed with the lower cover 143, without taking the whole valve apparatus apart to pieces.

Moreover, when the slurry or so of the fluid is stuck to the inside surface of the plug guide 134, if the plug 133 is rotated with the engagement of the engaging convex portion 153 and the fluid draining groove 151 being released, the slurry or so can be removed by an edge portion of opening end of each fluid draining groove 151 being functioned as a scraper.

Embodiment 17

Figure 31:
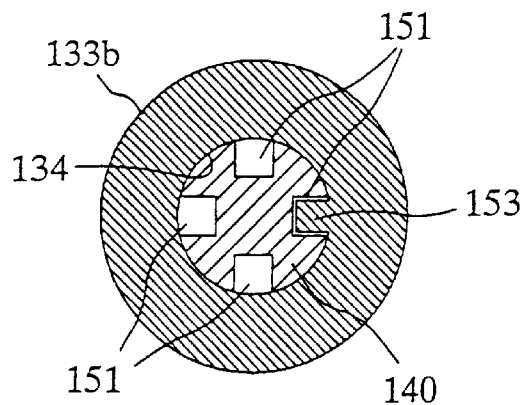
FIG. 31 is a transverse sectional view showing a main portion of the valve apparatus according to the seventeenth embodiment of the present invention.

FIG. 31 is a transverse sectional view of a main body according to the seventeenth embodiment of the present invention. Although the detachable bolts are adopted as the engaging convex portion 153 in the embodiment 16, the engaging convex portion 153 is formed to the inside surface of the plug guide hole 134 as one body in the embodiment 17. Therefore, in this embodiment 17, the same operational effect can be obtained as the embodiment 16 except for that the edge portion of the opening end of the fluid escaping groove 151 is functioned as the scraper.

Embodiment 18

Figure 32:
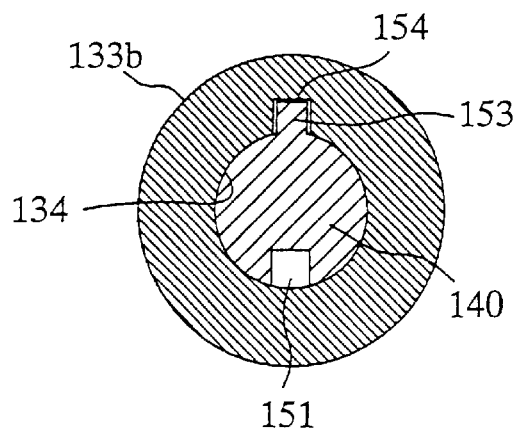
FIG. 32 is a transverse sectional view showing a main portion of the valve apparatus according to the eighteenth embodiment of the present invention.

FIG. 32 is a transverse sectional view of a main body according to the eighteenth embodiment of the present invention. In this embodiment 18, one fluid draining groove 151 along with the axis direction and the engaging convex portion 153 are formed at the outer surface of the guide shaft 140, and an engaging groove 154 is formed at the inside surface of the plug guide hole 134 of the lower plug 133b, as well as the engaging convex portion 153 is engaged into this engaging groove 154.

Therefore, according to the embodiment 18, the maintained fluid of the space portion 134a of the plug guide hole 134 shown in FIG. 28 can be escaped by one fluid draining groove 151 along with the guide shaft 140, and the rotation of the guide shaft 140 can be prevented by the engagement of the engaging convex portion 153 and the engaging groove 154.

Embodiment 19

Figure 33:
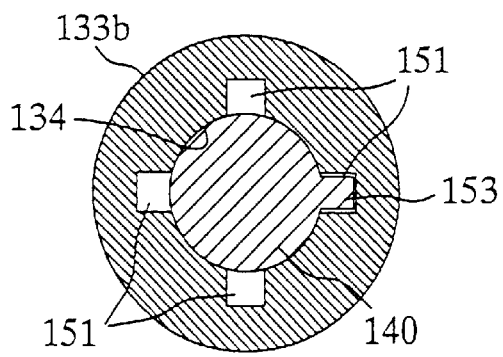
FIG. 33 is a transverse sectional view showing a main portion of the valve apparatus according to the nineteenth embodiment of the present invention.

FIG. 33 is a transverse sectional view of a main body according to the nineteenth embodiment of the present invention. Although the four fluid draining grooves 151 are provided at the outer surface of the guide shaft 140 and the engaging convex portion 153 is provided at the side of the lower plug 133b respectively in the above-mentioned embodiment 16, oppositely the four fluid draining grooves 151 are provided at the inside surface of the plug guide hole 134 of the lower plug 133b, and the engaging convex portion 153 is provided to one of the inside surface of the plug guide hole 134 of the lower plug 133b, as well as this engaging convex portion 153 is engaged into one of the four fluid draining grooves 151 in the embodiment 19.

Therefore, according to the embodiment 19 also, the same operational effect can be obtained as the embodiment 16 except for that the edge portion of the opening end of the fluid draining groove 151 is functioned as the scraper.

Embodiment 20

FIG. 34 is a transverse sectional view of a main body according to the twentieth embodiment of the present invention. In this embodiment 20, the guide shaft 140 is formed as a crossing sectional shape, and four engaging grooves 151 are formed at the inside surface of the plug guide hole 134 of the lower plug 133b along with the axis direction, as well as four fluid draining grooves 151 are formed between the guide shaft 140 and the inside of the plug guide hole 134 by engaging each of the side end portions of the crossing shape of the guide shaft 140 into these engaging grooves 151.

Therefore, the sectional shape is different between a circular inside surface of the plug guide hole 134 and the outside surface of the guide shaft 140, and the fluid draining grooves 151 can also be formed therebetween by making the plug guide hole 134 different as the sectional shape from that of the guide shaft 140, as well as the same operational effect can be obtained as the embodiment 16 except for that the edge portion of the opening end of the fluid draining groove 151 is functioned as the scraper.

Embodiment 21

FIG. 35 is a transverse sectional view of a main body according to the twenty first embodiment of the present invention. In this embodiment 21, the guide shaft 140 is formed as a triangle sectional shape, and three engaging grooves 154 are formed at the inside surface of the plug guide hole 134, as well as three fluid draining grooves 151 are formed between the outer surface of the guide shaft 140 and the inside surface of the plug guide hole 134 by engaging the edge portion of the triangle shape of the guide shaft 140 into this engaging groove 154.

Therefore, also in the embodiment 21, the sectional shape is different between a circular inside surface of the plug guide hole 134 and the outside surface of the guide shaft 140, and thus the plurality of fluid draining grooves 151 can be formed in the plug guide hole 134 by making the both different as the sectional shape each other, as well as the same operational effect can be obtained as the embodiment 20.

Embodiment 22

Figure 37A:
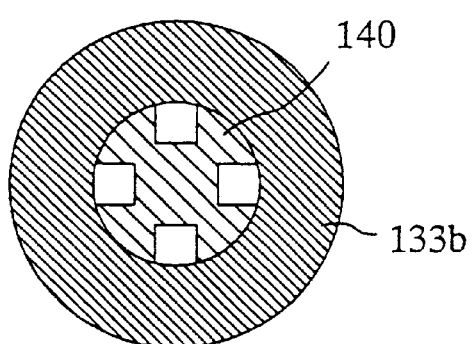
FIG. 37 shows transverse sectional views showing the engagement of a guide shaft and a plug guide hole according to the twenty second embodiment of the present invention.
Figure 37B:
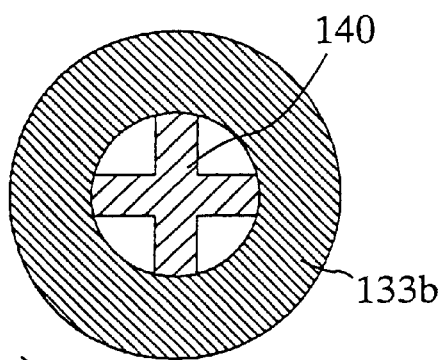
Figure 37C:
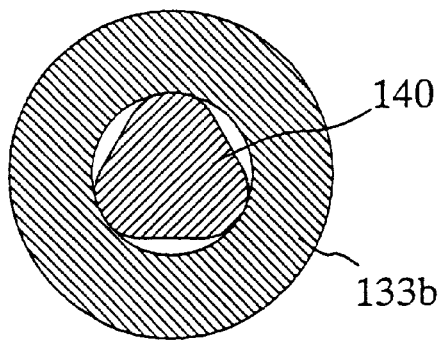
Figure 38:
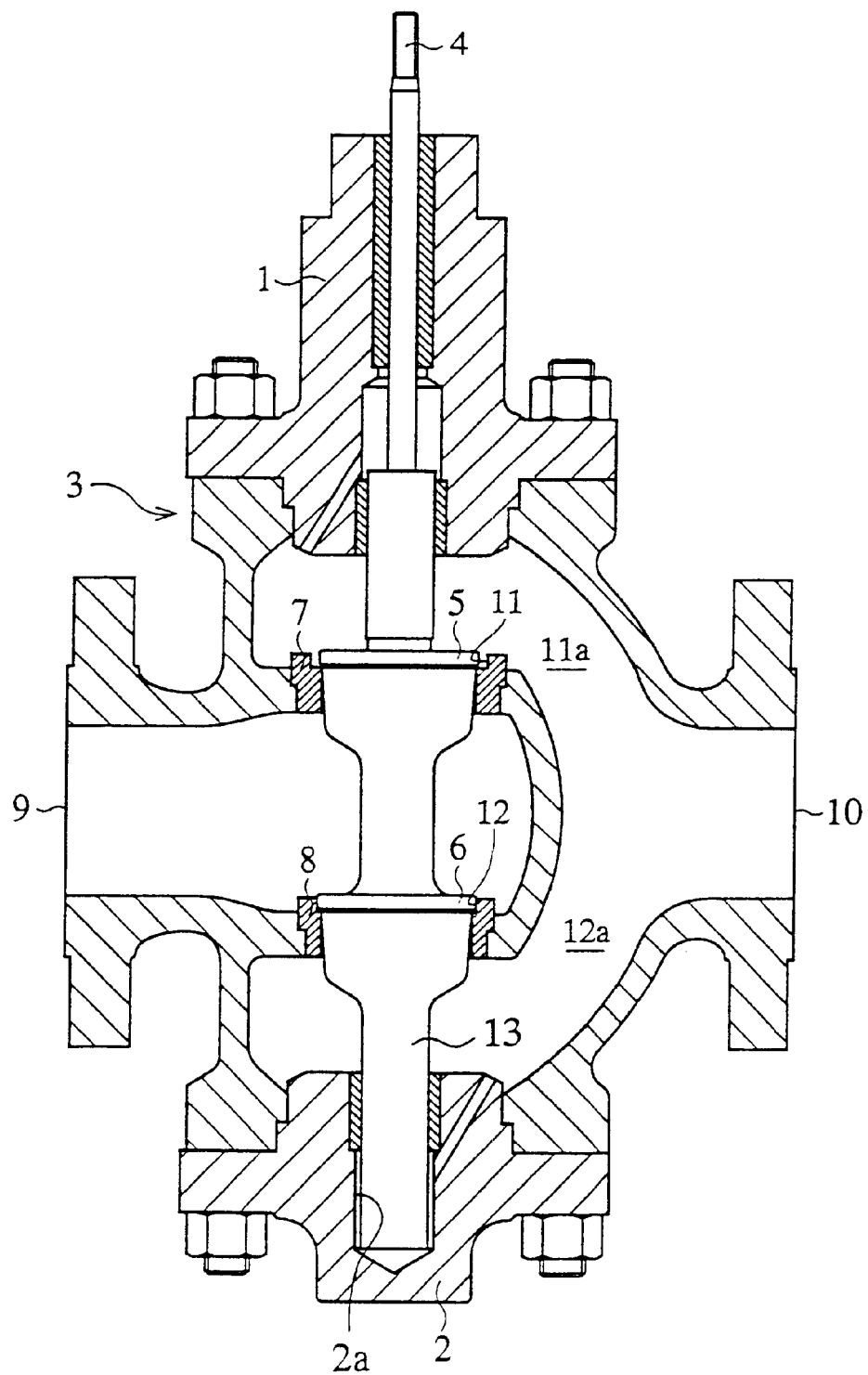
FIG. 38 is a sectional view according to the conventional valve apparatus.
Figure 39:
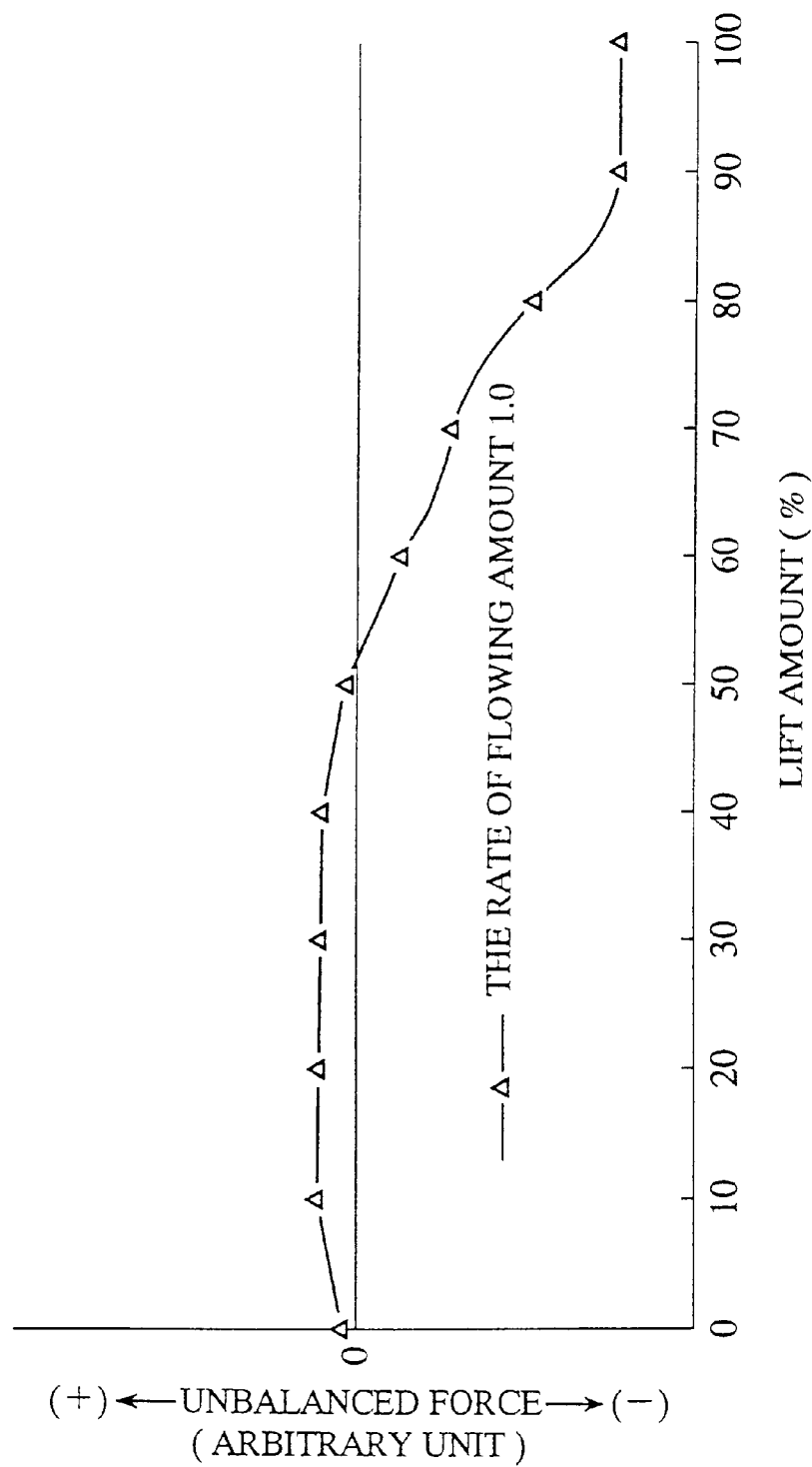
FIG. 39 is a view showing an example of a relation between the lift amount and the unbalance power according to the conventional valve apparatus.

FIG. 36 shows transverse sectional views of a main body according to the twenty second embodiment of the present invention. In this embodiment 22, the guide shaft is formed as an impeller sectional shape (FIG. 36(a)), a crossing sectional shape (FIG. 36(b)) or a triangle sectional shape (FIG. 36(c)), and the plug guide hole 134 has a circular hole 134a which is to be connected with the guide shaft 140 as shown in FIG. 37(a), FIG. 37(b) and FIG. 37(c).

Therefore, in this embodiment 22, dirt attached to the side wall of the plug guide hole 134 can be removed by rotating the guide shaft 140 due to the scraper function, so that the same operational effect as the above-mentioned embodiments.

As mentioned above in detail, according to the first aspect of the present invention, since a valve apparatus comprises: an upper plug and an upper sheet ring which are for adjusting the flow of fluid to an upper current path; and a lower plug and a lower sheet ring which are provided on the same axis as the upper plug and the upper sheet ring, and are for adjusting the flow of fluid to a lower current path, wherein the amount of the lower current path has smaller value than the amount of the upper current path, the ratio of the amount of both the upper and lower flowing can be set as an optimum value, so that there is an effect that the unbalance power can be maintained as a small value having one direction in all over the lift amount.

According to the valve apparatus of the second aspect, since the rate of flowing in the upper current path and the lower current path is 1.0:0.7 to 1.0:0.9 when the upper and lower plug shapes are approximately the same, the ratio of the amount of both the upper and lower flowing can be set as an optimum value, so that there is an effect that the unbalance power can be maintained as a small value having one direction in all over the lift amount.

According to the valve apparatus of the third aspect, since the sectional area of the upper current path is formed larger than sectional area of the lower current path, the flow of the upper current path:the flow of the lower current path=1.0:0.7 to 1.0:0.9 is realized by the difference of the sectional area, and the ratio of the amount of both the upper and lower flowing can be set as an optimum value, so that there is an effect that the unbalance power can be maintained as a small value having one direction in all over the lift amount.

According to the valve apparatus of the fourth aspect, since the upper plug and the lower plug are provided such that the center line of a path at the inflow side is positioned lower than the symmetrical center line connecting the center of an inflow opening and an outflow opening at the valve apparatus, the flow of the upper current path:the flow of the lower current path=1.0:0.7 to 1.0:0.9 is realized, and the ratio of the amount of both the upper and lower flowing can be set as an optimum value, so that there is an effect that the unbalance power can be maintained as a small value having one direction in all over the lift amount.

According to the valve apparatus of the fifth aspect, since there are provided an upper plug and an upper sheet ring which are for adjusting the flow to the upper current path; a lower plug and a lower sheet ring which are provided on the same axis as the upper plug and the upper sheet ring, and which are for adjusting the flow of fluid to the upper current path; and a resistance member which is for fluid and which is provided on a way of the lower current path, the ratio of the amount of both the upper and lower flowing can be set as an optimum value, so that there is an effect that the unbalance power can be maintained as a small value having one direction in all over the lift amount.

In addition, if the ratio between the flow of the upper flowing path and the amount of the lower flowing path is set to 1.0:0.7 to 1.0:0.9, there is an effect that the control of the operational device becomes stable.

Furthermore, if the resistance is provided between the lower sheet ring and the lower cover, as a cage having a side hole, there is an effect that the resistance member can be provided with an easy structure.

Moreover, if the cage is formed as a cylindrical body in which the peripheral of the upper portion of the lower cover is extended until the position of the lower sheet ring, and a side hole can be formed to the side surface of this cylindrical body, the cage can be formed as one body with the lower cover, so that there is an effect that the process of the production can be shortened.

Further, if the cage can be formed by a cylindrical body in which the lower sheet ring is extended until the lower cover, and a side hole can be formed to the side surface of this cylindrical body, the cage can be formed as one body with the under sheet ring, so that there is an effect that the process of the production can be shortened.

According to the valve apparatus of the sixth aspect, since a lower cover becomes needless because there are provided an upper plug and an upper sheet ring which are for adjusting the flow to the upper current path; a lower plug and a lower sheet ring which are provided on the same axis as the upper plug and the upper sheet ring, and which are for adjusting the flow of fluid to the upper current path; and a guide member for guiding the lower plug, the lower cover can be made needless, so that there is an effect that the device can be minimized with right weight.

In addition, if the guide member can be formed by a cylindrical body having a bottom, and a guide hole for guiding the lower plug can be formed to the bottom of this cylindrical body, as well as a side hole for flowing fluid can be formed at the side wall, the lower cover is made needless, so that there is an effect that the control of the operational device can be made stable.

Furthermore, if the cylindrical body having the bottom can be formed as one body with the lower seat ring, there is an effect that the guide member can be produced by the small number of processes.

Moreover, if the cylindrical body having the bottom can be attached with the lower sheet ring, after the cylindrical body and the lower sheet ring are formed individually, there is an effect that the guide member can be formed without high-level processes.

Further, if the side holes made at the side surface of the cylindrical body having the bottom as a guide member is formed as a plurality of small holes, there is an effect that the flowing fluid direction cannot be effected by the opening position of the side hole.

In addition, if the guide member is formed of a bent rod body, and the guide hole can be formed to the there is an effect that connection portion of the rod body, the guide member can be formed by a simple structure.

Further, if the guide member can be defined such that the ratio between the flow of the upper current path and the flow of the lower current path becomes 1.0:0.7 to 1.0:0.9, the control of the operational device becomes stable, so that there is an effect that the noise or cavitation can be reduced.

According to the valve apparatus of the seventh aspect, since the figure of the upper plug is made different from that of the lower plug such that the rate of the upper and lower current paths becomes 6:4 to 9:1, the upward flowing fluid via the upper plug in the valve main body can be made as the main flow, and the downward flowing fluid via the lower plug in the valve main body can be made as the balancing flow, so that the thrust force cannot be turned over suddenly at the actual opening degree, whereby there is an effect that the stable control can be performed as a flow adjusting valve.

According to the valve apparatus of the eighth aspect, since the upper plug and the lower plug are formed such that the thrust force is not turned on between approximately 0% and 85%, there is an effect which is the same as the first aspect.

According to the valve apparatus of the ninth aspect, since a conical taper surface having a lower end side being gradually narrowed is formed at the lower plug with an inclined angle of 20° to 45°, the drawing flowing fluid can be made stable around the lower plug, so that the thrust force is not turned over suddenly by causing the confusion of the drawing flowing, whereby there is an effect that the stable control of the valve can be carried out.

In addition, if the conical taper surface having the lower end side being gradually narrowed can be formed with an inclined angle of 30°, the same effect can be obtained as the above ninth aspect.

Furthermore, if the volume of the upper flowing path can be made larger than the lower flowing path, the upward flowing is made easy to flow by controlling the flow at the upper plug and the downward flowing is made hard to flow by controlling the flow at the lower plug, so that there is an effect that the upward flowing is made as the main flow and the downward flowing is made as the balancing flow by making different the upper and lower plug figure.

Moreover, since the upper flowing path is transversely extended than the lower flowing path around the outflow opening of the fluid of the sheet ring, the same effect can be obtained as the above-description, and the valve main body can be made compact in the longitudinal direction.

According to the valve apparatus of the tenth aspect, since the volume of one main outflow direction changing chamber of the upper outflow direction changing chamber and the lower outflow direction changing chamber is larger than the volume of the other outflow direction changing chamber, the state that the oscillation and the uncontrol of the adjusting valve can be prevented by the unbalance of the pressure forced to the upper plug and the lower plug, so that there is an effect that the adjustment of the flow can be carried out stably.

According to the valve apparatus of the eleventh aspect, since one of the upper outflow direction changing chamber and the lower outflow direction changing chamber has a shape extended transversely for a main flow in comparison with the other outflow changing chamber, the state that the oscillation and the uncontrol of the adjusting valve can be prevented effectively by the unbalance of the pressure forced to the upper plug and the lower plug, so that there is an effect that the adjustment of the flow can be carried out stably.

In addition, if an outflow direction changing chamber surface for changing fluid flowing via a gap generated between upper plug and the upper sheet ring or between the lower plug and the lower sheet ring in one of the upper outflow direction changing chamber or the lower outflow direction changing chamber having a transversely extended shape can be formed as a concave surface of the streamed shape for reducing the resistance when the fluid flows, the state that the oscillation and the uncontrol of the adjusting valve can be prevented effectively by the unbalance of the pressure forced to the upper plug and the lower plug because the fluid flowing of the upper outflow direction changing chamber or the lower outflow direction changing chamber which has a transversely extended shape becomes smooth, so that there is an effect that the adjustment of the flow can be carried out stably. Further, the generation of the oscillation can be prevented by extending the upper outflow direction changing chamber in the transverse direction, and therefore, by minimizing the size in the operational direction of the plug.

According to the valve apparatus of the twelfth aspect, since a part of the inner surface forming the outflow direction changing chamber for changing the fluid flown from the gap generated between the plug and the sheet ring is formed as a concave surface of the streamed shape for reducing the resistance when the fluid flows, the separating eddy or flowing confusion which are easy to generate when the flowing direction of the fluid is changed in the lower outflow direction changing chamber is restrained, so that there is an effect that the noise and oscillation generated when the fluid flowing direction is changed can be prevented.

According to the valve apparatus of the thirteenth aspect, since the bottom of an upper cover forming a part of an inner surface of the outflow direction changing chamber is formed as a concave surface having a streamlined shape for reducing the resistance when the fluid is flown, the fluid is smoothly flown in the outflow direction changing chamber along with the upper cover bottom formed at the concave surface of the streamed line shape, the separating eddy or flowing confusion which are easy to generate when the flowing direction of the fluid is changed in the lower outflow direction changing chamber is restrained, so that there is an effect that the noise and oscillation generated when the fluid flowing direction is changed can be prevented.

According to the valve apparatus of the fourteenth aspect, since the bottom of a lower cover forming a part of an inner surface of an outflow direction changing chamber is formed as a concave surface having a streamlined shape for reducing the resistance when the fluid flows, the fluid smoothly flows in the outflow direction changing chamber along with the lower cover bottom formed at the concave surface of the streamed line shape, the separating eddy or flowing confusion which are easy to generate when the flowing direction of the fluid is changed in the lower outflow direction changing chamber is restrained, so that there is an effect that the noise and oscillation generated when the fluid flowing direction is changed can be prevented.

According to the valve apparatus of the fifteenth aspect, since a plurality of sheet rings is formed as one body, the sheet rings are not required to adjust respectively with respect to the adjusting valve main body, so that there is an effect that the adjusting operation can be made easy when the sheet ring is attached to the adjusting valve main body, the plug and the sheet ring are changed, or the position relation between the sheet ring and the plug is adjusted.

According to the valve apparatus of the sixteenth aspect, since the intervals among the plurality of sheet rings are formed as one body by connecting with connecting portions, the sheet rings are not required to adjust respectively with respect to the adjusting valve main body, so that there are effects that the adjusting operation can be made easy when the sheet ring is attached to the adjusting valve main body, the plug and the sheet ring are changed, or the position relation between the sheet ring and the plug is adjusted, as well as that the generation of the oscillation can be prevented.

According to the valve apparatus of the seventeenth aspect, since the connecting portions connecting between each of the sheet rings have a through hole forming a flowing path to the lower flowing side from the upper flowing side via a gap between a plug and a sheet ring, the sheet rings are not required to adjust respectively with respect to the adjusting valve main body, so that there are effects that the adjusting operation can be made easy when the sheet ring is attached to the adjusting valve main body, the plug and the sheet ring are changed, or the position relation between the sheet ring and the plug is adjusted, as well as that the character of the flowing path can be adjusted by changing the aperture, figure or position.

According to the valve apparatus of the eighteenth aspect, since the connecting portions connecting between each of the sheet rings have a plurality of through holes for functioning as a defuser, the kinetic energy of the fluid flown from the upper side is changed into the pressure energy by the plurality of holes, so that there is an effect that the flowing of the fluid flown to the lower side via the gap between the sheet ring and the plug can be made smooth.

According to the valve apparatus of the nineteenth aspect, since the connecting portions connecting each of the sheet rings have cylindrical shape in which a through hole is formed at the side wall there is an effect that the sheet ring can be easily produced by the rotational process like the lathe or so.

According to the valve apparatus of the twentieth aspect, since a valve apparatus comprises: a valve main body having a tube path; a plug which has a guide hole; a stem for moving the plug up and down; and a plug guide formed engageably with the guide hole of the plug, and provided freely around the bottom of the valve main body, even if the valve apparatus is already installed, the lower operational space can be obtained enough, and therefore the only plug guide portion can be changed easily at the maintenance, so that there is an effect that the valve apparatus having better cost/performance can be obtained.

According to the valve apparatus of the twenty first aspect, since a bypass hole is provided to discharge fluid maintained in a space formed of the plug guide and the guide hole when the plug guide and the guide hole, the fluid which is functioned as a resistance when the plug is moved down can be easily left out so that the there is an effect that the valve apparatus performing the plug downward operation smoothly can be obtained.

According to the valve apparatus of the twenty second aspect, since a lubricant is provided to an engaging surface of at least one of the plug guide and the guide hole, the friction between the plug guide and the guide hole can be reduced, and the plug sliding operation can be more smooth, so that there is an effect that the damage of the plug and the guide hole due to the friction can be effectively prevented.

In addition, if the fluid escaping groove for discharging the fluid maintained in the space of the plug guide hole to the second side flowing path is provided between the plug guide hole provided in the plug installed in the valve casing for controlling the open/close of the flowing path and a guide shaft which is provided in the valve casing and engaged into the plug guide hole, for guiding the plug in the axis direction, the fluid escaping groove can be easily formed and processed without any process to the characteristic surface as the fluid flowing surface of the plug, and further, since the fluid maintained in the space of the plug guide hole is discharged to the second side flowing path along with the guide shaft, the fluid flowing around the plug is not confused by the discharge fluid, so that the there is an effect that the confidence of the valve apparatus becomes high.

Furthermore, if the fluid escaping groove is formed between the inner surface of the plug guide hole or the outer surface of the guide shaft having different sectional shapes each other, the same effect can be obtained as mentioned above.

Moreover, if the fluid escaping groove is made as at least one groove at the inner surface of the plug guide hole or at the outer surface of the guide shaft, the one fluid escaping groove can be processed more easy in comparison with the plural fluid escaping groove, and further, in case of the plural fluid escaping grooves, even if the different matter like a solid matter or the slurry is stuck in the one of the grooves, there is an effect that other fluid escaping grooves can be functioned.

Furthermore, in the case that the fluid escaping groove is formed to the guide shaft, if the slurry or so is attached to the inner surface of the plug guide hole, since the open end of the fluid escaping groove functions as a scraper by rotating the plug, there is an effect that such attached matter like the slurry can be removed easily without taking the whole valve casing apart to pieces.

Further, since an engaging convex portion for allowing an open/close movement in the axis direction by engaging with the fluid escaping groove, and for preventing 15 the rotation of the plug can be formed at the plug guide hole or the guide shaft, the open/close movement can be carried out without any problem and the plug is not rotated even if the force due to the flowing confusion in the valve casing is received by the plug, so that the twist of the valve shaft portion or the plug stem or so due to the rotation can be prevented, whereby there is an effect that the connecting portion between the valve shaft portion and the plug or the operational device system is not damaged by the twist mentioned above.

In addition, since the plurality of the fluid escaping grooves are formed to the guide shaft along with the axis direction, and the open/close movement is allowed by engaging with one of the fluid escaping grooves, as well as an engaging convex portion for preventing the rotation of the plug can be attached to the plug guide hole, there is an effect that if the fluid escaping groove engaged with the engaging convex portion is damaged by the engagement with the engaging convex portion, after the engagement between the engaging convex portion and the fluid escaping groove is once released with the engaging convex portion being removed or made loose from the outside of the plug without the dissolving of the whole valve, the engaging convex portion can be functioned by engaging with another fluid escaping groove.

The preferred embodiments of the present invention were described above, but the descriptions are only for illustrations, and it should be interpreted so that deformations and changes of the above descriptions may be performed without departing from the spirits and the scopes of the following claims.

What is claimed is:

1. A valve apparatus comprising:

a valve main body having a tube path through which fluid flows;

two plugs which are fixed to each other and which are located in said valve main body for controlling flow of the fluid through the tube path, one of said two plugs having a guide hole at its end;

a stem connected with said two plugs for moving said two plugs linearly without rotating them; and a plug guide formed engageably with said guide hole of said plug, and detachably mounted on a bottom of said valve main body;

wherein a bypass hole is provided in at least one of said plug guide and said plug to discharge fluid, which is stored in a space formed by said plug guide and said guide hole when said plug guide and said guide hole are engaged with each other, outside said space.

2. A valve apparatus according to claim 1, wherein a lubricant is provided to an engaging surface of at least one of said plug guide and said guide hole.

* * * * *

UNITED STATES PATENT AND TRADEMARK OFFICE
CERTIFICATE OF CORRECTION

PATENT NO.   : 6,286,550 B1
DATED        : September 11, 2001
INVENTOR(S)  : Yamaki et al.

It is certified that error appears in the above-identified patent and that said Letters Patent is hereby corrected as shown below:

Column 3,
Line 11, after "opening" insert -- 10 --.

Column 4,
Line 28, delete "8".

Signed and Sealed this

Thirty-first Day of December, 2002

JAMES E. ROGAN
*Director of the United States Patent and Trademark Office*